United States Patent
Hayes-Roth

(10) Patent No.: US 6,359,622 B1
(45) Date of Patent: *Mar. 19, 2002

(54) SYSTEM AND METHOD FOR DIRECTED IMPROVISATION BY COMPUTER CONTROLLED CHARACTERS

(75) Inventor: Barbara Hayes-Roth, Atherton, CA (US)

(73) Assignee: Extempo Systems, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/464,828

(22) Filed: Dec. 17, 1999

Related U.S. Application Data

(63) Continuation of application No. 08/873,066, filed on Jun. 11, 1997, now Pat. No. 6,031,549, which is a continuation-in-part of application No. 08/504,167, filed on Jul. 19, 1995, now abandoned.

(51) Int. Cl.[7] .............................................. G06T 15/70
(52) U.S. Cl. ..................................................... 345/474
(58) Field of Search ................................ 345/418, 473, 345/474, 475

(56) References Cited

PUBLICATIONS

Loyall et al. "Real–Time Control of Animated Broad Agents", Proceedings of the Fifteenth Annual Conference of the Cognitive Science Society, Jun. 18–21, 1993.
"Directed Improvisation", by Barbara Hayes–Roth, Erik Sincoff, Lee Brownstone, Ruth Huard, and Brian Lent, Knowledge Systems Laboratory, Department of Computer Science, Stanford University, Sep. 1994.
"Multi–Agent Collaboration in Directed Improvisation", by Barbara Hayes–Roth and Lee Brownstone, Knowledge Systems Laboratory, Department of Computer Science, Stanford University, Oct. 1994.
"Story Making with Improvisational Puppets and Actors", by Barbara Hayes–Roth and Robert van Gent, Knowledge Systems Laboratory, Department of Computer Science, Stanford University, Dec. 1995.
"Improvisational Puppets, Actors, and Avatars", by Barbara Hayes–Roth and Robert van Gent, Knowledge Systems Laboratory, Department of Computer Science, Stanford University, Apr. 1996.
"Personality in Synthetic Agents", by Barbara Hayes–Roth and Daniel Rousseau, Knowledge Systems Laboratory, Department of Computer Science, Stanford University, Jul. 1996.

Primary Examiner—Cliff N. Vo
(74) Attorney, Agent, or Firm—Lumen Intellectual Property Services, Inc.

(57) ABSTRACT

A system and method for directing the improvisational behavior of a computer-controlled character which enables the character to reflect personality, mood, and other life-like qualities. The method includes the step of storing in the system a set of possible behaviors for the character and state data representative of a current state of the character. The possible behaviors include both physical and verbal behaviors. The current state includes the character's current mood, directing state, activity state, and location in a virtual world. The method also includes the step of identifying from the set of possible behaviors a subset of feasible behaviors for the character in the current state. Each of the feasible behaviors is evaluated to determine a respective desirability rating of the feasible behavior in the current state. The method further includes the step of selecting a behavior to be executed by the character from the subset of feasible behaviors. The behavior to be executed is selected in dependence upon its desirability rating.

54 Claims, 33 Drawing Sheets

ENUMERATED TYPE CLIENT_TYPE =
{AGENT_CLIENT,
USER_INTERFACE_CLIENT,
SYSTEM_INTERFACE_CLIENT,
ANIMATOR_CLIENT,
SERVER}

ENUMERATED TYPE MESSAGE_TYPE =
{IDENTIFY_MSG,
MENUCHOICE_MSG,
MENUITEM_MSG,
PERCEPTION_MSG,
ACTION_MSG,
QUIT_MSG}

| PARENT NODE | MOVE | ... | ANSWER |
|---|---|---|---|
| UNIQUE ID | 0000 | ... | 0104 |
| LABEL | MOVE | ... | ANSWER |
| PRESENT ON INTERFACE | TRUE | ... | FALSE |
| PIXMAP FILENAME | DO_MOVE.XPM | ... | NA |
| POSITION ON INTERFACE | (1, 1) | ... | NA |

*FIG. 11*

| LEAF NODE | HOP | ... | HI (FRIENDLY) |
|---|---|---|---|
| UNIQUE ID | 000000 | ... | 010001 |
| LABEL | HOP | ... | HI |
| PRESENT ON INTERFACE | TRUE | ... | FALSE |
| PIXMAP FILENAME | DO_HOP.XPM | ... | NA |
| POSITION ON INTERFACE | (1, 3) | ... | NA |
| SCRIPT NAME | MOVEMENT | ... | SAY |
| STATIC PARAMETER | HOP | ... | 1201 |
| ACTION TYPE | NO_ACT | ... | HI_ACT |
| SAD-HAPPY MOOD RATING | 2 | ... | 4 |
| TIRED-PEPPY MOOD RATING | 3 | ... | 2 |
| SHY-FRIENDLY MOOD RATING | NA | ... | 7 |
| QUALITY | FUNNY | ... | NA |
| INTERACTION | ALONE | ... | OTHER |
| INSTRUMENT | POGO STICK | ... | NA |

*FIG. 12*

| BEHAVIORAL DIRECTIONS | | |
|---|---|---|
| CONSTRAINED ATTRIBUTE | CONSTRAINT VALUE | WEIGHT OF ATTRIBUTE |
| 158 BEHAVIOR NODE | MOVE NODE (0000) | WEIGHT 4 |
| 160 DESTINATION | ROCKS | WEIGHT 5 |
| 162 QUALITY | FUNNY | WEIGHT 6 |
| 164 INTERACTION | ALONE | WEIGHT 7 |
| 166 INSTRUMENT | POGO STICK | WEIGHT 8 |
*FIG. 16*
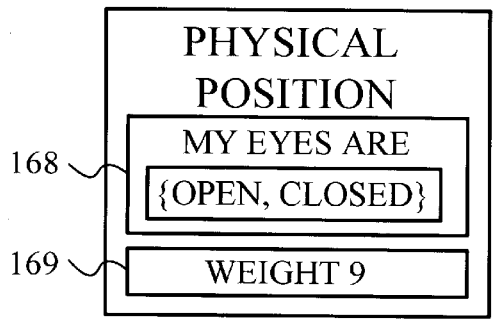
*FIG. 17*
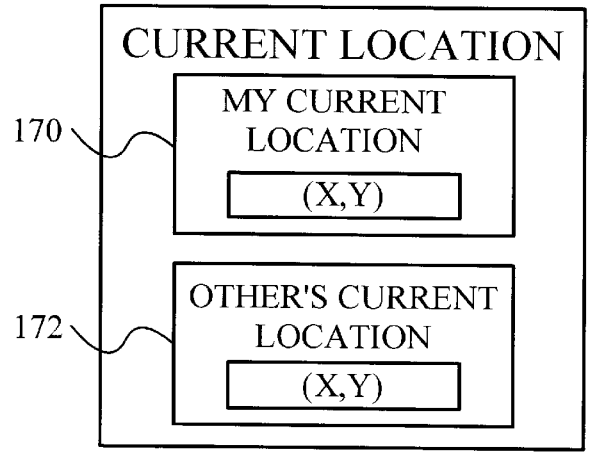
*FIG. 18*
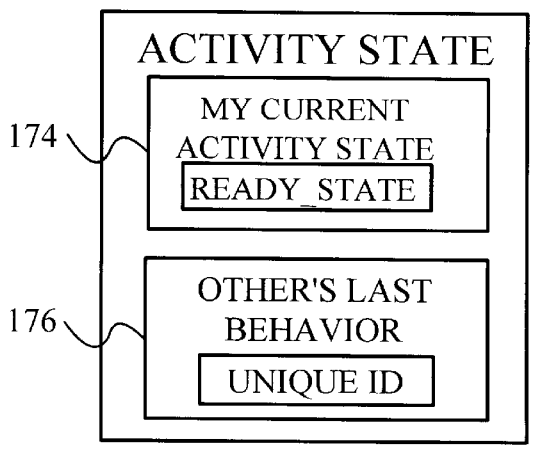
*FIG. 19*

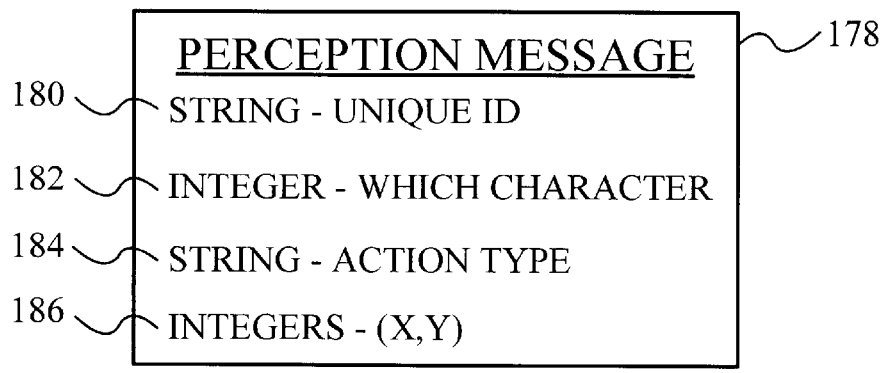

FIG. 20

ENUMERATED TYPE ACTIVITY_STATE =
{HAVENTMET_STATE,
HEARDHI_STATE,
READY_STATE,
ASKINGPLAY_STATE,
ASKINGSTATUS_STATE,
ASKINGNAME_STATE,
ASKEDPLAY_STATE,
PLAYING_ASKEDPLAY_STATE,
ASKEDSTATUS_STATE,
PLAYING_ASKEDSTATUS_STATE,
ASKEDNAME_STATE,
PLAYING_ASKEDNAME_STATE,
PLAYINGTOGETHER_STATE,
PLAYINGALONE_STATE}

FIG. 21

ENUMERATED TYPE ACTION_TYPE =
{NO_ACT,
HI_ACT,
BYE_ACT,
ASKPLAY_ACT,
ASKNAME_ACT,
ASKSTATUS_ACT,
ANSWER_ACT,
ANSWERYES_ACT,
ANSWERNO_ACT,
PLAYALONE_ACT,
STOP_ACT}

FIG. 22

GIVEN: ACTIVITY STATE = STATE AND AN ACTION TYPE ACT OF A BEHAVIOR EXECUTED
BY THE FIRST CHARACTER, LET *** REPRESENT EVERY STATE EXCEPT ASKEDNAME_STATE,
ASKEDSTATUS_STATE, AND ASKEDPLAY_STATE;

IF ACT = NO_ACT : NO EFFECT;
IF ACT = BYE_ACT : STATE -> HAVENTMET_STATE;
IF ACT = HI_ACT : STATE -> READY_STATE;
IF ACT = ASKNAME_ACT : STATE -> ASKINGNAME_STATE;
IF ACT = ASKSTATUS_ACT : STATE -> ASKINGSTATUS-STATE;
IF ACT = ASKPLAY_ACT : STATE -> ASKINGPLAY_STATE
IF (ACT = ANSWER_ACT) AND (STATE = ASKEDNAME_STATE OR PLAYING_ASKEDNAME_STATE)
     : STATE -> READY_STATE;
IF (ACT = ANSWERO_ACT) AND (STATE = ASKEDPLAY_STATE OR PLAYING_ASKEDPLAY_STATE)
     : STATE -> READY_STATE;
IF (ACT = ANSWERYES_ACT) AND STATE = ASKEDPLAY_STATE OR PLAYING_ASKEDPLAY_STATE)
     : STATE -> PLAYINGTOGETHER_STATE;
IF (ACT = PLAYALONE_ACT) AND (STATE = ASKEDNAME_STATE)
     : STATE -> PLAYING_ASKEDNAME_STATE;
IF (ACT = PLAYALONE_ACT) AND (STATE = ASKEDSTATUS_STATE)
     : STATE -> PLAYING_ASKEDSTATUS_STATE;
IF (ACT = PLAYALONE_ACT) AND (STATE = ASKEDPLAY_STATE)
     : STATE -> PLAYING_ASKEDPLAY_STATE;
IF (ACT = PLAYALONE_ACT) AND (STATE = ***)
     : STATE -> PLAYINGALONE_STATE;
IF (ACT = STOP_ACT) AND (STATE = PLAYINGALONE_STATE OR PLAYINGTOGETHER_STATE)
     : STATE -> READY_STATE;
IF (ACT = STOP_ACT) AND (STATE = PLAYING_ASKEDNAME_STATE)
     : STATE -> ASKEDNAME_STATE;
IF (ACT = STOP_ACT) AND (STATE = PLAYING_ASKEDSTATUS_STATE)
     : STATE -> ASKEDSTATUS_STATE;
IF (ACT = STOP_ACT) AND (STATE = PLAYING_ASKEDPLAY_STATE)
     : STATE -> ASKEDPLAY_STATE;

*FIG. 23A*

GIVEN: ACTIVITY STATE = STATE AND AN ACTION TYPE ACT OF A BEHAVIOR EXECUTED
BY THE OTHER CHARACTER:
LET *** REPRESENT (PLAYING_ASKEDNAME_STATE OR PLAYING_ASKEDSTATUS_STATE OR
PLAYING_ASKEDPLAY_STATE OR PLAYINGALONE_STATE

```
IF ACT = NO_ACT                                                : NO EFFECT;
IF ACT = PLAYALONE_ACT                                         : NO EFFECT;
IF ACT = BYE_ACT                                               : STATE -> HAVENTMET_STATE;
IF (ACT = HI_ACT) _ AND (STATE = HAVENTMET_STATE)
                                                               : STATE -> HEARDHI_STATE;
IF (ACT = ASKNAME_ACT) AND (STATE = ***)
                                                               : STATE -> PLAYING_ASKEDNAME_STATE;
IF (ACT = ASKNAME_ACT) AND (STATE != ***)
                                                               : STATE -> ASKEDNAME_STATE;
IF (ACT = ASKSTATUS_ACT) AND (STATE = ***)
                                                               : STATE -> PLAYING_ASKEDSTATUS_STATE
IF (ACT = ASKSTATUS_ACT) AND (STATE != ***)
                                                               : STATE -> ASKEDSTATUS_STATE;
IF (ACT = ASKPLAY_ACT) AND (STATE = ***)
                                                               : STATE -> PLAYING_ASKEDPLAY_STATE
IF (ACT = ASKSPLAY_ACT) AND (STATE != ***)
                                                               : STATE -> ASKEDPLAY_STATE;
IF (ACT = ANSWER_ACT) AND (STATE = ASKINGNAME_STATE)
                                                               : STATE -> READY_STATE;
IF (ACT = ANSWER_ACT) AND (STATE = ASKINGSTATUS_STATE)
                                                               : STATE -> READY_STATE;
IF (ACT = ANSWERNO_ACT) AND (STATE = ASKINGPLAY_PLAY)
                                                               : STATE -> READY_STATE;
IF (ACT = ANSWERYES_ACT) AND (STATE = ASKINGPLAY_STATE)
                                                               : STATE -> PLAYINGTOGETHER_STATE;
IF (ACT = STOP_ACT) AND (STATE = PLAYINGTOGETHER_STATE)
                                                               : STATE -> READY_STATE;
```

*FIG. 23B*

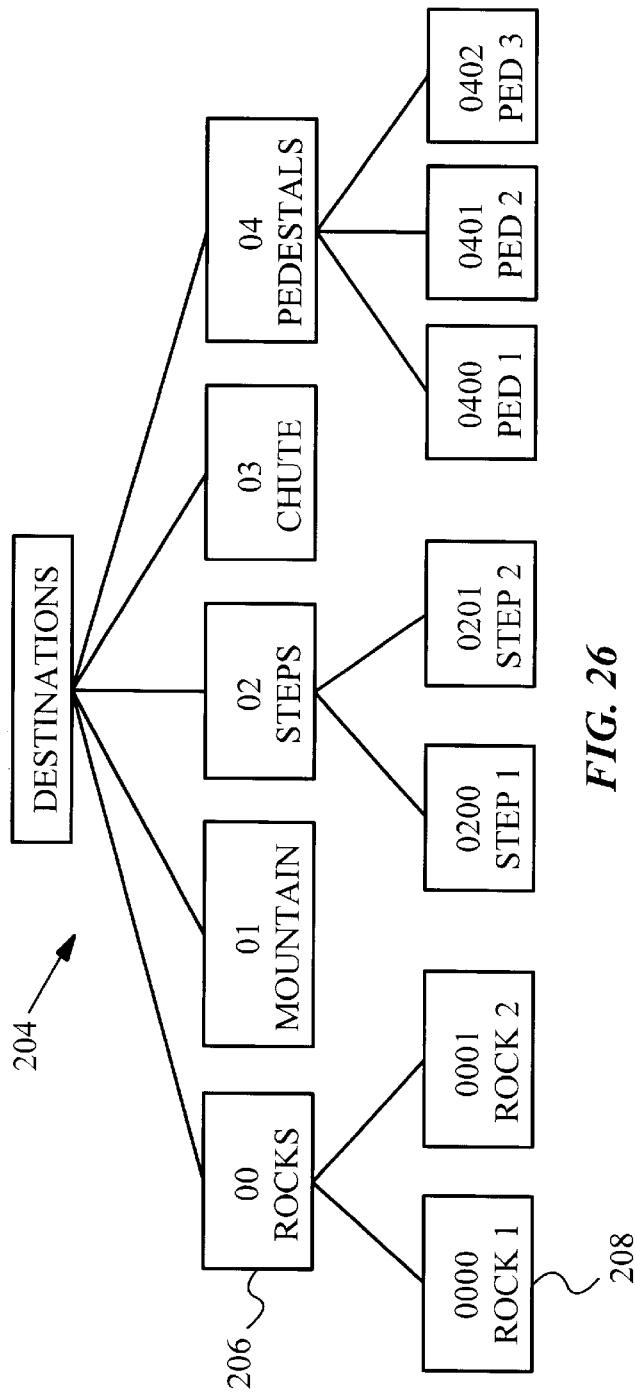

GIVEN CURRENT ACTIVITY STATE AND CURRENT STATUS OF EYES:
LET *** = PLAYINGALONE_STATE OR PLAYINGTOGETHER_STATE OR
PLAYING_ASKEDNAME_STATE OR PLAYING_ASKEDSTATUS_STATE OR
PLAYING_ASKEDPLAY_STATE;

IF (EYES = OPEN) : OPENEYES_NODE IS NOT FEASIBLE;

IF (EYES = CLOSED) : ALL NODES EXCEPT IN_PLACE NODE, AND
OPENEYES_NODE ARE NOT FEASIBLE;

IF (STATE !=***) : STOP_NODE IS NOT FEASIBLE;

IF (STATE = HAVENTMET_STATE)
: ASK_ NODE ANSWER_NODE, AND
BYE_NODE ARE NOT FEASIBLE;

IF (STATE = HEARDHI_STATE)
: BYE_NODE AND ANSWER_NODE
ARE NOT FEASIBLE

IF (STATE = READY_STATE OR ASKINGNAME_STATE OR
ASKINGSTATUS_STATE OR ASKINGPLAY_STAE
: HI_NODES AND ANSWER_NODE
ARE NOT FEASIBLE

IF (STATE = ASKEDNAME_STATE)
: ALL NODES IN SAY BRANCH EXCEPT
ANSWER_NAME NODE ARE NOT FEASIBLE

IF (STATE = ASKEDSTATUS_STATE)
: ALL NODES IN SAY BRANCH EXCEPT
ANSWER_STATUS NODE ARE NOT FEASIBLE

IF (STATE = ASKEDPLAY_STATE)
: ALL NODES IN SAY BRANCH EXCEPT
ANSWER_YES AND ANSWER_NO NODE
ARE NOT FEASIBLE

*FIG. 36*

ACTIVITY STATE TABLE (ACTIVITY_STATE)

| BEHAVIOR NODE | FEASIBLE | DESIRABILITY | WEIGHT |
|---|---|---|---|
| 0000 | TRUE | D1 | WEIGHT 10 |
| 000000 | TRUE | D2 | WEIGHT 11 |
| 000001 | TRUE | D3 | WEIGHT 12 |
| ... | ... | ... | ... |

MOVEMENT SCRIPT
ANIMATOR_COMMAND ($1, $DESTINATION_X, $DESTINATION_Y,
    $ENERGY + 10, $HAPPINESS + 20,
    $UNIQUE_ID, $ACTION_TYPE)
END

*FIG. 44*

SAY SCRIPT
ANIMATOR_COMMAND (SAY, $1, $UNIQUE_ID, $ACTION_TYPE)
END

*FIG. 45*

PLAY ON PEDESTALS SCRIPT
INTERNAL_DESTINATION_DIRECTION (04)
INTERNAL_BEHAVIOR_DIRECTION (0000)
LOOP (3 + RAND(0,3))
INTERNAL_BEHAVIOR_DIRECTION (010305)
INTERNAL_DESTINATION_DIRECTION (04)
INTERNAL_BEHAVIOR_DIRECTION (0000)
ENDLOOP
END

*FIG. 46*

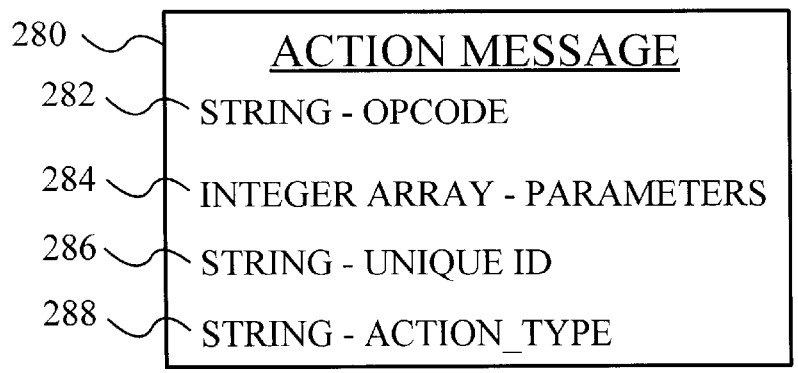

*FIG. 47*

ENUMERATED TYPE OPCODE =
{HOP,
LEAP,
SHUFFLE,
SAY,
CLOSE_EYES,
OPEN_EYES,
STRETCH,
SWELL_UP,
TREMBLE,
LOOK_AT}

SYSTEM AND METHOD FOR DIRECTED IMPROVISATION BY COMPUTER CONTROLLED CHARACTERS

CONTINUATION APPLICATION INFORMATION

This application is a continuation of application Ser. No. 08/873,066 filed Jun. 11, 1997, now U.S. Pat. No. 6,031,549, which is a continuation-in-part of application Ser. No. 08/504,167 filed Jul. 19, 1995, now abandoned which is herein incorporated by reference.

COPYRIGHT AUTHORIZATION

A portion of the disclosure of this patent document contains material which is subject to copyright protection. The copyright owner has no objection to the facsimile reproduction by any one of the patent disclosure as it appears in the U.S. Patent and Trademark Office patent files or records, but otherwise reserves all copyright rights whatsoever.

FIELD OF THE INVENTION

The present invention relates generally to computer systems for creating and manipulating computer-controlled characters, and in particular to a system and method for directing the improvisational behavior of a computer-controlled character.

DESCRIPTION OF PRIOR ART

Rapid advances in several core computer technologies are enabling and encouraging the development of new computer applications for entertainment, education, commerce, business, and consumer products. These technologies include computer processors and memory components, input/output devices, multi-media technologies, computer graphics, internet, and world wide web technologies. Many current and prospective applications exploiting these technologies involve computer-controlled characters whose appearances capture suggestive aspects of life-like creatures.

Potential applications for these computer-controlled characters include educational software, interactive story systems, computer games, on-line social communities, intelligent user interface and help systems, intelligent professional or personal assistants, interactive museum and theme park exhibits, training simulations, interactive television and cinema, and web-based advertising. The potential richness and sophistication of these applications is directly related to the range and variability of the characters' behavior, the characters' ability to reflect personality, mood, and other life-like qualities in their behavior, and the ease and power with which users, designers, and other system components can direct the characters' behavior.

In contrast to the rapid advances in core technologies mentioned above, the current models and implementation technologies underlying computer characters and their behaviors are extremely primitive. In fact, except for superficial appearances, typical computer characters in existing applications are not true "characters" at all, but merely names, descriptions, or appearances of characters which are associated with simple behavioral models. For example, typical characters exhibit the following and other deficiencies:

Typical characters do not have broad repertoires of behaviors nor do they communicate and interact with one another in meaningful ways. Instead, they perform only a few physical behaviors and gestures, rarely perform any verbal behaviors, and react with standard responses to only a few actions by other characters.

Typical characters do not behave in ways that reflect distinctive personalities, context-dependent moods, emotional states, or other life-like qualities, such as normal variability, idiosyncrasies, or irregularities in their behavior. Instead, their behavior is unnaturally regular, repetitive, and robotic.

Typical characters do not adapt their behavior to a significant variety of run-time situations nor do they adapt their behavior to the characteristics, needs, preferences, or histories of individual users. Instead, they react in a predetermined manner to a small number of pre-enumerated events, behaving the same way for all users.

Typical characters do not interpret and follow directions nor do they integrate directions received from multiple sources. Instead, they blindly execute explicit instructions received from an individual user or script. These deficiencies in existing computer characters are widely recognized as a principal limiting factor on the design and development of innovative applications.

Attempts have been made to develop new character models which allow some degree of variability in the behavior of computer characters. For example, U.S. Pat. No. 5,498,002 and 5,498,003 issued to Ghecter on Mar. 12, 1996 disclose an interactive electronic game which has character behavior controllers for determining the behavior of respective game characters. The game also has a game controller containing logic for determining consistent game states for the characters. A random number generator determines the behavior of each character and the outcomes of interactions between the characters, typically a collision between two or more characters. The game further includes a user interface through which a user adds or deletes game characters and sets an initial velocity of each game character.

Although the interactive electronic game disclosed by Ghecter does allow for some variability in the behavior of characters, it does not allow for a broad range of behaviors to be displayed by the characters. Further, the behaviors displayed by the characters are not selected in dependence upon distinctive personalities of the characters, context-dependent moods, or other life-like criteria, such as diverse interactions between the characters. Instead, the behaviors are randomly determined by the random number generator.

Another computer system which attempts to animate characters such that the characters exhibit believable and engaging personalities is described in Loyall et al "Real-Time Control of Animated Broad Agents", Proceedings of the Fifteenth Annual Conference of the Cognitive Science Society, Jun. 18–21, 1993. Loyall shows three animated characters which perform certain physical actions in a virtual world in dependence upon their current sensor data and goals. The goals for each character are annotated with priority numbers and stored in an active plan tree. The active plan tree includes multiple plans for implementing each of the goals.

To control each animated character, Loyall's system selects the most critical goal for the character based upon the annotated priority numbers and implements the selected goal using the most specific plan available for the goal. This goal-driven control does not allow a character to identify and choose among alternative behaviors that may be feasible in a given situation. Loyall's system only assesses the feasibility of the most specific behavior plan that achieves the character's highest priority goal, as determined from its prespecified priority number.

Moreover, Loyall's system does not allow a character to consider alternative behavior plans for achieving its highest priority goal unless all of the more specific plans for achieving the goal have been determined to be not feasible. Similarly, the character does not consider plans for lower priority goals unless it has already determined that there is no feasible plan for achieving the highest priority goal. Further, the character does not consider any behavior plans that do not achieve its current goals.

As a result, Loyall's system produces rigorously, reliably, and specifically goal-directed behavior. It does not allow the reflection of life-like qualities, such as normal variability, occasional irregularities, spontaneity, or opportunism, in a character's behavior. It does not allow a character to select behaviors based upon alternative non-goal criteria, such as the character's context-dependent moods, or to select behaviors because they just happen to be feasible in the present situation. Further, Loyall's system does not allow a character to follow alternative directions that vary in the dimensions on which they constrain behavior or in the degree to which they constrain behavior.

OBJECTS AND ADVANTAGES OF THE INVENTION

In view of the above, it is an object of the present invention to provide a system and method for selecting a behavior to be executed by a computer-controlled character which enables the character to exhibit a broad range of interesting behaviors, including both physical and verbal behaviors, in a broad range of situations. Another object of the invention is to provide a system and method for selecting a behavior to be executed by a character which enables the character to reflect context-dependent moods and other life-like qualities, such as normal variability, idiosyncrasies, and irregularities in behavior. A further object of the invention is to provide a system and method for directing an improvisational character which enables the character to follow directions which vary in the degree to which they constrain behavior.

These and other objects and advantages will become more apparent after consideration of the ensuing description and the accompanying drawings.

SUMMARY

The invention presents a computer system and method for selecting a behavior to be executed by an improvisational character. The method includes the step of storing in the computer system a set of possible behaviors for the character and state data representative of a current state of the character. The possible behaviors preferably include both physical and verbal behaviors. The current state preferably includes a current mood of the character, a directing state of the character, an activity state of the character, a current physical position of the character, and a current location of the character in a virtual world.

The method also includes the step of identifying from the set of possible behaviors a subset of feasible behaviors for the character in the current state. In the preferred embodiment, the feasible behaviors are identified in dependence upon the character's current mood, activity state, physical position, and current location. The method further includes the step of determining for each of the feasible behaviors a respective desirability rating of the feasible behavior in the current state. The desirability rating is preferably determined in dependence upon the character's current mood, directing state, activity state, physical position, and current location in the virtual world. The method also includes the step of selecting the behavior to be executed by the character from the subset of feasible behaviors.

The behavior to be executed is selected in dependence upon its desirability rating. In the preferred embodiment, the behavior to be executed is selected probabilistically from the subset of feasible behaviors with a selection probability that is an increasing function of the desirability rating of the behavior. In a second embodiment, the behavior to be executed is selected by identifying from the subset of feasible behaviors a subset of desirable behaviors whose desirability ratings exceed a specified desirability rating threshold. The behavior to be executed is then selected from the subset of desirable behaviors. In a third embodiment, the behavior to be executed is selected as the feasible behavior having the highest desirability rating.

BRIEF DESCRIPTION OF THE DRAWINGS

FIG. 11 is a table of annotations associated with the parent nodes of the tree of FIG. 10.

FIG. 12 is a table of annotations associated with the leaf nodes of the tree of FIG. 10.

FIG. 16 is a block diagram illustrating a representation of the first character's behavioral directions.

FIG. 17 is a block diagram illustrating a representation of the first character's current physical position.

FIG. 18 is a block diagram illustrating a representation of each character's current location in the virtual world of FIG. 13.

FIG. 19 is a block diagram illustrating a representation of the first character's current activity state.

FIG. 20 is a block diagram illustrating components of a perception message packet according to the preferred embodiment of the invention.

FIG. 21 is a listing of activity states used in the preferred embodiment of the invention.

FIG. 22 is a listing of action types used in the preferred embodiment of the invention.

FIG. 23A is a textual description of the transitions in the first character's activity state which result from behaviors executed by the first character.

FIG. 23B is a textual description of the transitions in the first character's activity state which result from behaviors executed by the second character.

FIG. 26 is a schematic block diagram of a tree for storing a set of possible destinations in the virtual world of FIG. 13.

FIG. 27 is a table of annotations associated with the nodes of the tree of FIG. 26.

FIG. 36 is a textual description of the behavior nodes which are not feasible for the first character given various possible activity states and physical positions of the first character.

FIG. 44 is a MOVEMENT script according to the preferred embodiment of the invention.

FIG. 45 is a SAY script according to the preferred embodiment of the invention.

FIG. 46 is a PLAY ON PEDESTALS script according to the preferred embodiment of the invention.

FIG. 47 is a block diagram illustrating components of an action message packet according to the preferred embodiment of the invention.

DETAILED DESCRIPTION

The present invention is a computer system and method for directing the behavior of an improvisational character. For the purposes of this specification and the appended claims, an improvisational character is defined as any computer-controlled entity which is embodied in a computer-controllable medium such as computer graphics, animation, robotics, virtual reality, audio, video, film, or text. The preferred embodiment is described in reference to computer-animated characters, but the scope of the invention is not limited to this particular implementation.

Further, the following description sets forth numerous specific details to provide a thorough understanding of the present invention. However, it will be apparent to one of ordinary skill in the art that these specific details need not be used to practice the invention. In other instances, well known structures, interfaces, and processes are not shown in detail to avoid unnecessarily obscuring the present invention. A preferred embodiment of the invention is illustrated in FIGS. 1–50. The following two sections set forth an overview of the hardware and software of the preferred embodiment.

Hardware

Figure 1:
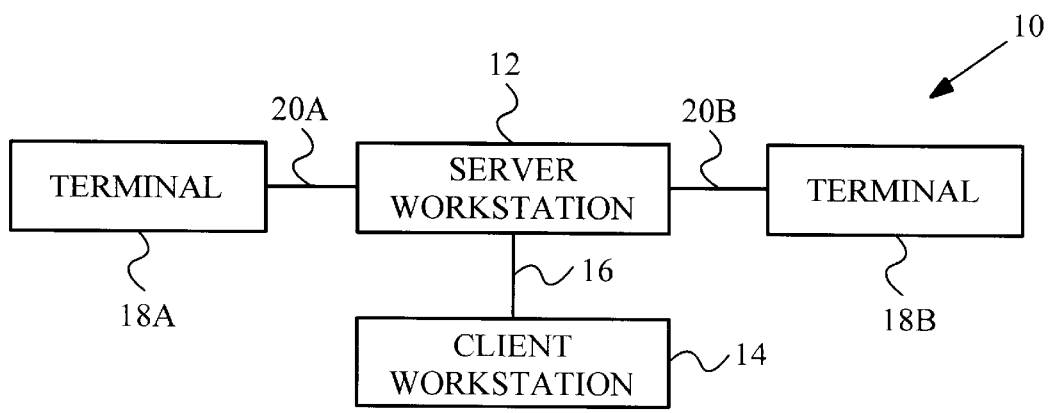
FIG. 1 is a schematic block diagram of a computer system according a preferred embodiment of the invention.
Figure 2:
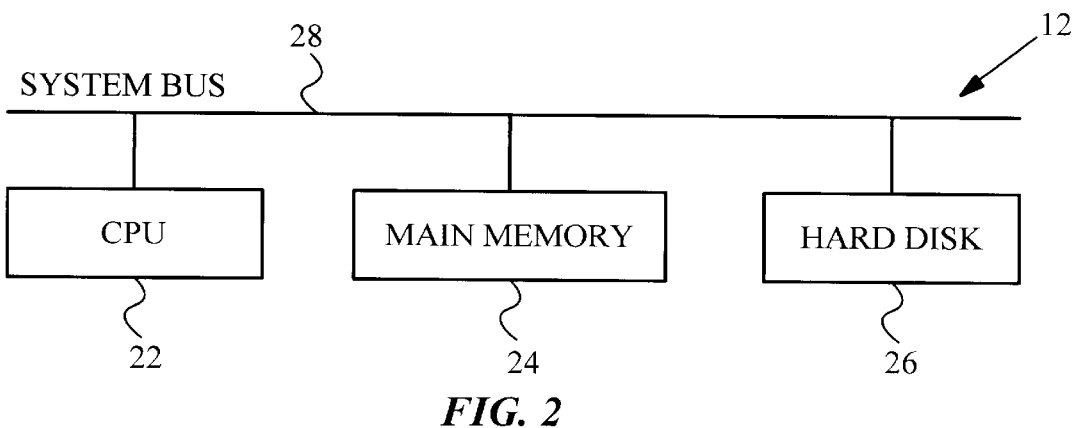
FIG. 2 is a schematic block diagram of the main components of a server workstation of the system of FIG. 1.

Referring to FIG. 1, a computer system 10 includes a server workstation 12 functioning as an X Windows server and a client workstation 14 connected to server workstation 12 via a network connection 16. System 10 also includes two terminals 18A and 18B connected to workstation 12 via network connections 20A and 20B, respectively. FIG. 2 illustrates workstation 12 in greater detail. Workstation 12 includes a central processor 22, a main memory 24, and a mass storage hard disk 26. Processor 22, memory 24, and hard disk 26 communicate through a system bus 28.

Figure 3:
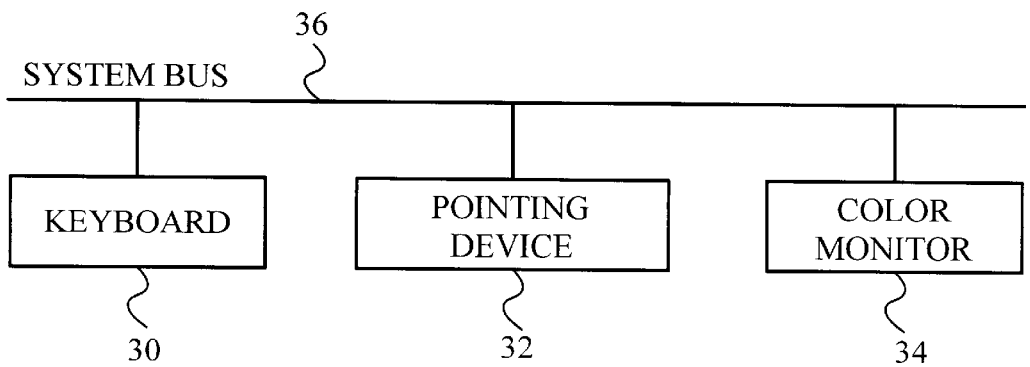
FIG. 3 is a schematic block diagram of the main components of a terminal of the system of FIG. 1.
Figure 4:
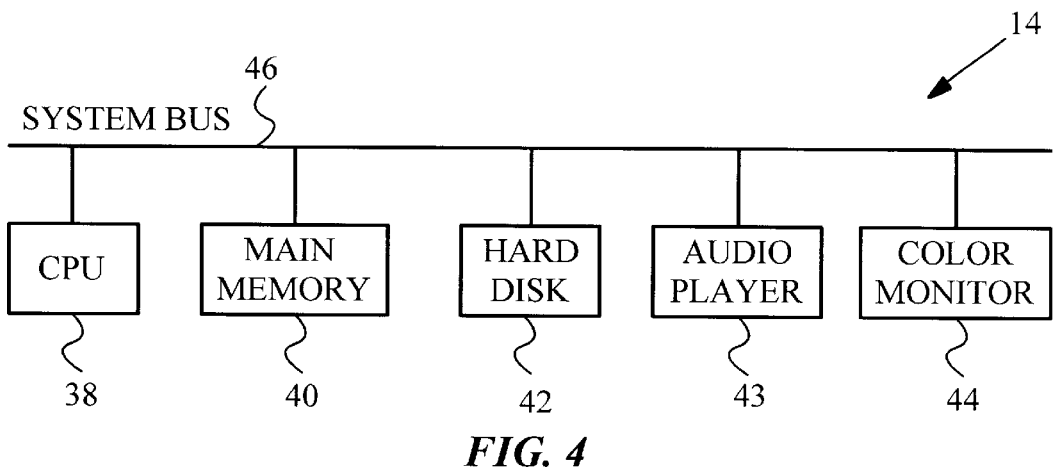
FIG. 4 is a schematic block diagram of the main components of a client workstation of the system of FIG. 1.

FIG. 3 shows the components included in each terminal 18A and 18B. Each terminal includes a keyboard 30, a pointing device 32, and a color monitor 34, all communicating through a system bus 36. Workstation 14 is illustrated in greater detail in FIG. 4. Workstation 14 includes a central processor 38, a main memory 40, a mass storage hard disk 42, an audio player 43, and a color monitor 44, all communicating through a system bus 46.

In the preferred embodiment, workstation 12 is a Sparc 10 workstation commercially available from SUN Microsystems and workstation 14 is a SGI Indy workstation commercially available from Silicon Graphics. Also in the preferred embodiment, terminals 18A and 18B are two Macintosh Centris computers commercially available from Apple Computer. Each Macintosh Centris computer runs a MacX application which allows it to function as an X Windows client. Workstation 14 and terminals 18A and 18B are preferably connected to workstation 12 by a 10BaseT twisted pair Ethernet connection which supports X Windows client/server connections over connections 20A and 20B and a TCP/IP socket connection over connection 16.

It is to be understood that the system of the present invention is not limited to this particular hardware environment or configuration. Those skilled in the art will recognize that the system may be operated in a variety of hardware configurations which may include different hardware components, platforms, or network connections. Further, those skilled in the art will recognize that the entire system could be operated on a single stand-alone computer rather than on multiple computers communicating over a network.

Software Overview

Figure 5:
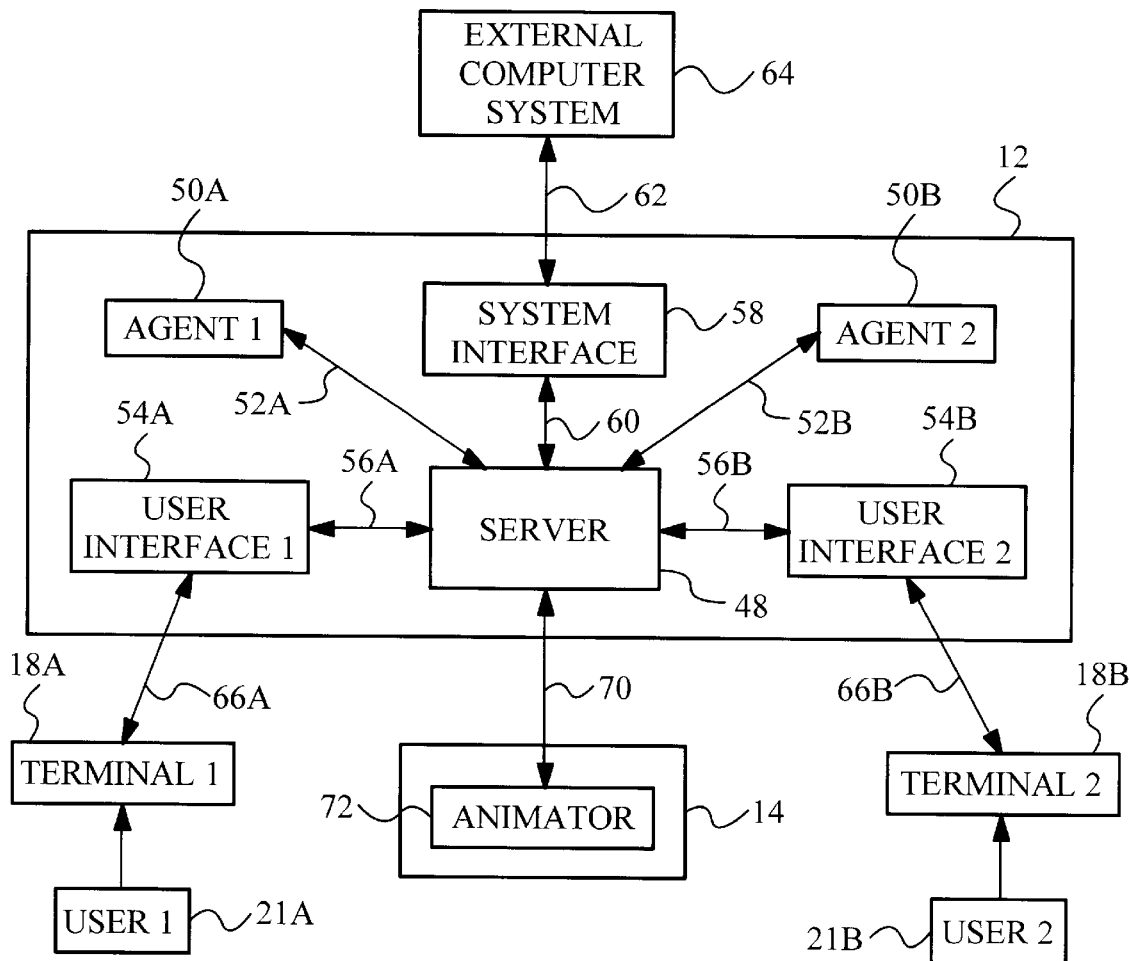
FIG. 5 is a schematic block diagram showing the software applications of the system of FIG. 1.

Referring to FIG. 5, the software of the preferred embodiment includes a server application 48 running on workstation 12. Server application 48 is for routing messages between all other software applications. The software of the preferred embodiment also includes two agent applications 50A and 50B running on workstation 12. Each agent application improvises a course of behavior for a respective character, as will be explained in detail below. Agent applications 50A and 50B are connected to server application 48 via local host TCP/IP connections 52A and 52B, respectively.

Two user interface applications 54A and 54B also run on workstation 12. Interface applications 54A and 54B are connected to server application 48 via local host TCP/IP connections 56A and 56B, respectively. User interface applications 54A and 54B are also connected to terminals 18A and 18B, respectively, such that interface application 54A and terminal 18A provide a first user interface for a first user 21A and such that interface application 54B and terminal 18B provide a second user interface for a second user 21B. The users may be end-users, application developers, directors, etc. Interface application 54A is associated with agent application 52A, and interface application 54B is associated with agent application 52B.

A system interface application 58 is connected to server application 48 via local host TCP/IP connection 60. System interface application 58 provides a system interface for receiving input from an external computer system 64 connected to workstation 12 via a network connection 62. The software of the preferred embodiment further includes an animator application 72 running on workstation 14. Animator application 72 is connected to server application 48 via a TCP/IP socket connection 70. Animator application 72 is designed to animate an extended range of physical and verbal behaviors for each improvisational character. The animator application is discussed in greater detail below.

Server Application

Server application 48 is designed to route messages between all client software applications. Server application 48 supports a set of clients types listed in FIG. 6. The set of client types includes an agent client, a user interface client, a system interface client, an animator client, and a server. Server application 48 also supports a set of message types illustrated in FIG. 7. The set of message types includes an identify message, a menu choice message, a menu item message, a perception message, an action message, and a quit message. The usage of these various message types is discussed in detail below.

Each client application has a server code library defined in its object code. Each client application communicates with the server application through its respective TCP/IP connection by calling routines defined in its server code library. Each server code library includes routines to open a connection to the server, close a connection to the server, poll the connection for message packets, send a message packet to another application, and receive a message packet. In addition, each server code library includes routines to construct and access the message data in a packet.

Figures 6, 7, 8, 9:
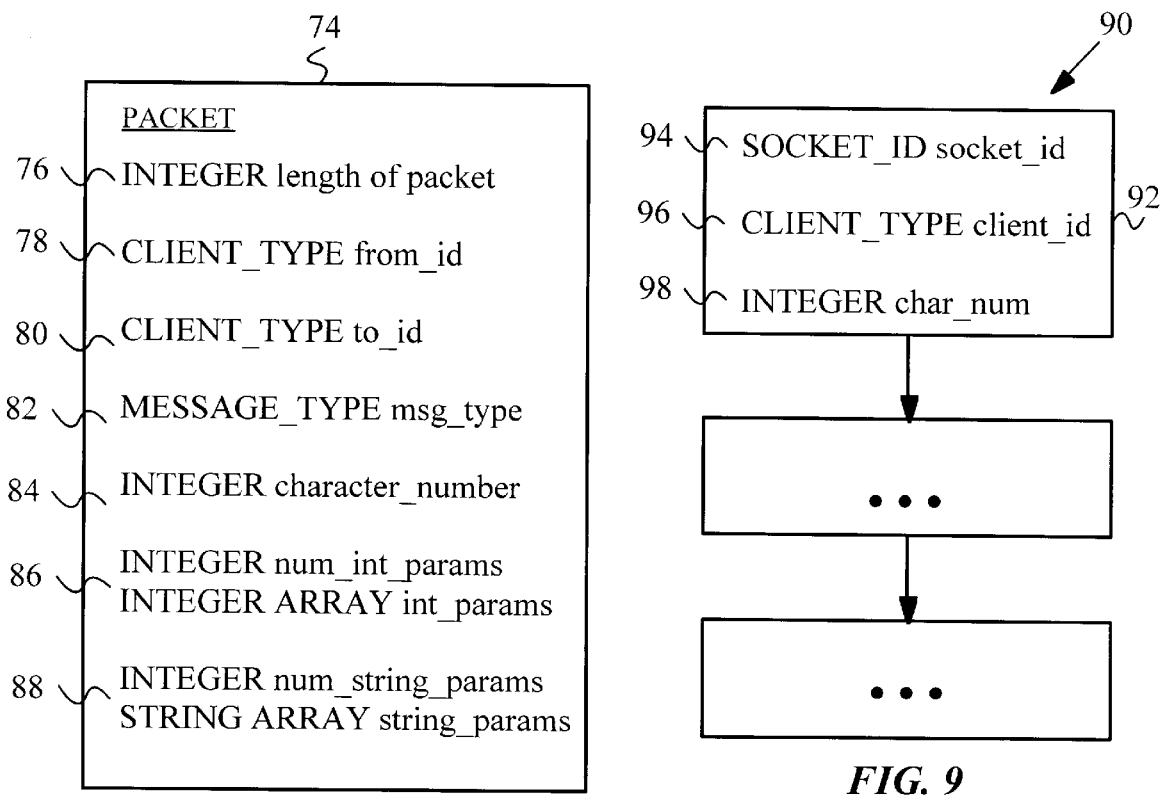
FIG. 6 is a listing of the client types used in the system of FIG. 1.
FIG. 7 is a listing of the message types used in the system of FIG. 1.
FIG. 8 is a schematic diagram illustrating a generic message packet according to the preferred embodiment of the invention.
FIG. 9 is a schematic diagram illustrating a linked list data structure stored in the server of FIG. 1.

Referring to FIG. 8, a message packet 74 includes a text stream with a header specifying a packet length 76. Packet 74 also includes identifiers indicating a message source 78 and a message destination 80. Packet 74 further includes a message type 82 indicating the type of message and an integer 84 specifying which character the message references. In addition, packet 74 includes a variable number of integer parameters 86 and a variable number of string parameters 88 containing the message data.

Upon startup, after establishing a TCP/IP connection to the server, each client application sends an identify message to the server application identifying its application type and, if applicable, its character number. Each client application also sends a quit message before closing its connection. The server application keeps a linked list data structure in its local main memory. FIG. 9 shows a sample linked list 90 having nodes 92. Each node in the list contains a socket identification number 94, a client type 96, and a character number 98 associated with the client application. Identify message packets add nodes to the list and quit message packets or socket errors remove nodes from the list.

The server application continuously polls the connections associated with each client application for message packets. After reading the header of a packet, the server application uses the message destination and the integer specifying which character the message packet references to search the linked list for the appropriate socket identification number. The server application then forwards the packet to its destination. Those skilled in the art will recognize that the server application may be implemented differently in alternative embodiments. Alternatively, the client applications may communicate directly with each other without the intervention of a server application.

Agent Applications

The present invention focuses on the agent applications which select courses of behavior for the improvisational characters. Each agent application controls the behavior of a respective character based on a set of possible behaviors for the character and state data representative of a current state of the character. The following sections set forth the data structures used in the preferred embodiment to store the set of possible behaviors and the state data.

Set of Possible Behaviors

Figure 10:
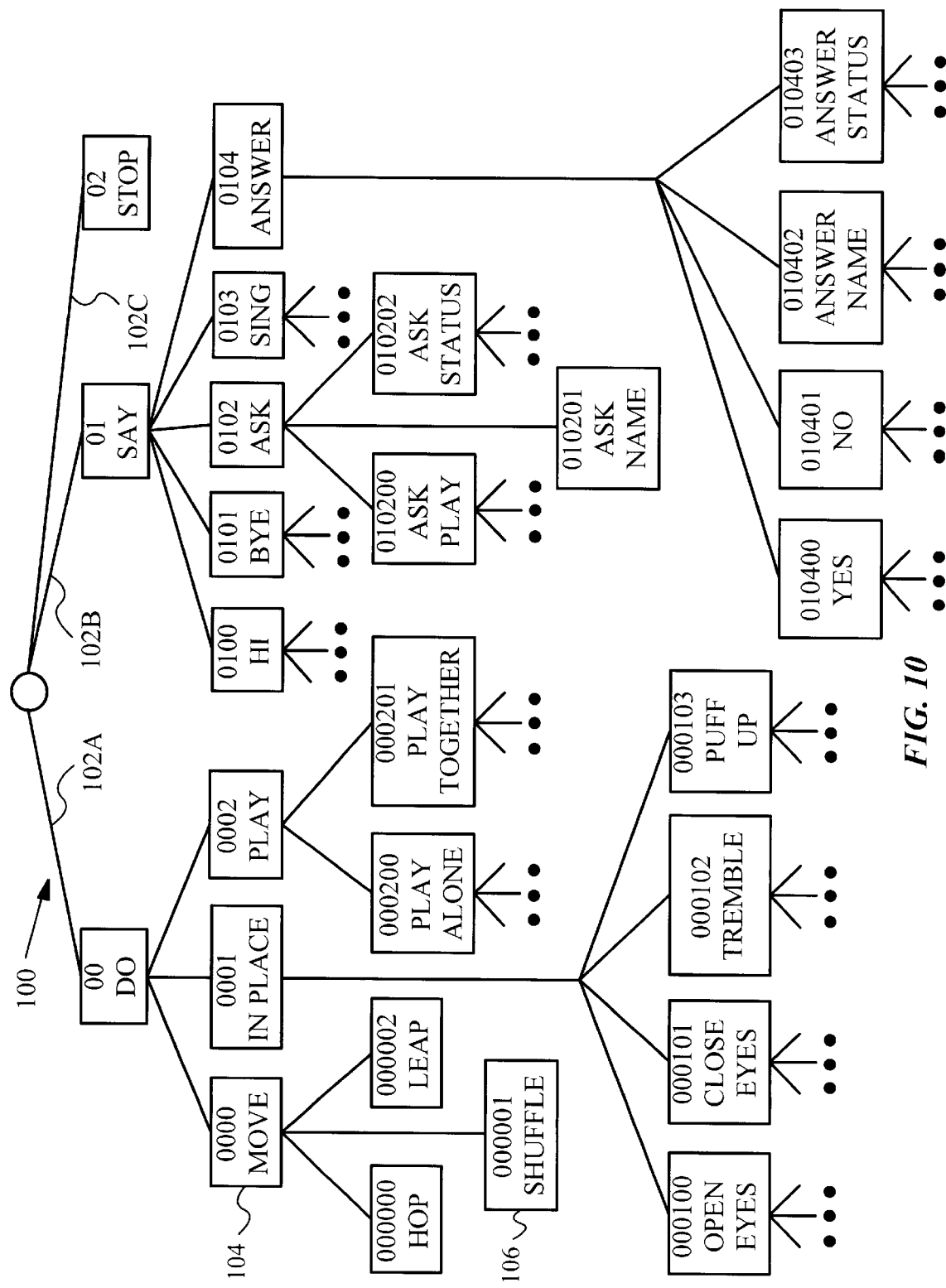
FIG. 10 is a schematic block diagram of a tree for storing a set of possible behaviors.

In the preferred embodiment, the set of possible behaviors is represented by a data structure in the form of a tree. The data structure for the tree is preferably stored in a file on hard disk 26, read in by the agent applications at run time, and stored in local main memory 24. FIG. 10 illustrates a tree 100 containing a sample set of possible behaviors. Due to limitations of space, FIG. 10 shows a representative sampling of possible behaviors for each character and is not intended as an exhaustive listing of all possible behaviors supported by the invention.

Tree 100 has three main branches 102A, 102B, and 102C. Branch 102A corresponds to parameterized physical behaviors. Branch 102B corresponds to parameterized verbal behaviors (i.e. sound files to be played by audio player 43). Branch 102C corresponds to a stop behavior for terminating the execution of the physical and verbal behaviors.

Branches 102A and 102B contain parent nodes 104 and leaf nodes 106. Parent nodes 104 correspond to classes of behavior, such as move to a destination, play, ask etc. Leaf nodes 106 correspond to actual executable behaviors grouped under the behavioral classes. Leaf nodes 106 are associated with parameterized scripts which are preferably stored in a file on hard disk 26 and read into local main memory 24 by the agent applications at run time. Each agent application instantiates one or more of the scripts to direct its associated character to execute a selected behavior, as will be explained in detail below.

Each parent node in the tree is specified by a set of annotations in the file. Referring to FIG. 11, each parent node is annotated with a unique identifier 108 which determines the position of the node in the tree. The unique identifier of a node is defined recursively as the unique identifier of its parent concatenated with a two character string which starts at "00" for the first child and increments to "01", "02", ..., "99" for successive children. The root node's unique identifier is the empty string.

Figure 28:
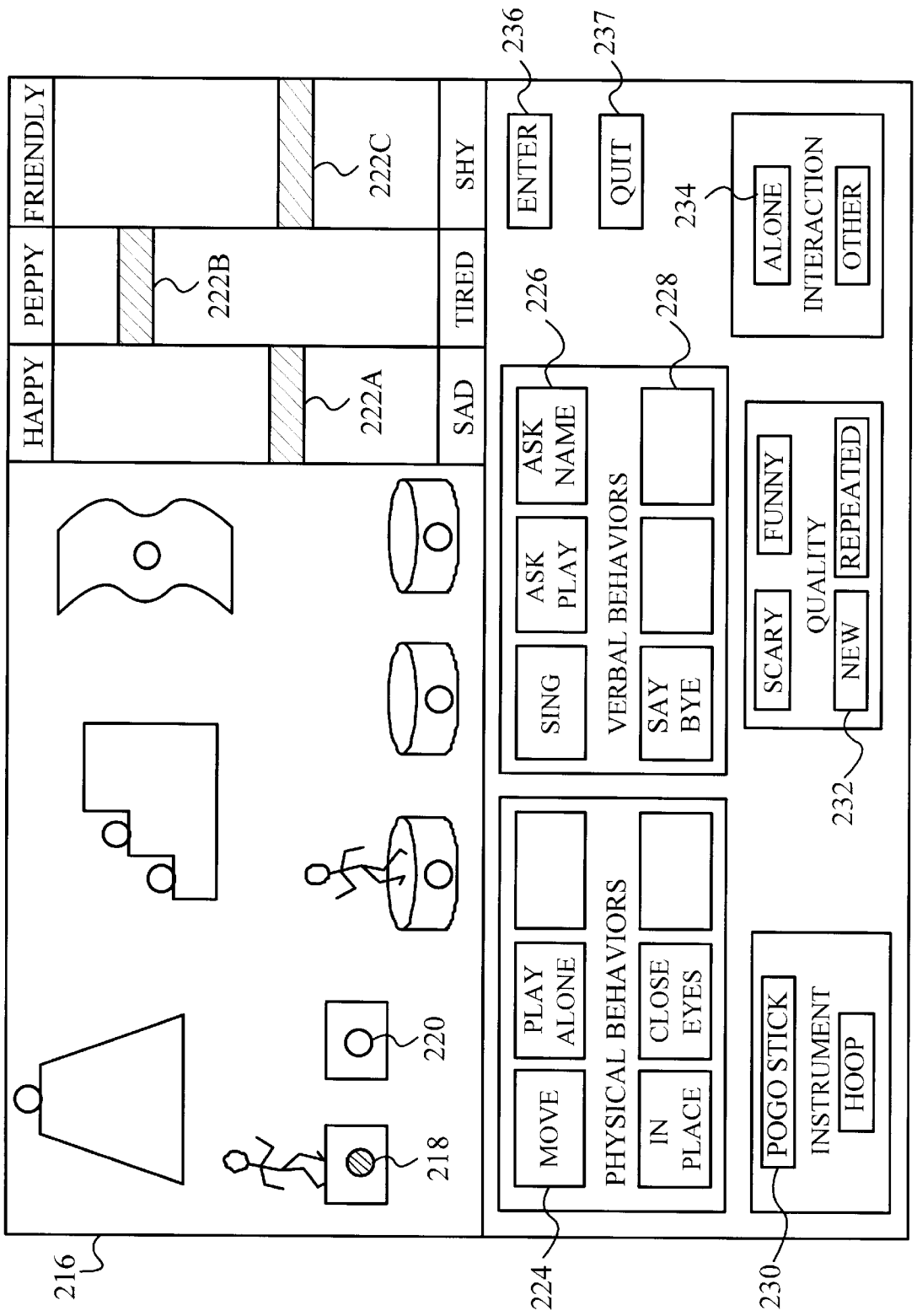
FIG. 28 is a schematic block diagram illustrating a user interface as it appears on the monitor of the terminal of FIG. 3.

Each parent node is also annotated with a label string 110 and a binary value 112 indicating if the node should be presented as a directing alternative on a user interface. A sample user interface screen is illustrated in FIG. 28 and will be described in detail below. Each node is preferably presented on the user interface as an icon. Each parent node is further annotated with a name 114 of a file on the hard disk which contains a pixmap representation of the icon. Each parent node is also annotated with integers 116 which indicate the position on the user interface in which the icon should be presented.

Each leaf node in the tree is also specified by a set of annotations in the file. Referring to FIG. 12, each leaf node in the tree is annotated with a unique identifier 108, label 110, binary value 112, file name 114, and integers 116. Each leaf node is also annotated with a script name 118 specifying the name of the script associated with the leaf node and a static parameter 120 which is used in the script to parameterize the behavior. Each leaf node is further annotated with an action type 122 indicating the type of action the leaf node represents. Action type 122 is used by the agent applications to perform state transitions, as will be described in detail below.

Each leaf node in the tree is additionally annotated with three mood ratings 124, 126, and 128 on three corresponding mood dimensions. The mood ratings are used by the agent applications to determine a feasibility rating and a desirability rating of the behavior represented by the leaf node, as will be described in detail below. In the preferred embodiment, each mood rating is an integer between −10 and +10, or a constant "NA" if a mood dimension is not applicable to the leaf node.

Each leaf node is further annotated with additional attribute values indicating other attributes of the behavior represented by the leaf node. The additional attribute values are also used by the agent applications to determine the desirability rating of the behavior represented by the leaf node, as will be described in detail below. In the preferred embodiment, the additional attribute values include a quality value 130, an interaction value 132, and an instrument value 134.

Quality value 130 indicates a quality of the behavior represented by the leaf node, e.g. funny, scary, new, or repeated. Interaction value 132 indicates whether or not the behavior represented by the leaf node includes an interaction with another character. Instrument value 134 indicates an instrument of the behavior represented by the leaf node, e.g. pogo stick for a HOP behavior or "NA" if no instrument is applicable to the behavior.

World Model

Figure 13:
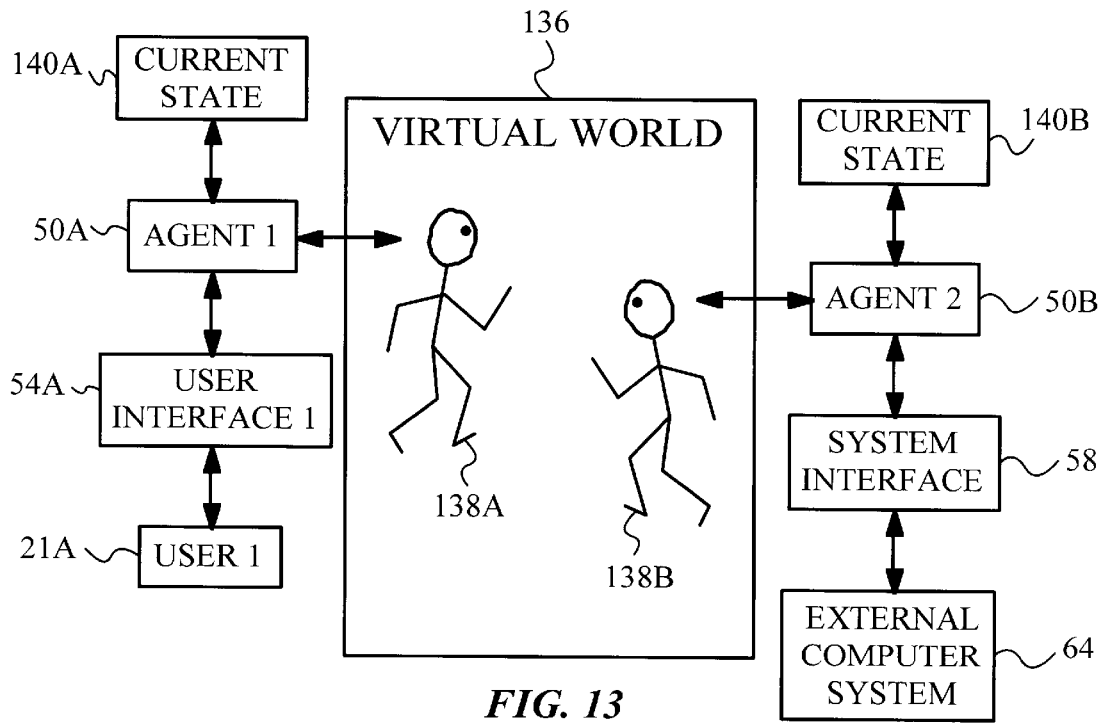
FIG. 13 is a schematic illustration of first and second characters in a virtual world.
Figure 25:
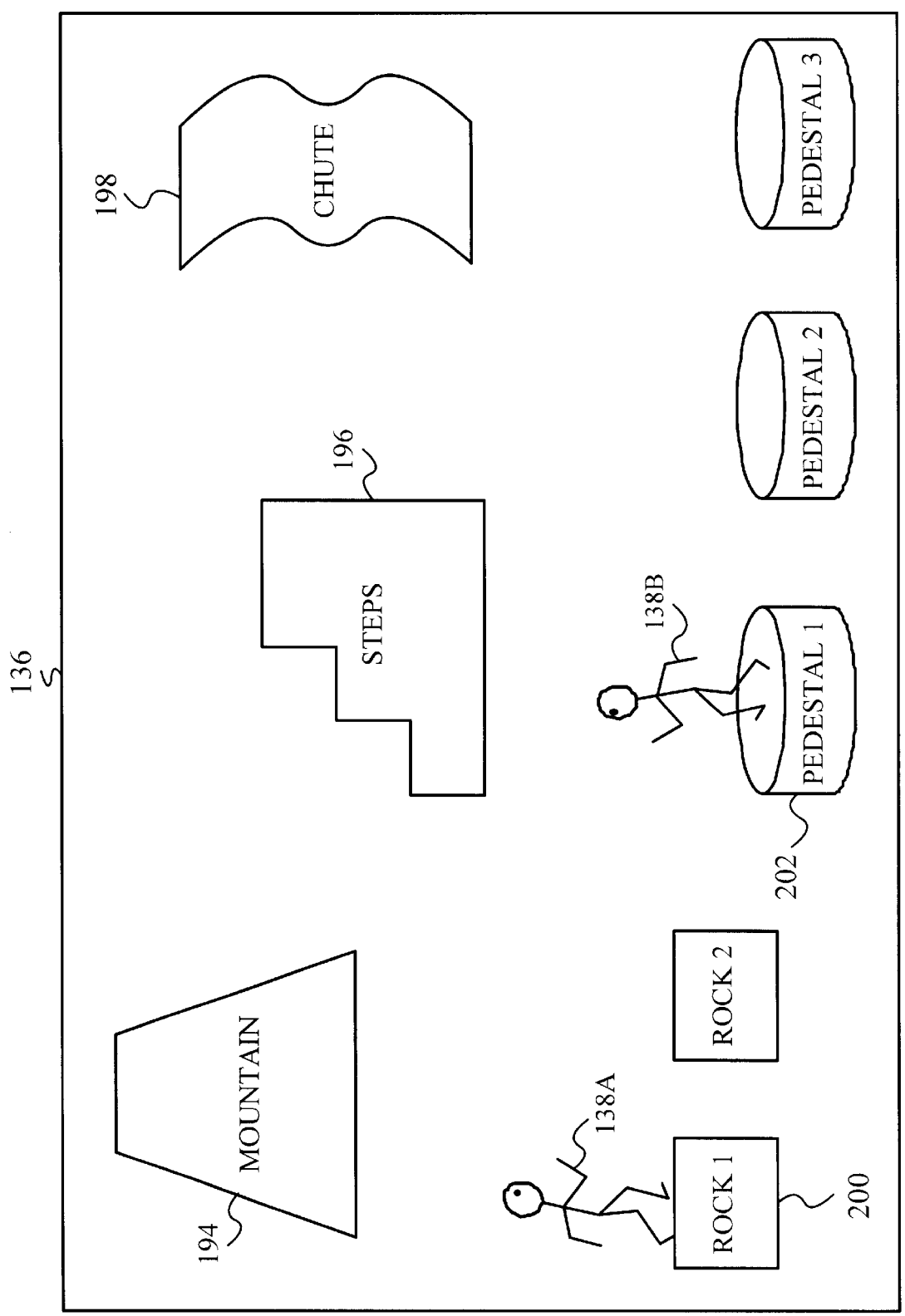
FIG. 25 is a schematic illustration of the virtual world of FIG. 13 as it appears on the monitor of the client workstation of FIG. 4.

FIG. 13 shows first and second characters 138A and 138B in a virtual world 136. Characters 138A and 138B are driven by agent applications 50A and 50B, respectively, to execute behaviors in virtual world 136. FIG. 25 shows a schematic drawing of virtual world 136 as it appears on the monitor of client workstation 14. It is to be understood that the depiction of virtual world 136 illustrated in FIG. 25 is a simplistic depiction and represents just one possible world. The virtual worlds used in alternative embodiments may be much more complex. Specific techniques for creating virtual worlds for computer characters are well known in the art.

Virtual world 136 includes a mountain 194, steps 196, a chute 198, two rocks 200, and three pedestals 202. Each agent application's model of virtual world 136 includes static data representative of possible destinations in virtual world 136 and real-time data representative of the current locations of characters 138A and 138B in virtual world 136.

Referring to FIG. 26, the static data representative of the possible destinations is stored in a destination tree 204. The information for destination tree 204 is preferably stored in a file on hard disk 26, read in by the agent applications at run time, and stored in local main memory 24. Destination tree 204 includes parent nodes 206, e.g. ROCKS, STEPS, and PEDESTALS. Destination tree 204 also includes leaf nodes 208, e.g. ROCK 1, ROCK 2, MOUNTAIN, CHUTE, STEP 1, STEP 2, etc.

Referring to FIG. 27, each node in the destination tree is annotated with a unique identifier 210 which determines the position of the node in the tree. Each unique identifier is defined recursively as the unique identifier of its parent concatenated with a two-character string that starts at "00" for the first child and increments to "01", "02", ..., "99" for successive children. The root node's unique identifier is the empty string. Each node in the destination tree is also annotated with a label string 212. Leaf destination nodes are further annotated with (x,y) coordinates 214 indicating the location in the virtual world of the destination represented by the node.

Current State

Referring again to FIG. 13, first character 138A has a current state 140A and second character 138B has a current state 140B. Each agent application uses various aspects of the current state of its associated character to determine the feasibility and desirability of the possible behaviors for the character.

Figure 14:
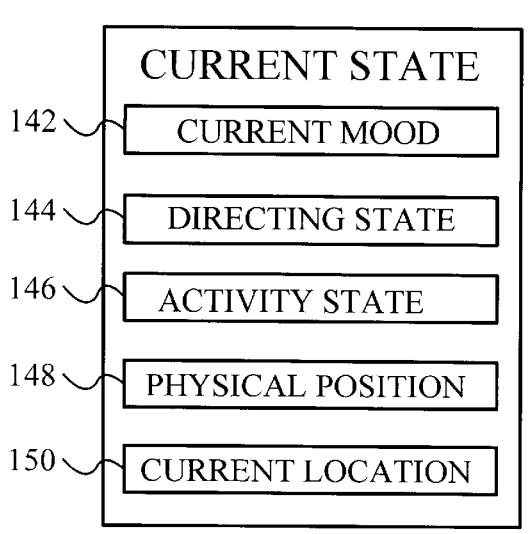
FIG. 14 is a block diagram illustrating the components of each character's current state.

Referring to FIG. 14, the current state of each character includes a current mood 142, a directing state 144, an activity state 146, a current physical position 148, and a current location 150 of the character in the virtual world. The current state of each character is represented by state data stored in the local main memory of workstation 12. The following four sections focus on the data structures used in the preferred embodiment to represent each aspect of a characters current state. For simplicity, the discussion describes the data structures used to represent the current state of first character 138A. It is to be understood that an identical set of data structures is used to represent the current state of character 138B.

Current Mood

Figure 15:
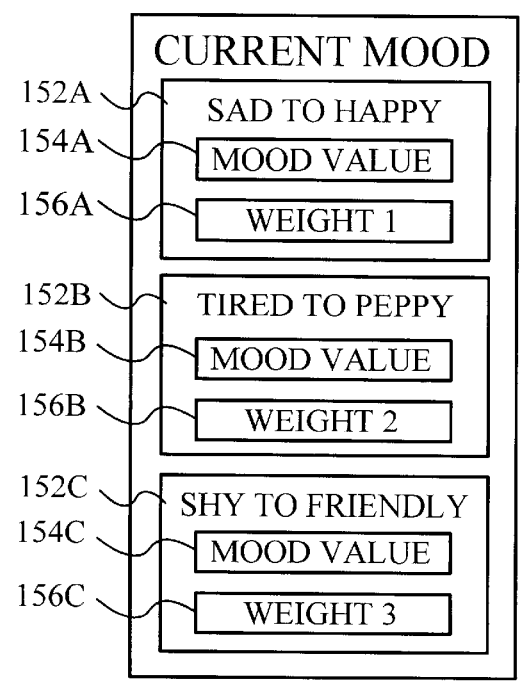
FIG. 15 is a block diagram illustrating a representation of the first character's current mood.

Referring to FIG. 15, the first character's current mood is represented by three mood values on three corresponding mood dimensions. The mood dimensions include an emotional dimension 152A, e.g. sad to happy, an energy dimension 152B, e.g. tired to peppy, and a friendliness dimension 152C, e.g. shy to friendly. Mood values 154A, 154B, and 154C represent the character's current mood on mood dimensions 152A, 152B, and 152C, respectively. In alternative embodiments, other mood dimensions may be used in place of or in addition to mood dimensions 152A, 152B, and 152C.

In the preferred embodiment, each mood value is an integer value between −10 and +10. Of course, alternative representations of the character's current mood are possible in alternative embodiments. Mood dimensions 152A, 152B, and 152C also include weights 156A, 156B, and 156C, respectively. The weights are for weighting the relative importance of each mood dimension in determining feasibility and desirability ratings of the possible behaviors, as will be described in detail below.

Referring again to FIG. 13, each agent application updates the mood values of its associated character in response to mood directions received from an external source. In the preferred embodiment, the directions to adjust the mood values are received through one or more of the interfaces. For example, the directions are received from user 21A through user interface application 54A. Mood directions are also received from external computer system 64 through system interface 58.

Each agent application also updates the mood values of its associated character in response to the occurrence of a specified event. A list of specified events and corresponding instructions for changing the mood values are preferably stored in a file on hard disk 26, read in by the agent applications at run time, and stored in local main memory 24. Of course, those skilled in the art will recognize that an enumerated list is only one of several ways in which the specified events and corresponding instructions for changing the mood values may be stored. Any suitable data structure for storing the specified events and their corresponding effects on the mood values may be used in alternative embodiments.

In the preferred embodiment, the events which trigger updates in the mood values include the execution of a specified behavior by the first character, the execution of a specified behavior by the other character, or a passage of a specified time period. For example, if the first character executes a HOP behavior, its energy mood value is decreased by 1 to reflect fatigue caused by the hopping. Similarly, if the second character performs a SAY HI behavior, the first character's friendliness mood value is increased by 3. This reflects a life-like increase in the first character's friendliness upon being greeted by another character.

Of course, these are just examples of some of the events which may be used to trigger updates in the mood values. It will be apparent to one skilled in the art that the instructions may specify many other events and their corresponding effects on the mood values.

Behavioral Directions

Each character's directing state is represented by one or more current behavioral directions for the character. Each behavioral direction constrains an attribute value of the behavior to be executed by the character. FIG. 16 shows a sample table containing the first character's current behavioral directions. Each row in the table contains a respective behavioral direction for the character. Each behavioral direction includes the name of the attribute constrained by the direction, a corresponding constraint value, and a corresponding weight for weighting the relative importance of the behavioral direction. The weights are used in determining desirability ratings of behaviors, as will be described in detail below.

In the preferred embodiment, the behavioral directions include a node direction 158, a destination direction 160, a quality direction 162, an interaction direction 164, and an instrument direction 166. Not all of the possible behavioral directions need be set concurrently. At any point in time, the character may have zero, one, or multiple behavioral directions constraining its behavior.

The constraint value of node direction 158 is the unique identifier of a node in the tree of possible behaviors, hereafter referred to as the behavior constraint node. Node direction 158 directs the character to perform a behavior represented by a leaf behavior node which is equal to or a child of the behavior constraint node. For example, if the behavior constraint node is the MOVE node, the node direction directs the character to perform a HOP, SHUFFLE, or LEAP behavior.

Similarly, the constraint value of destination direction 160 is the unique identifier of a node in the destination tree, hereafter referred to as the destination constraint node. Destination direction 160 directs the character to move to a destination represented by a leaf destination node which is equal to or a child of the destination constraint node. For example, if the destination constraint node is the ROCKS node, the destination direction directs the character to move to ROCK 1 or ROCK 2.

Quality direction 162 has a constraint value indicating a desired quality of the behavior to be executed by the character. For example, quality direction 162 may direct the character to perform a new, repeated, scary, or funny behavior. The constraint value of interaction direction 164 indicates if the behavior to be executed by the character should be a behavior which includes an interaction with another character or be a behavior which is performed alone. Instrument direction 166 has a constraint value indicating a desired instrument of the behavior to be executed by the character.

Each agent application compares the constraint values specified in the behavioral directions to the annotated attribute values of the possible behaviors to determine the desirability ratings of the behaviors, as will be described in detail below. Of course, the invention is not limited to the specific attributes and corresponding behavioral directions described in the preferred embodiment. It will be apparent to one skilled in the art that each possible behavior may be annotated with values for many different types of attributes, and that each attribute value may be constrained by a corresponding behavioral direction.

Referring again to FIG. 13, the behavioral directions for the characters are received from users through the user interface applications and from external computer system 64 through system interface application 58. Behavioral directions for the characters may also be stored in an abstract script which is read in by the agent applications at run time and stored in local main memory 24. In the preferred embodiment, each agent application also updates the behavioral direction for its associated character in response to the occurrence of a specified event. A list of specified events and corresponding instructions for changing the behavioral direction are preferably stored in a file on hard disk 26, read in by the agent applications at run time, and stored in local main memory 24.

The events which trigger updates in the behavioral directions preferably include the execution of a specified behavior by the first character or the execution of a specified behavior by the other character. For example, if the second character executes one or more PLAY ALONE behaviors for a predetermined period of time, the first character's node direction 158 is updated to ASK PLAY node to direct the first character to invite the second character to play. As a second example, if the second character declines an invitation to play, the first character's interaction direction 164 is updated to ALONE to direct the first character to execute a behavior which is performed alone.

Of course, these are just examples of some of the events which may be used to trigger updates in the behavioral directions. It will be apparent to one skilled in the art that the instructions may specify many other events and their corresponding effects on the behavioral directions.

Current Location and Physical Position

Referring to FIG. 17, the first character's current physical position is represented by a position variable 168 which indicates whether the character's eyes are open or closed. Alternative embodiments include variables indicating many other physical positions, such as whether the character is lying down, standing up, etc. A weight 169 is also stored for weighting the relative importance of the character's current physical position in determining desirability ratings, as will be described in detail below.

Referring to FIG. 18, the current location of the first character is represented by a location variable 170 which stores the current (x,y) coordinates of the first character in the virtual world. Similarly, the current location of the second character is represented by a location variable 172 which stores the current (x,y) coordinates of the second character in the virtual world. Location variable 170 is updated each time the first character's agent application sends a movement behavior to the animator. Location variable 172 is updated each time the first character's agent application receives a perception message packet from the animator indicating that the other character has moved.

FIG. 20 shows a sample perception message packet 178 transmitted by the animator application to each agent application. As will be described below, the animator application transmits a perception message packet to each agent application after the execution of a behavior by either one of the characters. Message packet 178 includes a string 180 containing the unique identifier of the behavior executed and an integer 182 identifying which character executed the behavior. Message packet 178 also includes a string 184 indicating the action type of the executed behavior. If the executed behavior is a movement behavior, message packet 178 also includes integers 186 indicating the (x,y) coordinates of the character's new location in the virtual world.

Activity State

Each character's current interaction with the other character is represented by an activity state. A list of the activity states used in the preferred embodiment is shown in FIG. 21. For example, if a character is playing alone, the character's activity state is PLAYING ALONE STATE. If the character is playing with the other character, the character's activity state is PLAYING TOGETHER STATE.

Referring to FIG. 19, the current activity state of the first character is represented by an activity state variable 174. Another variable 176 indicates the unique identifier of the last behavior executed by the second character. Each agent application updates its run time representation of its character's activity state whenever it directs the character to execute a behavior and whenever it receives a perception message packet from the animator indicating that the other character has executed a behavior.

Transitions between activity states are determined by the action types of the executed behaviors. FIG. 22 lists the action types used in the preferred embodiment. Most of the action types are self-explanatory. For example, each of the possible PLAY ALONE behaviors has an action type of PLAY ALONE ACT. Each of the possible SAY HI behaviors has an action type of HI ACT. However, not all of the possible behaviors have an effect on the state of interaction between the characters. For example, a HOP behavior does not change the interaction between the characters. Each behavior which has no effect on the state of interaction between the characters has an action type of NO ACT.

Each agent application determines the appropriate transition, if any, in its character's activity state whenever it directs the character to execute a behavior and whenever it receives a perception message packet from the animator indicating that the other character has executed a behavior. FIG. 23A is a textual description of the transitions in the first character's activity state which result from behaviors executed by the first character. FIG. 23B is a textual description of the transitions in the first character's activity state which result from behaviors executed by the second character.

Figure 24:
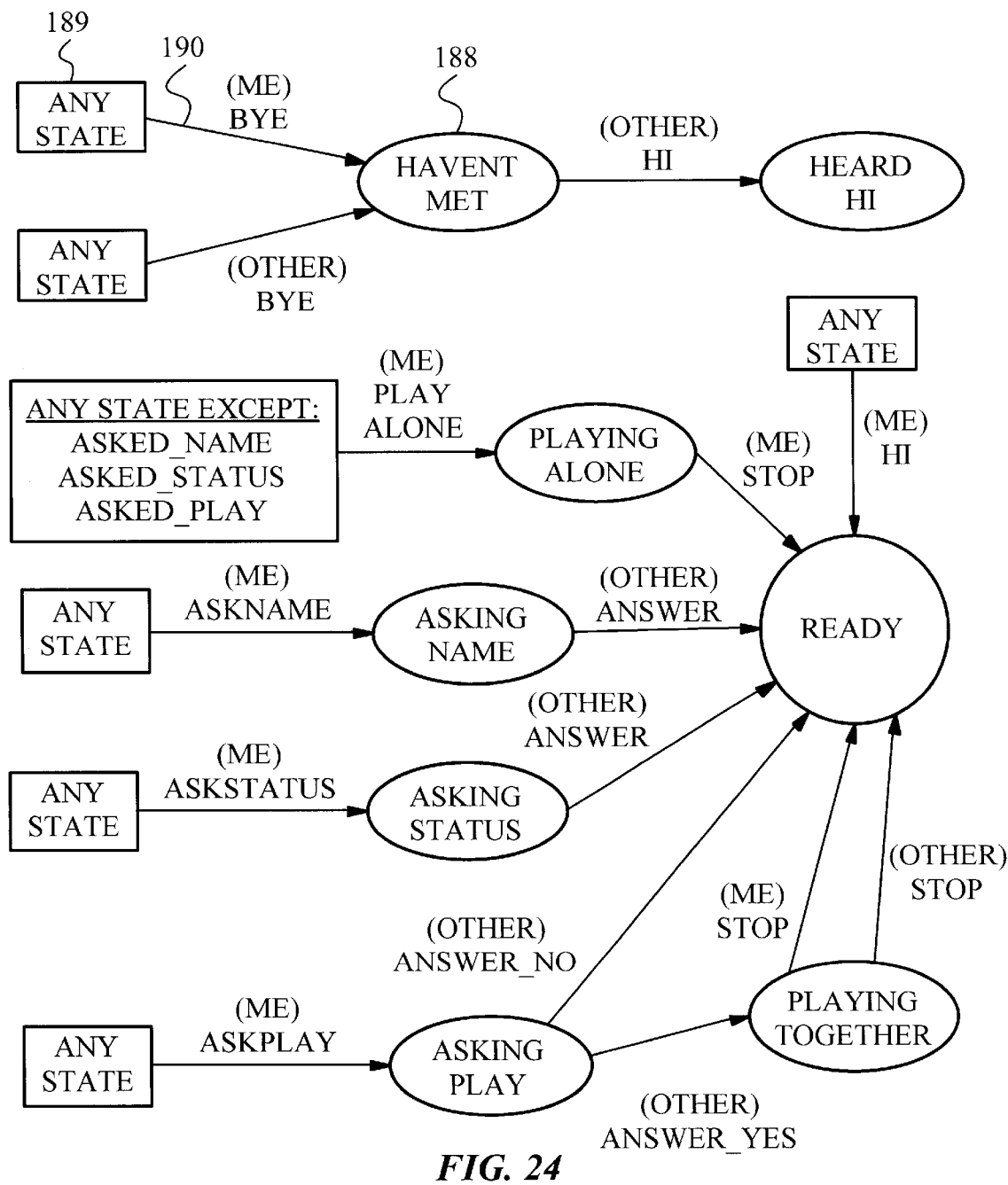
FIG. 24 is a schematic block diagram illustrating transitions in the first character's activity state.

For ease of understanding, FIG. 24 illustrates some of the transitions in the first character's activity state in flow diagram form. Individual activity states are represented by ovals 188. Sets of activity states are represented by rectangles 189. Action types of behaviors executed by the characters are represented by arrows 190. For example, if the first character executes a behavior having an action type of BYE ACT, the first character's activity state transitions from its current value to HAVENTMET STATE.

User Interface

FIG. 28 is a schematic diagram of a sample user interface screen 216 for presenting to a user a set of directing alternatives and for receiving from the user behavioral directions for a character. In the preferred embodiment, each character is associated with its own agent/user interface pair, and a respective interface screen is presented on each user terminal. The directing alternatives are preferably presented on each interface screen as icons.

The icons are selected by the user to enter the behavioral directions.

The icons include physical behavior icons 224 and verbal behavior icons 226. Physical behavior icons 224 represent nodes in the physical behavior branch of the behavior tree. Verbal behavior icons 226 represent nodes in the verbal behavior branch of the behavior tree. The directing alternatives also include a set of alternative destinations from the destination tree. The alternative destinations are displayed on screen 216 as white circles 220 on a map of the virtual world. Sets of directing alternatives are sent from each agent application to its associated user interface application in menu item message packets.

Figure 29:
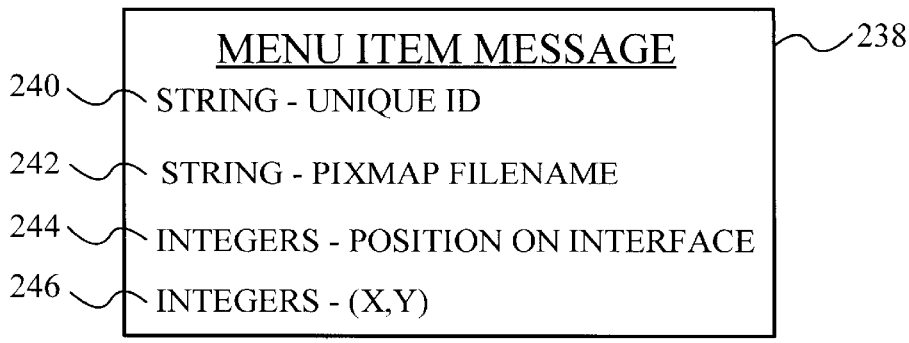
FIG. 29 is a block diagram illustrating components of a menu item message packet according to the preferred embodiment of the invention.

FIG. 29 shows a sample menu item message packet 238. Each directing alternative representing a physical or verbal behavior node is defined in message packet 238 by a string 240 containing the unique identifier of the node, a string 242 containing the name of the file containing the pixmap representation of the icon to be displayed, and integers 244 indicating the position on the interface in which the icon should be displayed.

Each directing alternative corresponding to an alternative destination is defined in message packet 238 by integers 246 indicating the (x,y) coordinates of the destination. Each user interface application receives a respective menu item message packet from its associated agent application and displays the directing alternatives on its respective interface screen.

Referring again to FIG. 28, interface screen 216 also includes instrument icons 230 for entering behavioral directions constraining an instrument of the behavior to be executed, quality icons 232 for entering behavioral directions constraining a quality of the behavior to be executed, and interaction icons 234 for entering behavioral directions constraining the interaction of the behavior to be executed. Screen 216 further includes an enter button 236 and a quit button 237.

When a user clicks his or her pointing device within a critical distance of a destination circle, the circle is colored black, as shown by circle 218. When the user selects one of the icons on screen 216, the icon is highlighted. To enter behavioral directions for a character, the user selects one or more of the icons, and if desired, one of the destination circles, and presses enter button 236. The interface application then creates a menu choice message packet containing the selected behavioral directions and sends the message packet to its associated agent application.

Figure 30A:
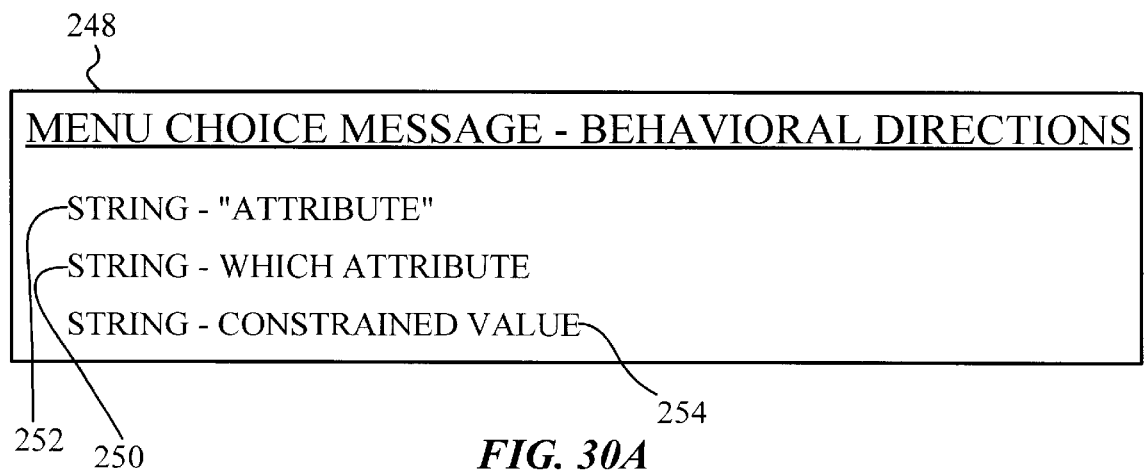
FIG. 30A is a block diagram illustrating components of a menu choice message packet containing behavioral directions according to the preferred embodiment of the invention.

FIG. 30A shows a sample menu choice message packet 248 containing behavioral directions. Message packet 248 includes a header 250 containing the string "ATTRIBUTE" as the unique identifier. Each behavioral direction is defined in message packet 248 by a string 252 containing the name of the attribute constrained by the direction and a string 254 indicating the constraint value selected by the user.

If the user selects a physical or verbal behavior icon representing a node in the behavior tree, the name of the constrained attribute is "NODE" and the constraint value is the unique identifier of the selected node, e.g. 0000 for the MOVE node. If the user selects a destination circle, the name of the constrained attribute is "DESTINATION" and the constraint value is the unique identifier of the selected destination, e.g. 0000 for ROCK 1. If the user selects a quality icon, the name of the constrained attribute is "QUALITY" and the constraint value is the quality selected by the user, e.g. "FUNNY". The agent application receives message packet 248 and stores the names of the constrained attributes and corresponding constraint values in local main memory, as shown in FIG. 16.

Figure 30B:
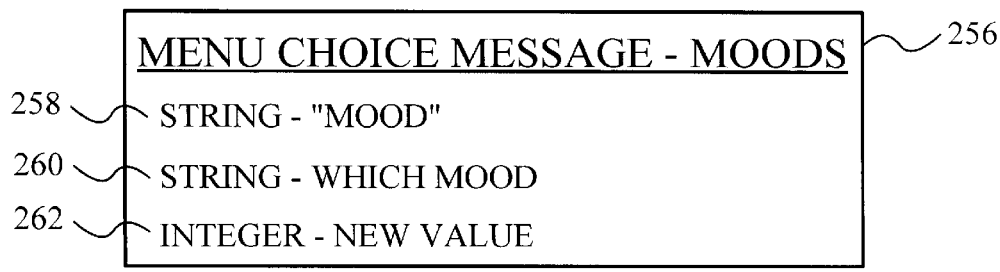
FIG. 30B is a block diagram illustrating components of a menu choice message packet containing mood directions according to the preferred embodiment of the invention.

Referring again to FIG. 28, screen 216 also includes three adjustable mood sliders 222A, 222B and 222C for displaying the character's current mood values on the three mood dimensions. When the user moves any one of the mood sliders with his or her pointing device, the interface application creates a menu choice message packet 256, as shown in FIG. 30B. Message packet 256 includes a header 258 containing the string "MOOD" as the unique identifier, a string 260 indicating which mood value was changed, and a string 262 containing the new mood value. The interface application sends message packet 256 to its associated agent application, and the agent application updates the mood value appropriately.

Operation

Figure 31A:
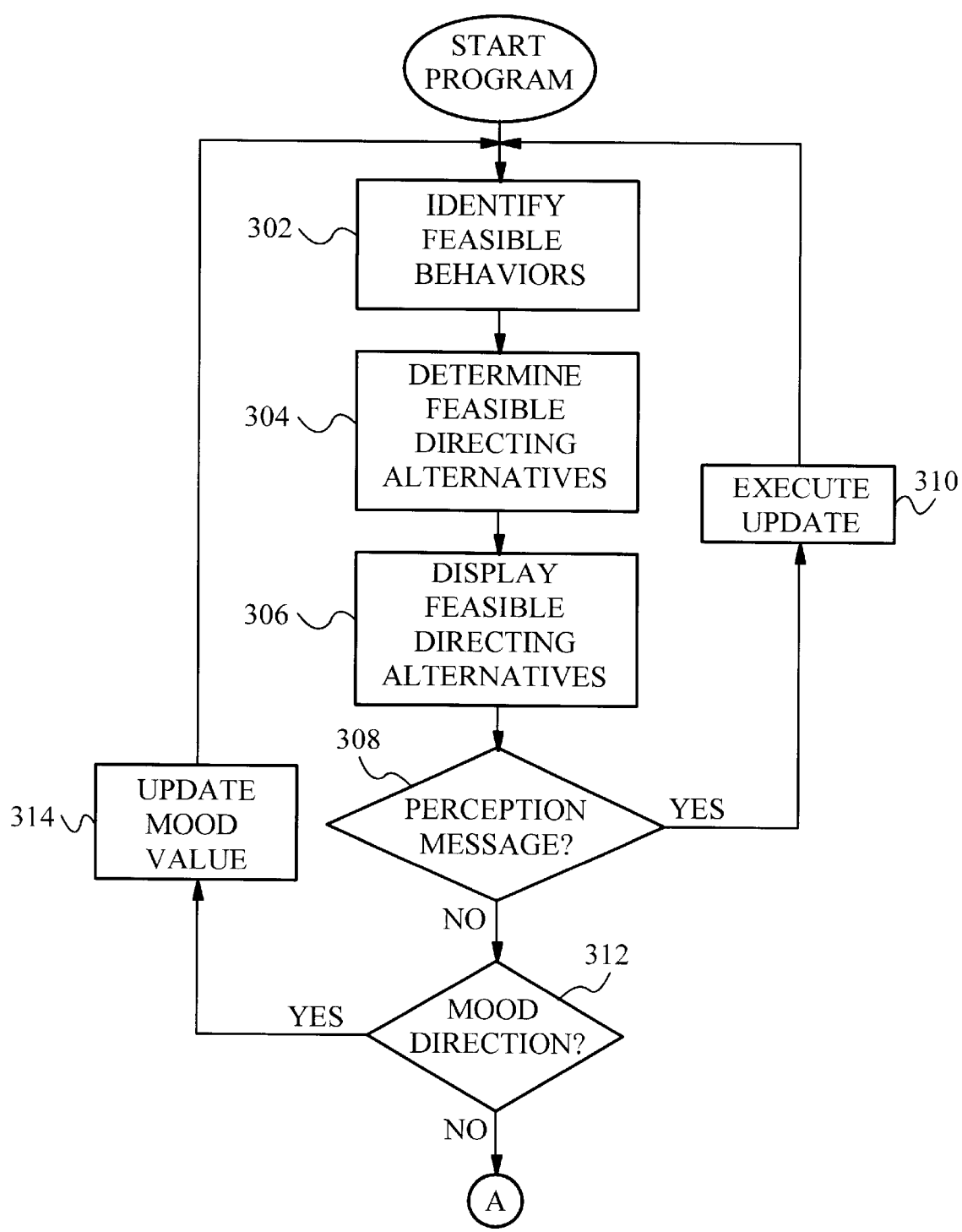
FIG. 31A is a flow diagram illustrating a control program executed by the system of FIG. 1 in the preferred embodiment of the invention.
Figure 31B:
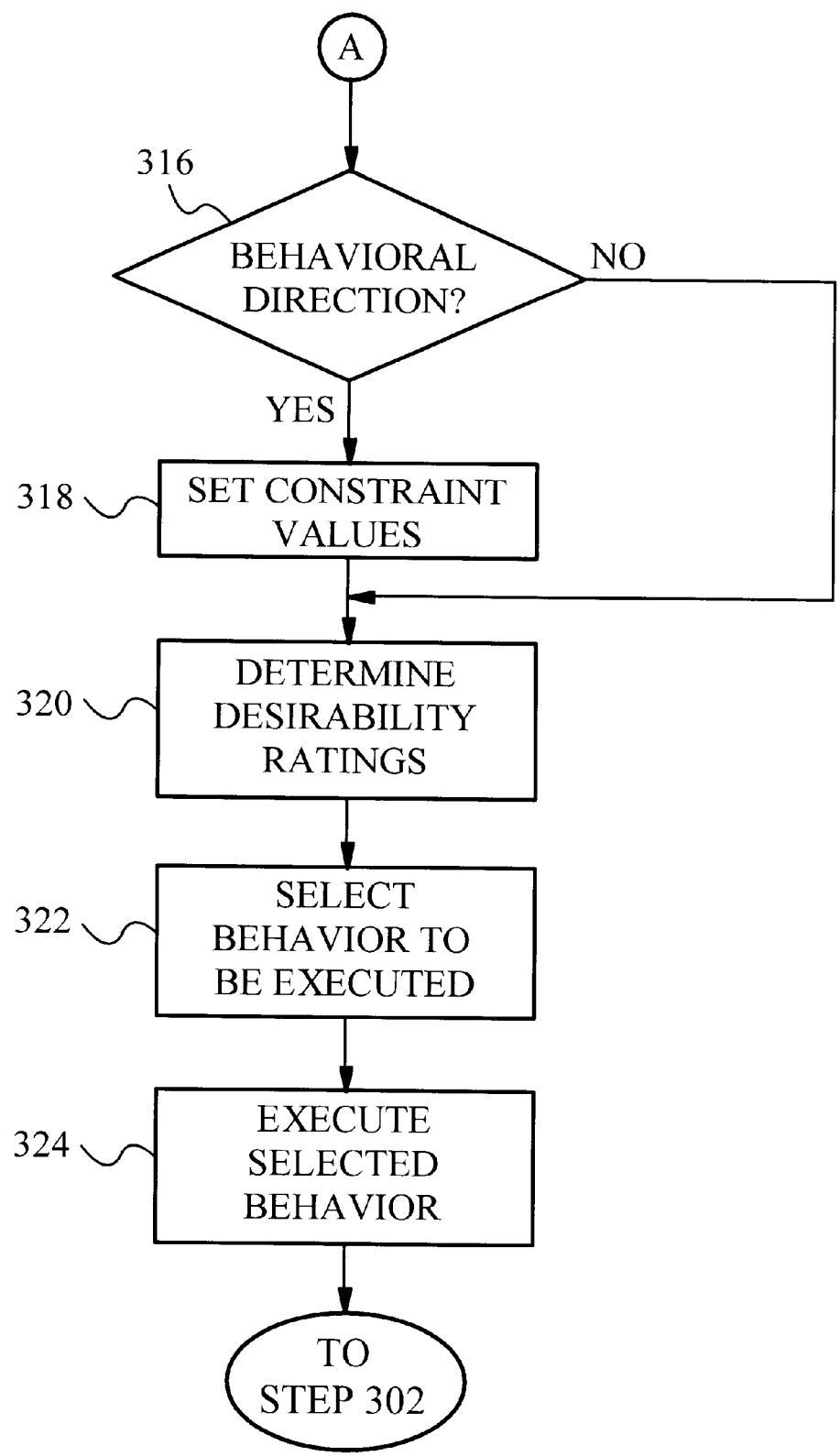
FIG. 31B is a continuation of the flow diagram of FIG. 31A.

The operation of the preferred embodiment is illustrated in FIGS. 1–50. FIG. 31A is a flow diagram illustrating each agent application's overall flow of control in directing the behavior of its respective character. FIG. 31B is a continuation of the flow diagram of FIG. 31A. For simplicity, the operation of the preferred embodiment is described in reference to steps executed by the first agent application to control the behavior of the first character. It is to be understood that the second agent application performs analogous steps to control the behavior of the second character.

In step 302, the first agent application executes a function to identify from the set of possible behaviors a subset of feasible behaviors for the first character in its current state. The steps included in the function are illustrated in the flow diagram of FIG. 32 and will be described in detail below. The function receives as an input one of the behavior nodes from the tree of possible behaviors and returns a subset of feasible behaviors nodes which are grouped under the input behavior node. Initially, the root node of the behavior tree is input to the function so that all behaviors are evaluated for feasibility. In subsequent executions of the function, lower nodes are input to the function to limit the behaviors evaluated for feasibility, as will be described below.

The agent application also executes a similar function to identify from the set of possible destinations a subset of feasible destinations for the character in its current state. This function receives as an input one of the destination nodes from the destination tree and returns a subset of feasible destination nodes which are grouped under the input destination node. Initially, the root node of the destination tree is input to the function so that all destinations are evaluated for feasibility. In subsequent executions of the function, lower destination nodes are input to the function to limit the destinations evaluated for feasibility, as will be described below.

In step 304, the first agent application determines which directing alternatives are feasible in the current state and selects the directing alternatives to be displayed on the first user interface in dependence upon their feasibility. Referring again to FIGS. 11–12, each node in the behavior tree is annotated with a boolean value 112 indicating if the node should be presented as a directing alternative on the user interface.

In the preferred embodiment, each behavior node is presented as a feasible directing alternative if it is determined to be feasible in step 302 and if its boolean value indicates that it should be presented on the user interface. Of course, only as many behavior nodes as will fit on the interface have a boolean value indicating that they should be presented. Each destination node determined to be feasible in step 302 is also selected for presentation as a feasible directing alternative.

In step 306, the feasible directing alternatives are displayed on the user interface. To display the feasible directing alternatives, the first agent application generates and transmits to the first user interface application one large menu item message containing each of the feasible directing alternatives. The first user interface application receives the menu item message and displays the feasible directing alternatives on the interface screen, as shown in FIG. 28.

The physical behavior nodes are displayed as icons 224 and the verbal behavior nodes are displayed as icons 226. Blank icons 228 represent behavior nodes which were not determined to be feasible in step 302, and are therefore not displayed as feasible directing alternatives. In the preferred embodiment, instrument icons 230, quality icons 232, and interaction icons 234 are always displayed on the interface, as are mood sliders 222A, 222B, and 222C.

In step 308, the first agent application determines if a perception message has been received from the animator application. If a perception message has not been received, the agent application proceeds to step 312. If a perception message has been received, the agent application executes an update subprogram to update the current state of the first character in step 310. The steps included in the update subprogram are illustrated in the flow diagram of FIG. 38 and will be discussed in detail below. Following step 310, the agent application returns to step 302 to identify a new subset of feasible behaviors for the first character in its new current state.

In step 312, the agent application determines if a menu choice message packet containing a mood direction for its character has been received. If a mood direction has not been received, the agent application proceeds to step 316. If a mood direction has been received, the agent application updates the mood value specified in the menu choice message packet with the new value in step 314. Following step 314, the agent application returns to step 302 to identify a new subset of feasible behaviors for the first character given the new mood value.

In step 316, the agent application determines if a menu choice message packet containing one or more behavioral directions for its character has been received. If no behavioral directions have been received, the agent application proceeds to step 320. If one or more behavioral directions has been received, the agent application sets the constraint value for each behavioral direction specified in the menu choice message packet in step 318. To set the constraint value, the agent application stores the name of the constrained attribute and the corresponding constraint value, as shown in the table of FIG. 16. Following step 318, the agent application proceeds to step 320.

In step 320, the agent application repeatedly executes a desirability rating function to determine a respective desirability rating of each of the feasible behaviors identified in step 302. The steps included in the desirability rating function are illustrated in the flow diagram of FIGS. 39A–39B and will be described in detail below. The desirability rating function receives as an input a leaf behavior node and returns a desirability rating of the leaf behavior node. In the preferred embodiment, only leaf behavior nodes are evaluated for desirability. Non-leaf behavior nodes are not evaluated for desirability since they represent classes of behaviors rather than actual executable behaviors.

The agent application also repeatedly executes a destination rating function to determine a respective desirability rating of each of the feasible destinations. The steps included in the destination rating function are illustrated in the flow diagram of FIG. 41 and will be described in detail below. The destination rating function receives as an input a destination leaf node and returns a desirability rating of the destination leaf node. In the preferred embodiment, only leaf destination nodes are evaluated for desirability. Non-leaf destination nodes are not evaluated for desirability since they represent classes of destinations rather than actual destinations.

In step 322, the agent application executes a selection algorithm to select a behavior to be executed by its character from the subset of feasible behaviors identified in step 302. The steps included in the selection algorithm are illustrated in the flow diagram of FIG. 42 and will be described in detail below. If the selected behavior is a movement to a destination, the agent application also executes the selection algorithm to select the destination from the feasible destinations identified in step 302.

In step 324, the selected behavior is executed by the character. Referring again to FIG. 12, each leaf node in the tree of possible behaviors is annotated with a name 118 of a script which specifies how to execute the behavior. The scripts are kept in a file on hard disk 26 and loaded into main memory 24 of workstation 12 at run time. The steps included in the execution of a script are illustrated in the flow diagram of FIGS. 50A–50C and will be described in detail below. Following step 324, the agent application returns to step 302 to identify a new subset of feasible behaviors for its character, and the control cycle is repeated.

Identify Feasible Behaviors

Figure 32:
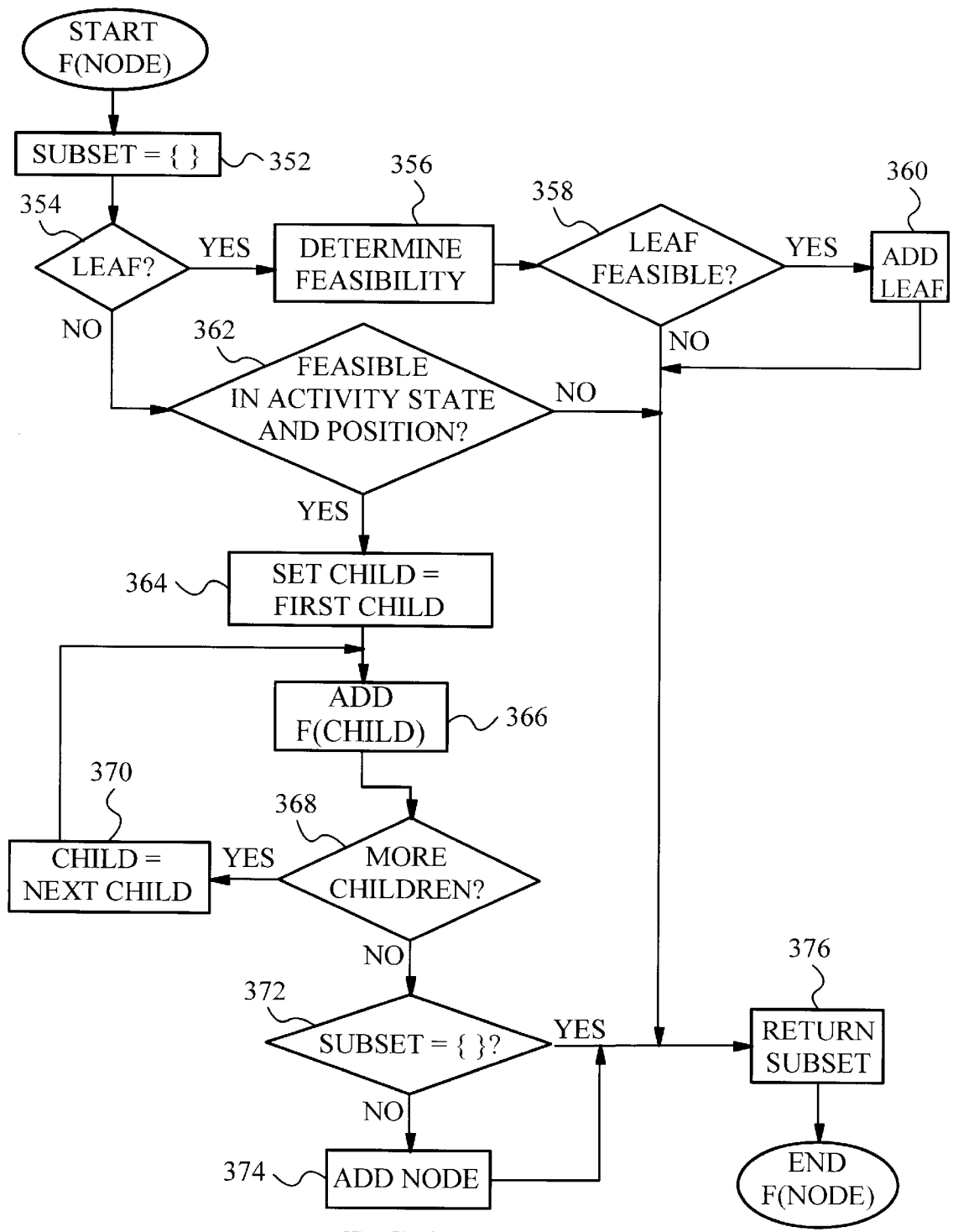
FIG. 32 is a flow diagram illustrating a function called in the control program of FIGS. 31A–31B to identify a subset of feasible behaviors.

FIG. 32 is a flow diagram illustrating the function executed to identify from the set of possible behaviors a subset of feasible behaviors for the character in its current state. The function receives as an input one of the behavior nodes from the behavior tree and returns a subset of feasible behaviors nodes which are grouped under the input behavior node. In the preferred embodiment, the character's activity state, mood values, and physical position are used to determine feasibility. However, in alternative embodiments, different combinations of state data may be used to identify the subset of feasible behaviors.

In step 352, the function is initialized by setting the subset of feasible behaviors equal to the empty set. In step 354, it is determined if the input node is a leaf node. If the input node is not a leaf node, the function proceeds to step 362. If the input node is a leaf node, a subfunction is executed in step 356 to evaluate the leaf node for feasibility. The steps included in the subfunction are shown in the flow diagram of FIG. 33 and will be described in detail below. In step 358, it is determined if the leaf node is feasible. If the leaf node is not feasible, the function proceeds to step 376. If the leaf node is feasible, it is added to the subset of feasible behaviors in step 360. Following step 360, the function proceeds to step 376.

In step 362, it is determined if the input node is feasible in the character's current activity state and current physical position. FIG. 36 is a textual description of which behaviors are feasible in which activity states and of which behaviors are feasible given the status of the character's eyes. For example, assume that the character's current activity state is the HAVENTMET STATE. The ASK node, ANSWER node, and BYE node are not feasible. In the preferred embodiment, each activity state is associated with its own individual activity state table which is stored in a file on hard disk 26, read in by the agent applications at run time, and stored in local main memory 24.

Figures 37, 38:
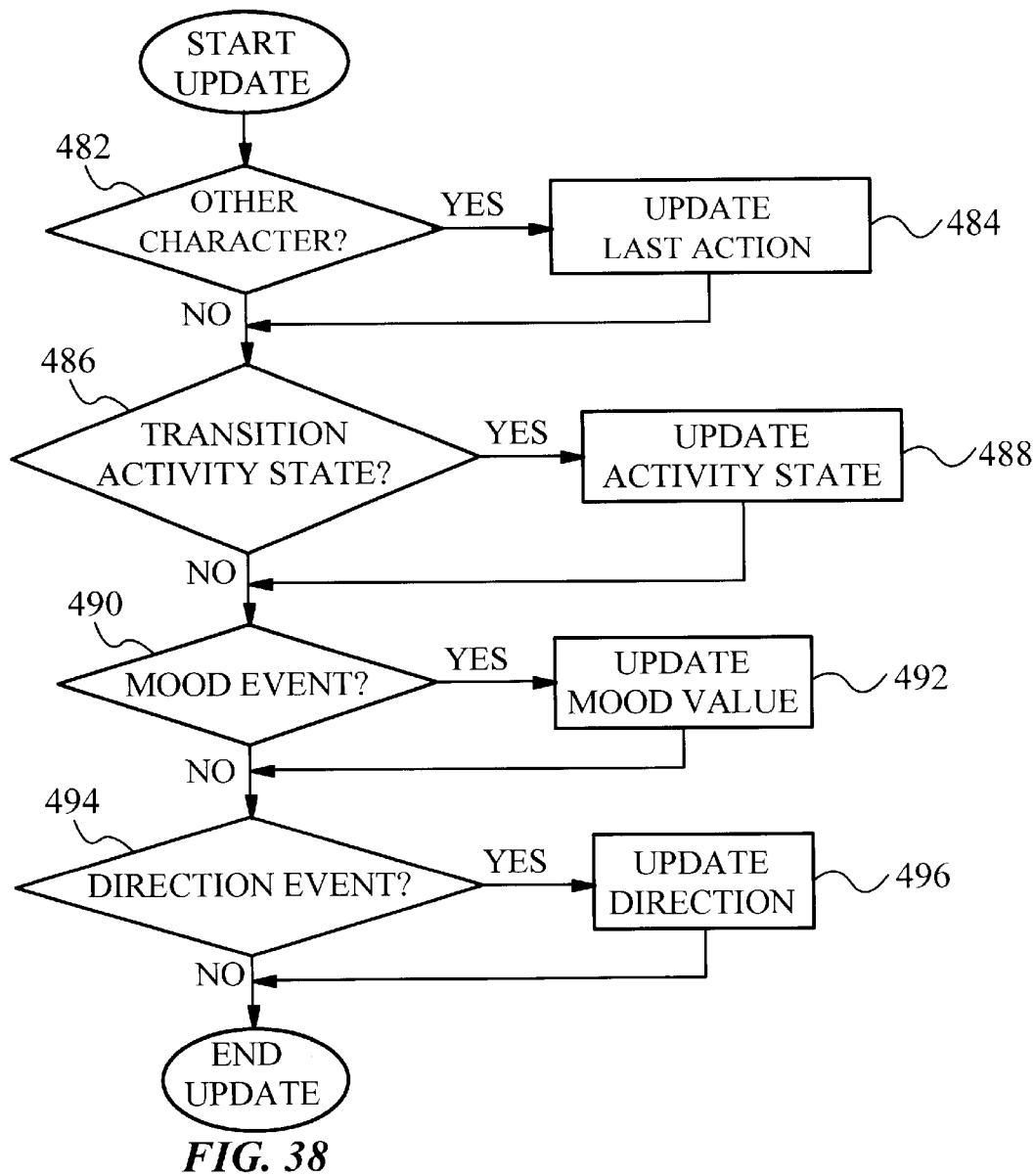
FIG. 37 is an activity state table according to the preferred embodiment of the invention.
FIG. 38 is a flow diagram illustrating a subprogram called in the control program of FIGS. 31A–31B to update the first character's current state.

FIG. 37 illustrates a generic table for an activity state. The table includes a first column containing the unique identifier of each node in the behavior tree and a second column containing a corresponding boolean value for each node. The boolean value indicates if the node is feasible in the activity state. The table also includes a third column containing a corresponding desirability value for the node and a fourth column containing a corresponding weight for weighting the desirability value. The weights and desirability values are used in determining desirability ratings of the nodes, as will be described in detail below.

Referring again to FIG. 32, if it is determined in step 362 that the input node is not feasible in the character's current activity state and physical position, the function proceeds to step 376. If the input node is feasible in the character's current activity state and physical position, the input node's children are recursively evaluated for feasibility in steps 364–370. To evaluate each child node, the function calls itself using the child node as the input node.

In step 364, the first child node of the input node is selected for evaluation. In step 366, the function calls itself using the child node as the new input node. The function returns all feasible behavior nodes grouped under the child node. The feasible behavior nodes which are returned are then added to the subset of feasible behavior nodes. In step 368 it is determined if the input node has more children. If the input node does not have more children, the function proceeds to step 372.

If the input node has more children, the next child node of the input node is selected for evaluation in step 370. Following step 370, the function returns to step 366 and calls itself again using the next child node as the new input node. This loop continues until all children of the original input node have been evaluated for feasibility. Of course, in evaluating each child node, the function may recursively call itself if the child node is itself a parent node.

In step 372, it is determined if the subset of feasible behavior nodes is equal to the empty set. If the subset of feasible behavior nodes is equal to the empty set, the function proceeds to step 376. If the subset of feasible behavior nodes is not equal to the empty set, the function adds the input node to the subset of feasible behavior nodes in step 374. Thus, in the preferred embodiment, parent nodes are deemed feasible only when they include at least one feasible child node. Following step 374, the function proceeds to step 376. In step 376, the function returns the identified subset of feasible behavior nodes. Following step 376, the function ends.

Figure 33:
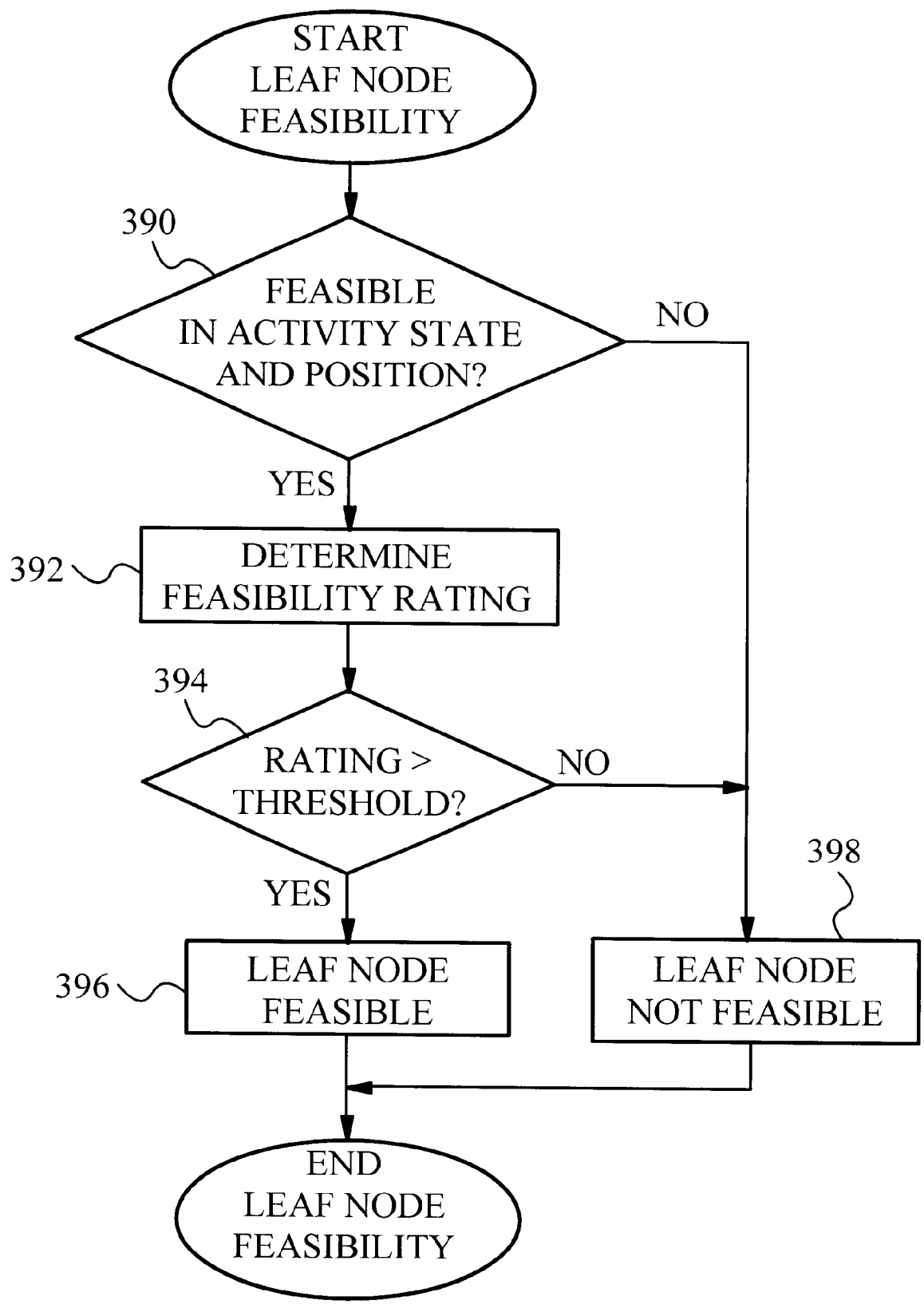
FIG. 33 is a flow diagram illustrating a subfunction called in the function of FIG. 32 to determine whether a leaf behavior node is feasible.

FIG. 33 illustrates the subfunction executed in step 356 to evaluate the feasibility of a leaf behavior node. In step 390, it is determined if the leaf node is feasible in the character's current activity state and current physical position. Step 390 is analogous to step 362 described above. If the leaf node is not feasible in the character's current activity state and physical position, the subfunction determines that the leaf node is not feasible in step 398. Following step 398, the subfunction ends.

Figure 34:
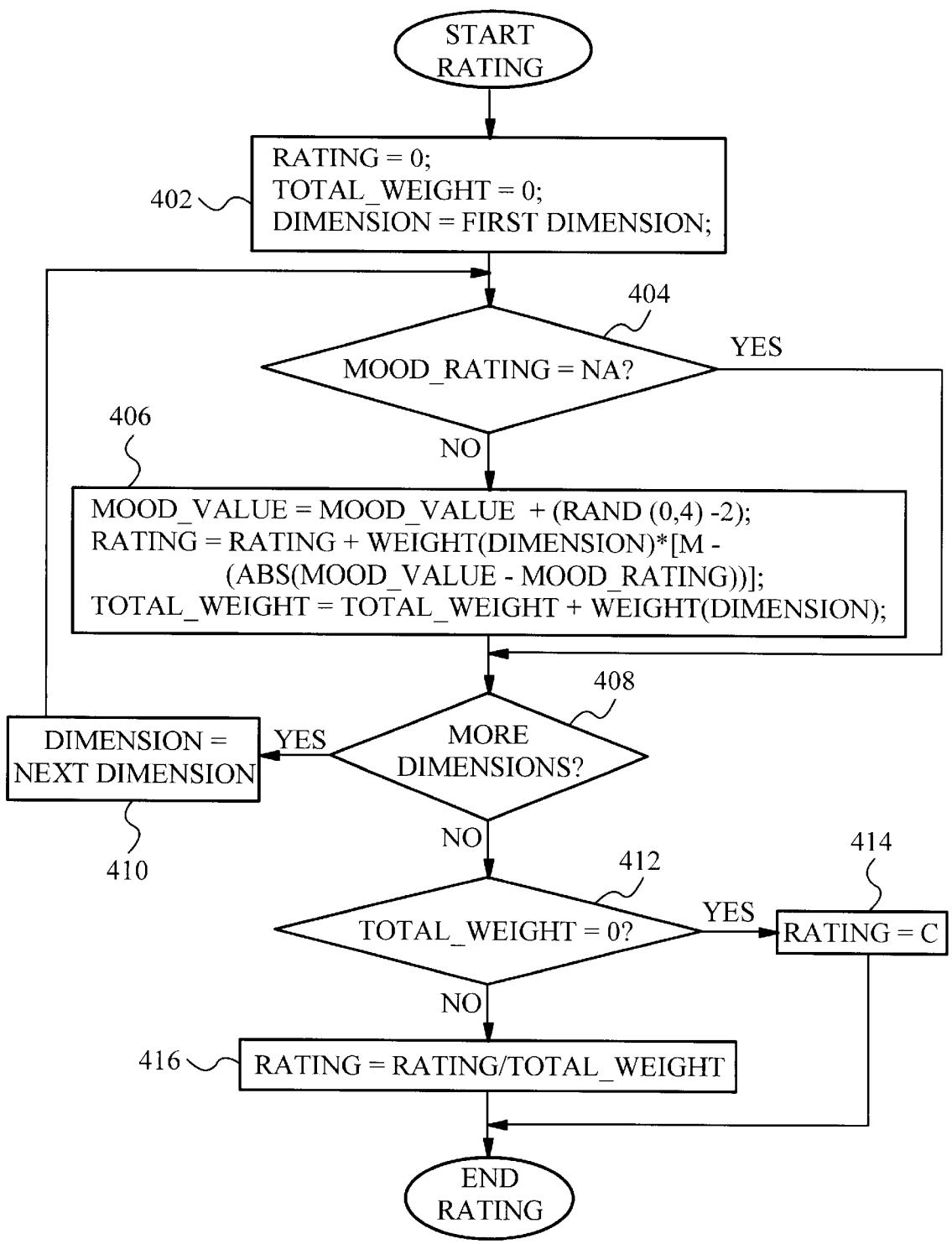
FIG. 34 is a flow diagram illustrating an algorithm used in the subfunction of FIG. 33 to determine a feasibility rating of the leaf behavior node.

If the leaf node is feasible in the character's current activity state and physical position, the subfunction determines a feasibility rating of the leaf node in step 392. The algorithm for determining the feasibility rating of a leaf behavior node is illustrated in FIG. 34 and will now be described. The feasibility rating is determined by comparing the leaf node's annotated mood ratings on the three mood dimensions to the character's current mood values on the three mood dimensions.

In step 402, the algorithm is initialized by setting the feasibility rating equal to 0 and by setting a variable named total_weight equal to 0. The total_weight variable stores the cumulative weight of all the mood dimensions used in the evaluation. The algorithm is also initialized by selecting the first mood dimension for evaluation, e.g. emotional dimension 152A.

In step 404, the mood rating of the leaf node on the selected mood dimension is fetched and compared to the constant "NA". If the mood rating is equal to the constant "NA", indicating that the currently selected mood dimension is not applicable to the leaf node, the algorithm proceeds to step 408. If the mood rating is not equal to the constant "NA", the algorithm proceeds to step 406.

In step 406, the character's current mood value on the selected mood dimension is perturbed slightly with a uniform random distribution. In the preferred embodiment, the uniform random distribution is plus or minus two. This allows the character to generate variable behavior even in the exact same context. The mood value is preferably perturbed by adding a random number between 0 and 4 to the mood value and by subtracting 2 from the result, as shown in equation (1):

$$\text{Mood Value} = \text{Mood Value} + [\text{RAND}(0,4) - 2] \quad (1).$$

The feasibility rating is then adjusted as shown in equation (2):

$$\text{Feasibility Rating} = \text{Feasibility Rating} + \text{Weight}*[M - ABS(\text{Mood Value} - \text{Mood Rating})] \quad (2).$$

The absolute value of the difference between the perturbed mood value and the mood rating is subtracted from a constant M. The result is multiplied by the weight of the mood dimension. The feasibility rating is set equal to its current value plus the product. Also in step 406, the total_weight variable is set equal to its current value plus the weight of the currently selected mood dimension.

In step 408, it is determined if there are more mood dimensions to evaluate. If there are no more mood dimensions, the algorithm proceeds to step 412. If there are more mood dimensions, the algorithm selects the next mood dimension for evaluation in step 410. Following step 410, the algorithm returns to step 404 and repeats the evaluation loop until all of the mood dimensions have been evaluated.

In step 412, it is determined if the total_weight variable is equal to 0. This is true only when the leaf node is rated not applicable on all three mood dimensions. If the total_weight is equal to 0, the feasibility rating is set equal to a constant C in step 414. Following step 414, the algorithm ends. If the total_weight variable is not to equal to 0, the algorithm proceeds to step 416. In step 416, the feasibility rating is set equal to its current value divided by the total_weight. Following step 416, the algorithm ends.

Constant C, constant M, and the weights of the mood dimensions may be static parameters or dynamic parameters. In the preferred embodiment, they are static parameters stored in a file on hard disk 26, read in by the agent applications at run time, and stored in local main memory 24. Also in the preferred embodiment, constant C is equal to 11, constant M is equal to 20, and each mood dimension weight is equal to 1. In alternative embodiments, the constants and weights may have different values and be determined dynamically during operation.

An example of calculating a feasibility rating for a leaf node will now be given. Assume the leaf node's mood ratings 124, 126, and 128 are equal to 5, −5, and NA, respectively. Also assume that the character's current mood values 154A, 154B, and 154C are equal to 7, 4, and 0, respectively. If the perturbations for the three mood values turn out to be −1, 0, and 1 respectively, the algorithm computes:

Feasibility Rating=(1*[20−ABS((7+(−1))−5)]+1*[20−ABS((4+0)−(−5))])/2=15.

Referring again to FIG. 33, the leaf node's feasibility rating is compared to a feasibility rating threshold F in step 394. If the feasibility rating does not exceed threshold F, the subfunction determines that the leaf node is not feasible in step 398. If the feasibility rating exceeds threshold F, the subfunction determines that the leaf node is feasible in step 396. Following step 396, the subfunction ends.

Threshold F may be a static parameter or a dynamic parameter. In the preferred embodiment, threshold F is a static parameter read in by the agent applications at run time, and stored in local main memory 24. Also in the preferred embodiment, threshold F is equal to 10. In alternative embodiments, threshold F may have different values and be determined dynamically during operation. Lower values of threshold F add variability to the character's behavior. Higher values of threshold F cause the character to conform more closely to its current mood, at the expense of variability.

The agent application also executes a destination feasibility function similar to the function illustrated in FIG. 32 to identify from the set of possible destinations a subset of feasible destinations for the character in its current state. The destination feasibility function receives as an input one of the destination nodes from the destination tree and returns a subset of feasible destination nodes which are grouped under the input destination node.

The destination feasibility function differs from the function of FIG. 32 only in steps 356 and 362. Step 362 is eliminated from the destination feasibility function and a different subfunction is called in step 356. The different subfunction evaluates leaf destination nodes for feasibility rather than leaf behavior nodes. The subfunction for evaluating leaf destination nodes is shown in the flow diagram of FIG. 35 and will now be described.

In step 452, the Euclidean distance between the leaf destination node's (x,y) coordinates 214 and the character's current (x,y) coordinates 170 is calculated. In step 454, a cutoff value that describes the maximum Euclidean distance the character is willing to travel is calculated. The cutoff value is dependent upon the character's current energy mood value 154B. In the preferred embodiment, the cutoff value is calculated according to equation (3) as:

Cutoff Value=300+12*(Energy Mood Value)     (3).

This produces cutoff values ranging from 180 when the character has a minimum energy mood value to 420 when the character has a maximum energy mood value. Thus, when the character is very peppy (high energy), it will consider destinations that are farther away than when it is very tired (low energy).

In step 456, the Euclidean distance between the leaf node and the character's current location is compared to the cutoff value. If the Euclidean distance is not less than the cutoff value, the leaf node is determined to be not feasible in step 462 and the subfunction ends. If the Euclidean distance is less than the cutoff value, the subfunction determines if the Euclidean distance is 0 in step 458.

In the preferred embodiment, the leaf node corresponding to the current location of the character is not feasible. Thus, if the Euclidean distance is equal to 0, the subfunction determines that the leaf node is not feasible in step 462 and the subfunction ends. If the Euclidean distance is not equal to 0, the subfunction determines that the leaf node is feasible in step 460 and the subfunction ends.

Update Current State

FIG. 38 is a flow diagram illustrating the steps included in the subprogram executed by the first agent application to update the first character's current state. In the preferred embodiment, each agent application updates its characters current state whenever it directs the character to execute a behavior and whenever it receives a perception message packet from the animator indicating that the other character has executed a behavior.

In step 482, the first agent application determines if a perception message packet has been received from the animator indicating that a behavior has been executed by the second character. If a perception message packet has not been received for a behavior executed by the other character, the subprogram proceeds to step 486. If a perception message packet has been received for a behavior executed by the other character, the agent application updates variable 176 with the unique identifier of the behavior executed by the other character in step 484. Following step 484, the agent application proceeds to step 486.

In step 486, the first agent application determines if a behavior has been executed by either character which requires a transition in the first character's current activity state. FIG. 23A describes the transitions in the first character's activity state which result from behaviors executed by the first character. FIG. 23B describes the transitions in the first character's activity state which result from behaviors executed by the second character. If a transition is not required, the agent application proceeds to step 490. If a transition is required, the agent application updates activity state variable 174 with the new activity state in step 488. Following step 488, the agent application proceeds to step 490.

In step 490, the first agent application determines if a behavior has been executed by either character which requires an update in the first character's current mood values. If no event requiring a mood update has occurred, the agent application proceeds to step 494. If an event requiring a mood update has occurred, the agent application updates the appropriate mood value in step 492. For example, if the second character performs a SAY HI behavior, the first character's friendliness mood value is increased by 3. Following step 492, the agent application proceeds to step 494.

In step 494, the first agent application determines if a behavior has been executed by either character which requires an update in the first character's current behavioral directions. If no event requiring an update in behavioral directions has occurred, the subprogram ends. If an event requiring an update in behavioral directions has occurred, the agent application updates the character's behavioral directions appropriately in step 496. For example, if the second character declines an invitation to play, the first character's interaction direction 164 is updated to ALONE to direct the first character to execute a behavior which is performed alone. Following step 496, the subprogram ends.

Determine Desirability Ratings

Figure 39A:
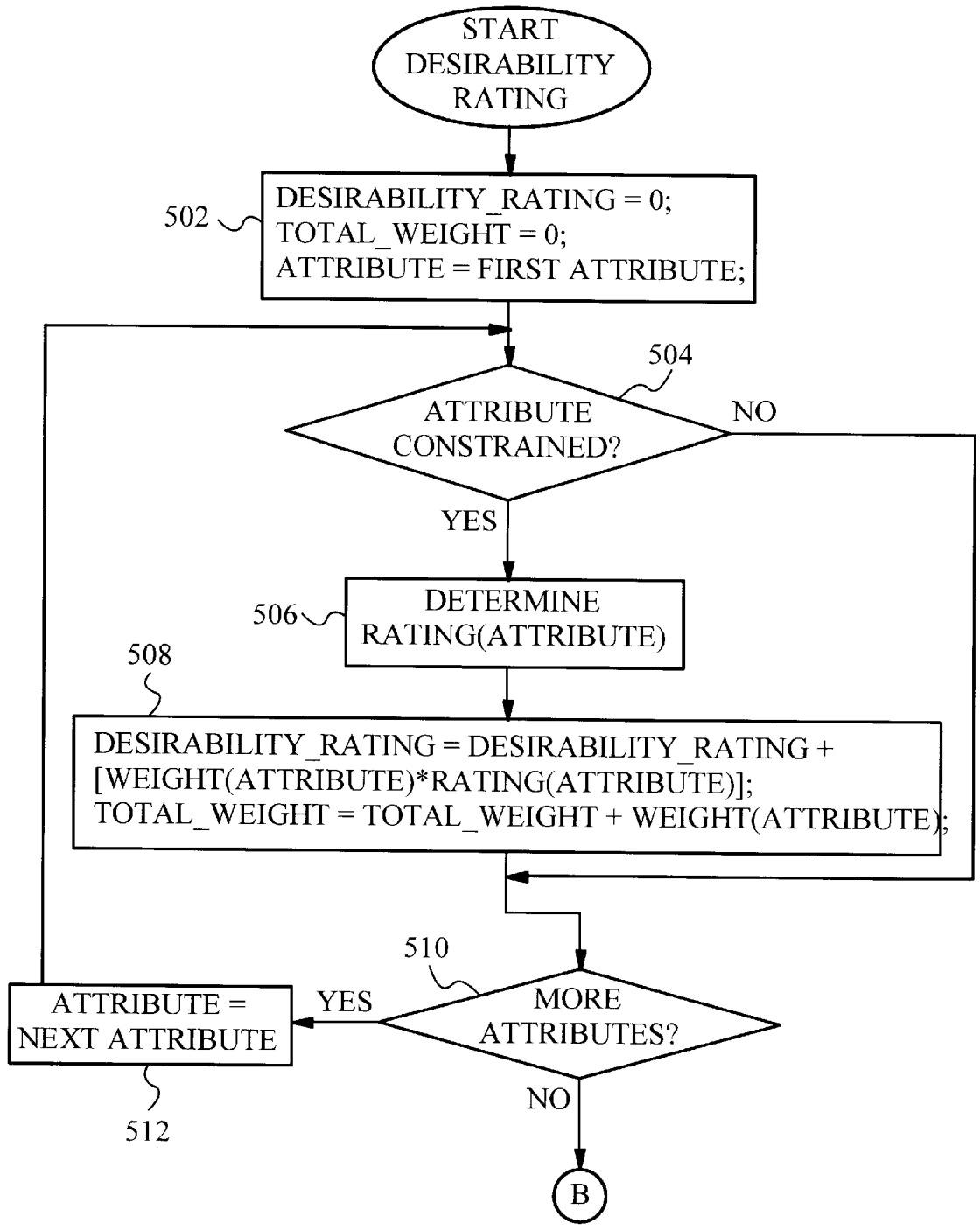
FIG. 39A is a flow diagram illustrating a function called in the control program of FIGS. 31A–31B to determine a desirability rating of a leaf behavior node.
Figure 39B:
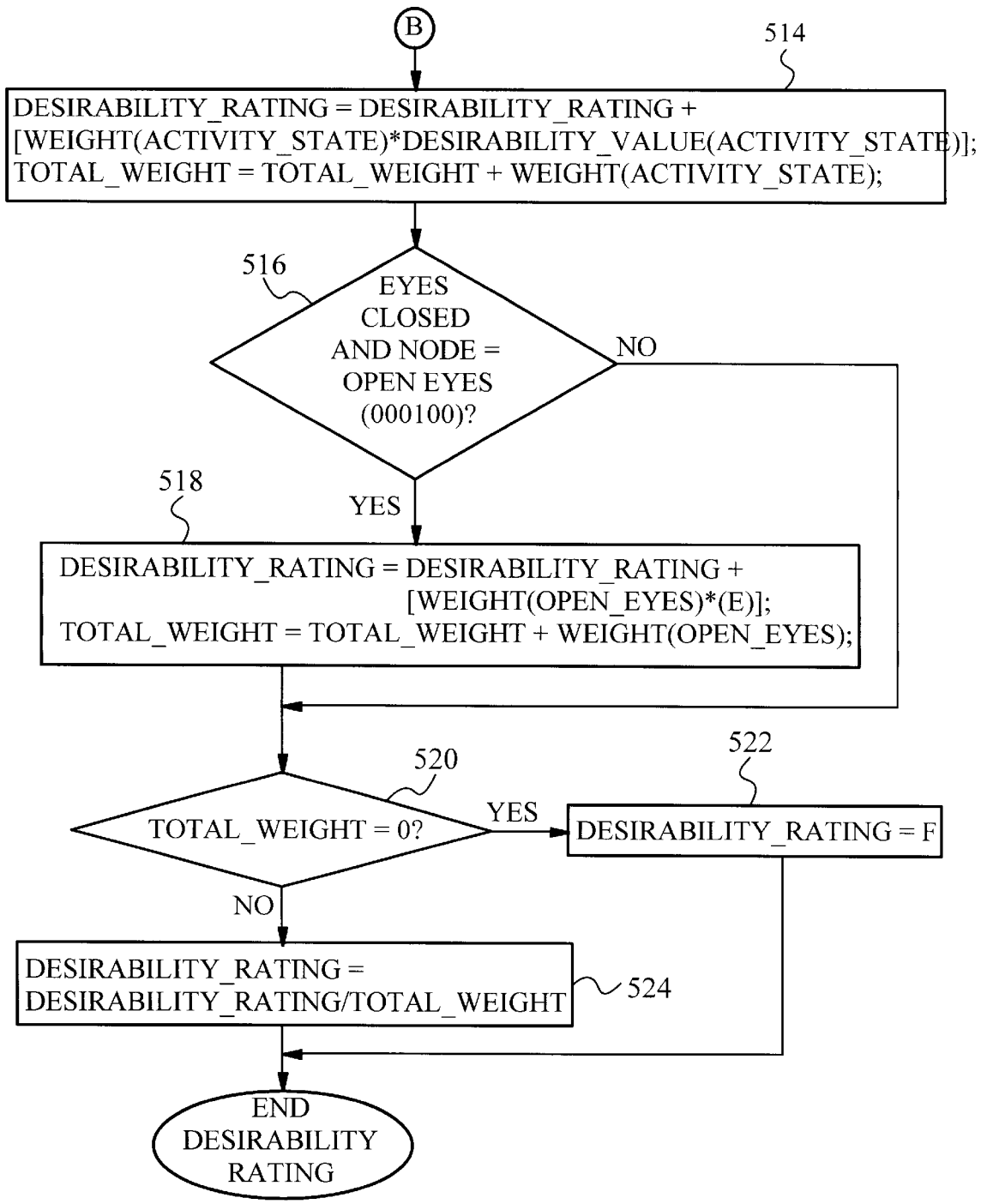
FIG. 39B is a continuation of the flow diagram of FIG. 39A.

FIGS. 39A–39B illustrate a desirability rating function for determining a desirability rating of a behavior. The desirability rating function receives a leaf behavior node as an input and returns the desirability rating of the leaf behavior node. In the preferred embodiment, the character's behavioral directions, mood values, activity state, and physical position are used to determine the desirability rating. However, in alternative embodiments, different combinations of state data may be used to determine the desirability rating.

In step 502, the desirability rating function is initialized by setting the desirability rating equal to 0 and by setting a total_weight variable equal to 0. The function is also initialized by selecting the first attribute value of the leaf node for evaluation. In the preferred embodiment, the attribute values of the leaf node which are evaluated are the unique identifier 108, quality value 130, interaction value 132, instrument value 134, and three mood ratings 124, 126, and 128.

In step 504, it is determined if the selected attribute value is constrained. The attribute value is constrained if the character has a current behavioral direction constraining the attribute value or if it is a mood rating. In the preferred embodiment, the mood ratings are always used to evaluate desirability. If the selected attribute value is not constrained, the function proceeds to step 510. If the selected attribute value is constrained, a subfunction is executed in step 506 to determine an attribute rating. The attribute rating is a component of the overall desirability rating. The steps included in the subfunction are illustrated in the flow diagram of FIG. 40 and will be described in detail below.

In step 508, the desirability rating is updated as shown in equation (4):

Desirability Rating=Desirability Rating+[(Attribute Weight)*(Attribute Rating)]   (4).

The desirability rating is set equal to its current value plus the product of the attribute weight and the attribute rating. If the attribute value is constrained by a behavioral direction, the attribute weight is the corresponding weight of the direction, as shown in the table of FIG. 16. If the attribute value is a mood rating on a mood dimension, the attribute weight is the weight of the mood dimension, as shown in FIG. 15. Also in step 508, the total_weight variable is set equal to its current value plus the attribute weight. Following step 508, the function proceeds to step 510.

In step 510, it is determined if there are more attribute values to evaluate. If there are no more attribute values, the function proceeds to step 514. If there are more attribute values, the function selects the next attribute value for evaluation in step 512. Following step 512, the algorithm returns to step 504 and repeats the evaluation loop until all of the attribute values have been evaluated.

In step 514, the desirability rating of the leaf behavior node is updated in dependence upon the character's current activity state. The node's desirability value and the corresponding activity state weight are fetched from the appropriate activity state table, as shown in FIG. 37. The desirability rating is updated according to equation (5):

Desirability Rating=Desirability Rating+[(Desirability Value)*(Activity State Weight)]   (5).

The desirability rating is set equal to its current value plus the product of the node's desirability value and the corresponding activity state weight. Also in step 514, the total_weight variable is set equal to its current value plus the activity state weight. Following step 514, the function proceeds to step 516.

In step 516, it is determined if the character's eyes are currently closed and if the leaf behavior node currently being evaluated is the OPEN EYES node. If the character's eyes are open or if the leaf behavior node is not the OPEN EYES node, the function proceeds to step 520. If the character's eyes are closed and if the leaf behavior node is the OPEN EYES node, the function proceeds to step 518.

In step 518, the desirability rating is set equal to its current value plus the product of physical position weight 169 and a constant E. In the preferred embodiment, constant E is a static parameter having a value of 20. Thus, if the character's eyes are currently closed, the desirability rating of the OPEN EYES node is increased. Also in step 518, the total_weight variable is set equal to its current value plus physical position weight 169. Following step 518, the function proceeds to step 520.

In step 520, it is determined if the total_weight variable is equal to 0. If the total_weight is equal to 0, the desirability rating is set equal to a constant F in step 522. Following step 522, the function ends. If the total_weight variable is not to equal to 0, the desirability rating is set equal to its current value divided by the total_weight in step 524. Following step 524, the function ends.

Constant E, constant F, and each weight used in the function may be static parameters or dynamic parameters. In the preferred embodiment, they are static parameters stored in a file on hard disk 26, read in by the agent applications at run time, and stored in local main memory 24. Also in the preferred embodiment, constant E is equal to 20, constant F is equal to 11, and each weight is equal to 1, with one exception.

The attribute weight corresponding to node direction 158 is preferably 1000 so that behaviors which are consistent with the node direction will have a very high desirability rating, while behaviors which are inconsistent with the node direction will have a much lower desirability rating. This ensures that the behavior selected for execution is consistent with the node direction. In alternative embodiments, the constants and weights may have different values and be determined dynamically during operation.

Figure 40:
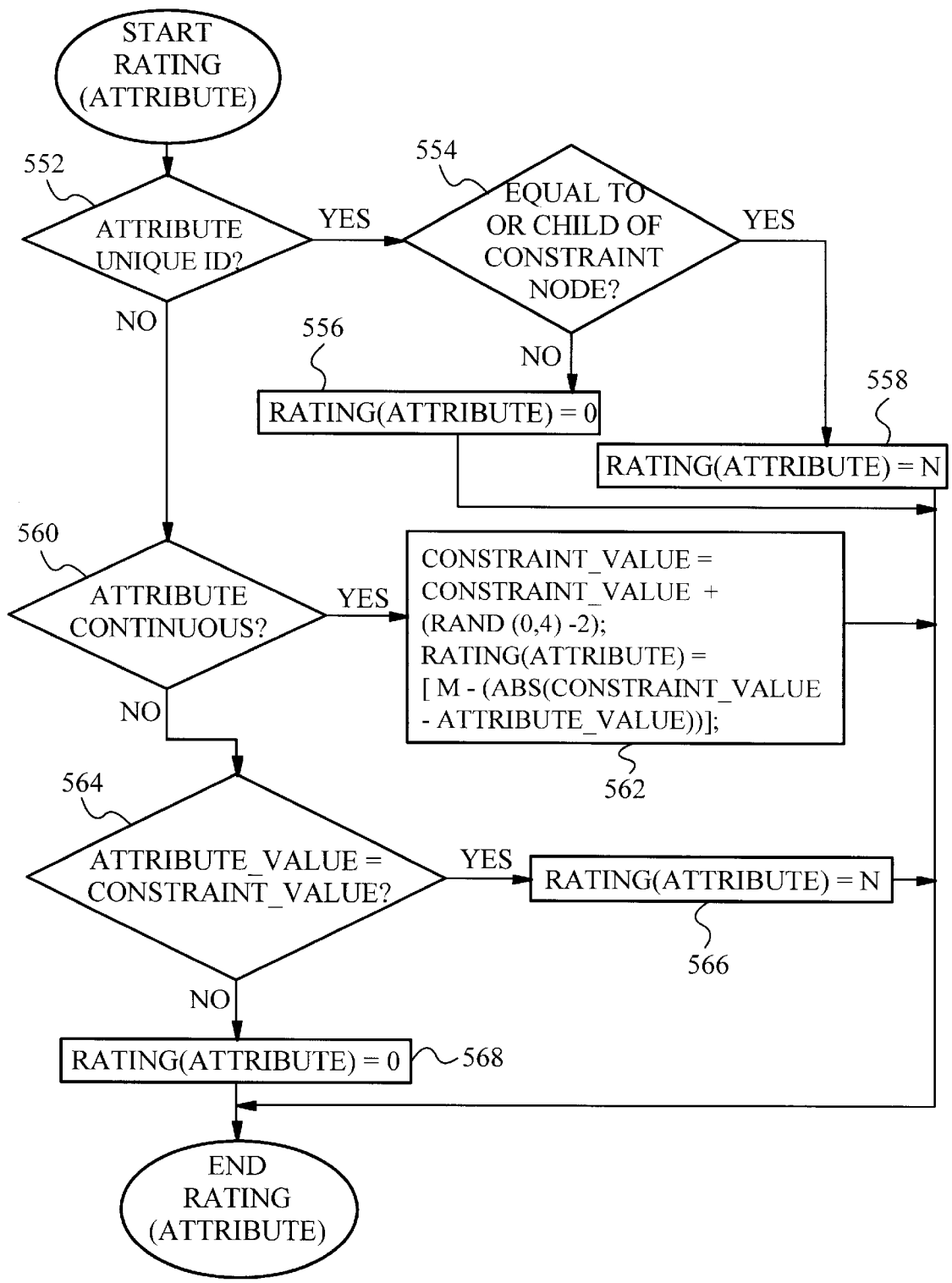
FIG. 40 is a flow diagram illustrating a subfunction called in the function of FIGS. 39A–39B to determine an attribute rating of the leaf behavior node.

FIG. 40 is a flow diagram illustrating the subfunction executed to determine an attribute rating. The subfunction receives a leaf behavior node and an attribute value of the node and returns the attribute rating. If the attribute value is a mood rating on a mood dimension, the attribute rating is determined by comparing the mood rating to the character's current mood value on the mood dimension. If the attribute value is constrained by a behavioral direction, the attribute rating is determined by comparing the attribute value to the constraint value of the behavioral direction.

In step 552, it is determined if the attribute value is the unique identifier of the leaf node. If the attribute value is not the unique identifier of the leaf node, the subfunction proceeds to step 560. If the attribute value is the unique identifier of the leaf node, it is determined in step 554 if the leaf node is equal to or a child of the behavior constraint node. For example, if the behavior constraint node is the MOVE node (unique identifier 0000), the leaf node is equal to or a child of the behavior constraint node if it is the HOP node (unique identifier 000000), SHUFFLE node (unique identifier 000001), or LEAP node (unique identifier 000002).

If leaf node is not equal to or a child of the behavior constraint node, the attribute rating is set equal to 0 in step 556, and the subfunction ends. If leaf node is equal to or a child of the behavior constraint node, the attribute rating is set equal to a constant N in step 558, and the subfunction ends. Constant N may be a static parameter or a dynamic parameter. In the preferred embodiment, constant N is a static parameter stored in a file on hard disk 26, read in by the agent applications at run time, and stored in local main memory 24. Also in the preferred embodiment, constant N is equal to 20. In alternative embodiments, constant N may have different values and be determined dynamically during operation.

In step 560, it is determined if the attribute value is continuous or binary. In the preferred embodiment, only the three mood ratings have continuous values, while the other attribute values have binary values. For example, quality value 130 has a binary value of "FUNNY" or "SCARY" while each of the mood ratings has a continuous value between −10 and +10. However, each of the attribute values may be made continuous or binary in alternative embodiments. For example, each behavior node may be annotated with a funny rating which has a continuous value between −10 and +10 indicating how funny the behavior is.

If the attribute value is binary, the subfunction proceeds to step 564. If the attribute value is continuous, e.g. a mood rating on a mood dimension, the subfunction proceeds to step 562. In step 562, the constraint value is perturbed slightly with a uniform random distribution. In the preferred embodiment, the constraint value is the character's current mood value on the mood dimension. The constraint value is preferably perturbed by adding to the constraint value a random number between 0 and 4 and by subtracting 2 from the result, as shown in equation (6):

Constraint Value=Constraint Value+[RAND(0,4)−2]  (6).

The attribute rating is then calculated as shown in equation (7):

Attribute Rating=[$M-ABS$(Constraint Value−Attribute Value)]  (7).

The attribute rating is set equal to constant M less the absolute value of the difference between the perturbed constraint value and the attribute value. For example, assume the attribute value is a mood rating having a value of 5, the constraint value is the character's corresponding mood value having a value of 7, and the perturbation of the mood value is −1. The attribute rating is calculated as:

Attribute Rating=20−[$ABS$((7+(−1))−5)]  =19.

Step 564 is reached if the attribute value is a binary value which is not the unique identifier of the leaf node. In step 564, the attribute value is compared to the constraint value to determine if the values match. If the attribute value does not match the constraint value, the attribute rating is set equal to 0 in step 568, and the subfunction ends. If the attribute value matches the constraint value, the attribute rating is set equal to constant N in step 566, and the subfunction ends.

Figure 41:
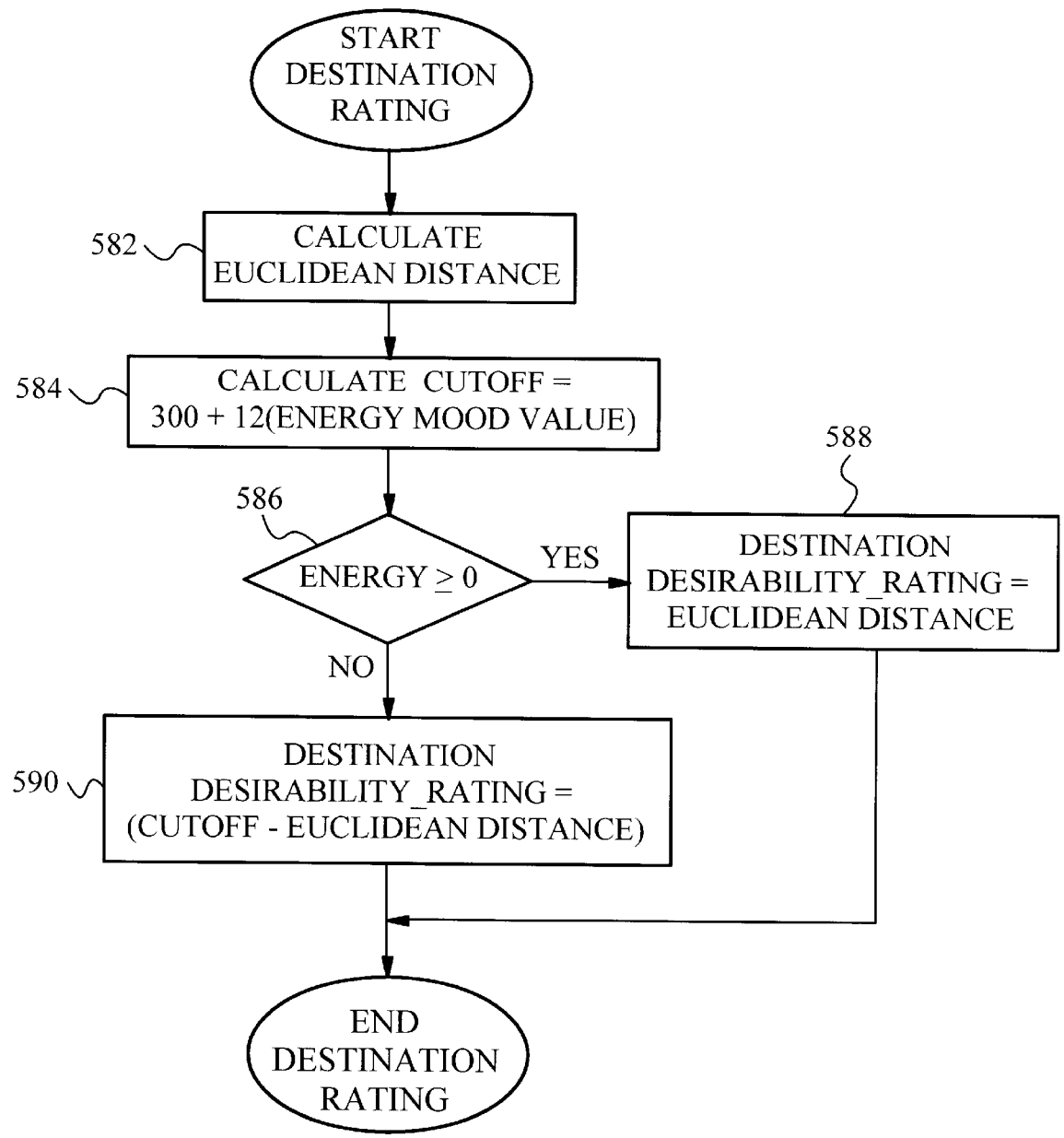
FIG. 41 is a flow diagram illustrating a function called in the control program of FIGS. 31A–31B to determine a desirability rating of a destination node.

FIG. 41 is a flow diagram illustrating a destination rating function for determining a desirability rating of a possible destination. The destination rating function receives as an input a destination leaf node and returns the desirability rating of the destination leaf node. In the preferred embodiment, the desirability rating of the leaf node is determined in dependence upon the character's current location in the virtual world and the character's current energy mood value.

In step 582, the Euclidean distance between the leaf destination node's (x,y) coordinates 214 and the character's current (x,y) coordinates 170 is calculated. In step 584, a cutoff value that describes the maximum Euclidean distance the character is willing to travel is calculated. Steps 582 and 584 are analogous to steps 452 and 454 previously described with reference to FIG. 35.

In step 586, it is determined if the character's energy mood value 154B is greater than or equal to 0. If mood value 154B is greater than or equal to 0, the desirability rating is set equal to the Euclidean distance in step 588, and the function ends. If mood value 154B is less than 0, the desirability rating is set equal to the cutoff value less the Euclidean distance in step 590, and the function ends. Thus, if the character is peppy, the destination is more desirable if it is located far from the character's current location. If the character is tired, the destination is more desirable if it is located close to character's current location.

Select Behavior to be Executed

Figure 42:
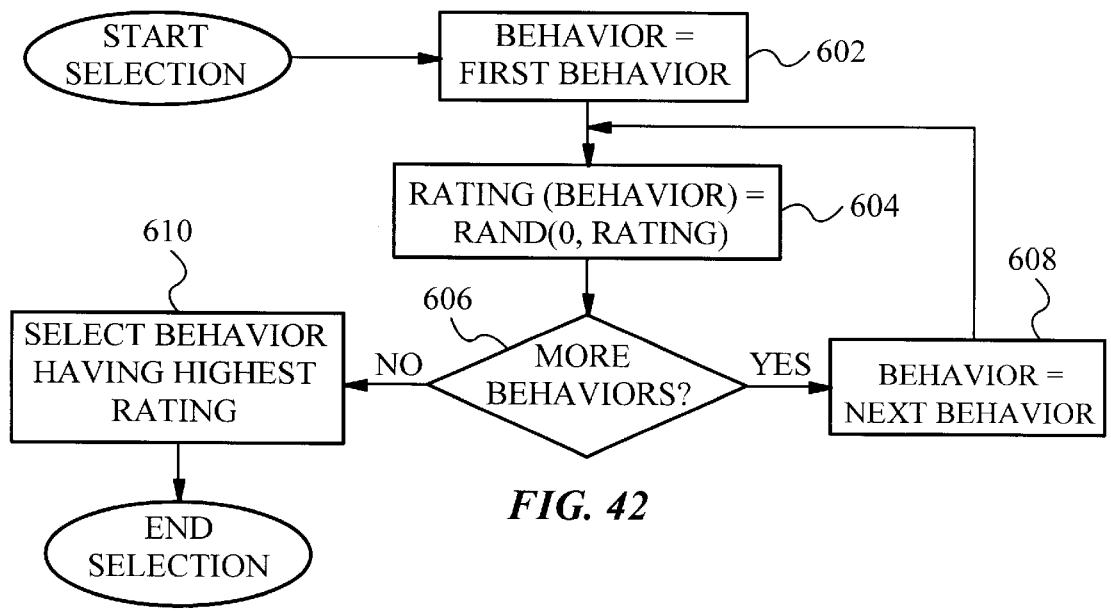
FIG. 42 is a flow diagram illustrating a selection algorithm used in the program of FIGS. 31A–31B according to the preferred embodiment of the invention.

FIG. 42 is a flow diagram illustrating a preferred selection algorithm for selecting the behavior to be executed by a character from the subset of feasible behaviors. In the preferred embodiment, the behavior to be executed is selected from the subset with a selection probability that is an increasing function of its desirability rating.

In step 602, the first feasible behavior in the subset is fetched. In step 604, the desirability rating of the feasible behavior is set equal to a random number between 0 and its current desirability rating. In step 606 it is determined if there are more feasible behaviors in the subset. If there are no more feasible behaviors, the algorithm proceeds to step 610.

If there are more feasible behaviors, the next feasible behavior is fetched in step 608. Following step 608, the algorithm returns to step 604, and the loop continues until all feasible behaviors in the subset have been assigned a new desirability rating. In step 610, the feasible behavior having the highest desirability rating is selected for execution by the character. Following step 610, the algorithm ends.

According to a second selection algorithm, the behavior to be executed by the character is selected from the subset of feasible behaviors without first assigning new desirability ratings to the feasible behaviors. The behavior to be executed is selected as the feasible behavior having the highest desirability rating. However, it is recommended that this selection algorithm only be used in embodiments in which the mood values are randomly perturbed, so that the character demonstrates variability in its behavior.

Figure 43:
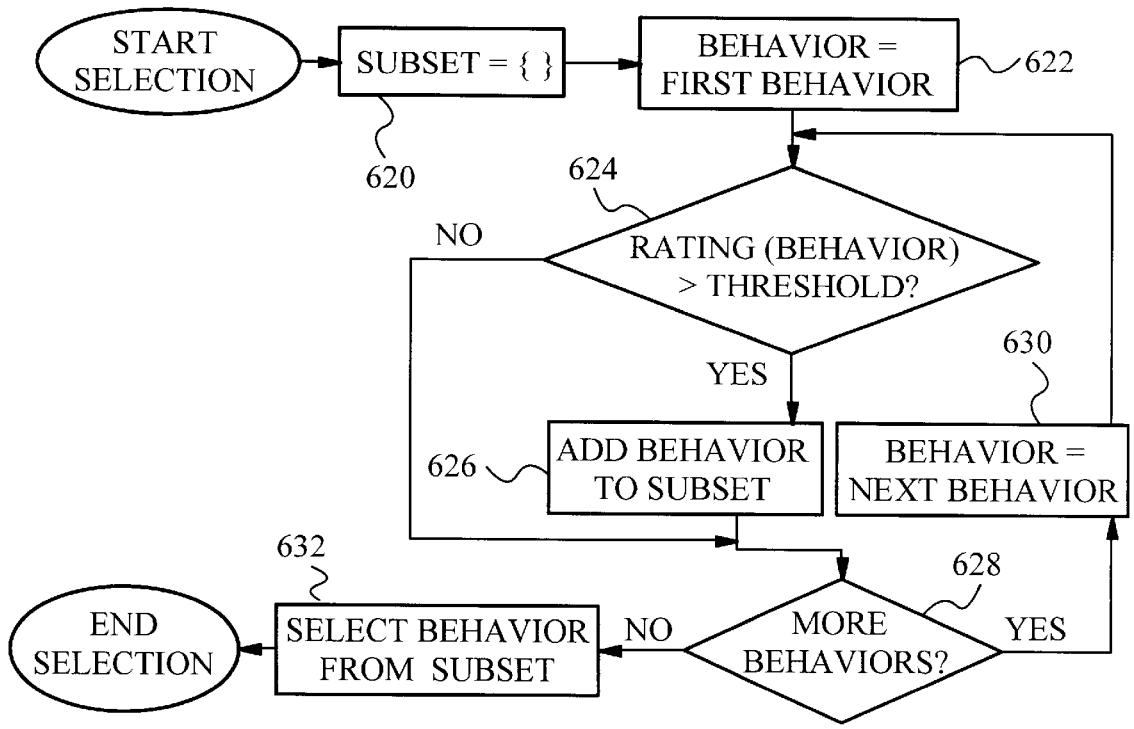
FIG. 43 is a flow diagram illustrating a selection algorithm used in the program of FIGS. 31A–31B according to another embodiment of the invention.

FIG. 43 illustrates a third selection algorithm for selecting the behavior to be executed from the subset of feasible behaviors. The behavior to be executed is selected by identifying from the subset of feasible behaviors a subset of desirable behaviors whose desirability ratings exceed a desirability rating threshold. The behavior to be executed is then selected from the subset of desirable behaviors.

In step 620, the algorithm is initialized by setting the subset of desirable behaviors equal to the empty set. In step 622, the first feasible behavior is fetched. In step 624, the desirability rating of the feasible behavior is compared to a desirability rating threshold D. Threshold D may be a static parameter or a dynamic parameter. In the preferred embodiment, threshold D is a static parameter read in by the agent applications at run time, and stored in local main memory 24. Also in the preferred embodiment, threshold D is equal to 10. In alternative embodiments, threshold D may have different values and be determined dynamically during operation.

If the desirability rating of the feasible behavior does not exceed threshold D, the algorithm proceeds to step 628. If the desirability rating exceeds threshold D, the feasible behavior is added to the subset of desirable behaviors in step 626. In step 628, it is determined if there are more feasible behaviors. If there are no more feasible behaviors, the algorithm proceeds to step 632.

If there are more feasible behaviors, the next feasible behavior is fetched in step 630. Following step 630, the algorithm returns to step 624, and the loop continues until all of the feasible behaviors have been evaluated. In step 632, the behavior to be executed is selected from the subset of desirable behaviors. The behavior may be selected randomly from the subset or selected probabilistically using the algorithm shown in FIG. 42.

If the selected behavior is a movement behavior, it requires a destination. Destination nodes which are not equal to or a child of the destination constraint node are eliminated from the subset of feasible destinations. The agent application then selects a destination from the remaining destination nodes using any of the three selection techniques described above. Note that in the preferred embodiment, all destination constraints received in behavioral directions are leaves in the tree of destinations, so a selection algorithm is only used when the directions do not specify a destination for a movement behavior.

Execute Selected Behavior

Each leaf behavior node in the tree of possible behaviors is annotated with the name of a script which specifies how to execute the behavior. A preferred algorithm for executing the scripts is illustrated in the flow diagram of FIGS. 50A–50C, and will be described in detail below. The scripting language is a limited programming language which allows sequential execution of a series of statements, with the flow of control modified by standard control constructs such as IF-THEN-ELSE statements, WHILE-DO statements, and LOOP statements.

Each script includes a sequence of statements. Each statement consists of one of the following:

a standard control construct, such as an IF-THEN-ELSE statement, a WHILE-DO statement, or a LOOP statement an animator command for sending an action message to the animator application a specification of a node in the tree of possible behaviors, hereafter referred to as an "internal behavior direction"

a specification of a node in the destination tree, hereafter referred to as an "internal destination direction"

an END statement

FIG. 44 shows a MOVEMENT script used to execute movement behaviors. FIG. 45 shows a SAY script used to execute verbal behaviors. Each script includes two statements. The first statement is an animator command and the second statement is an END statement. Each animator command statement directs the agent application executing the script to send a low level behavior command to the animator application in the form of an action message packet.

Figures 48, 49:
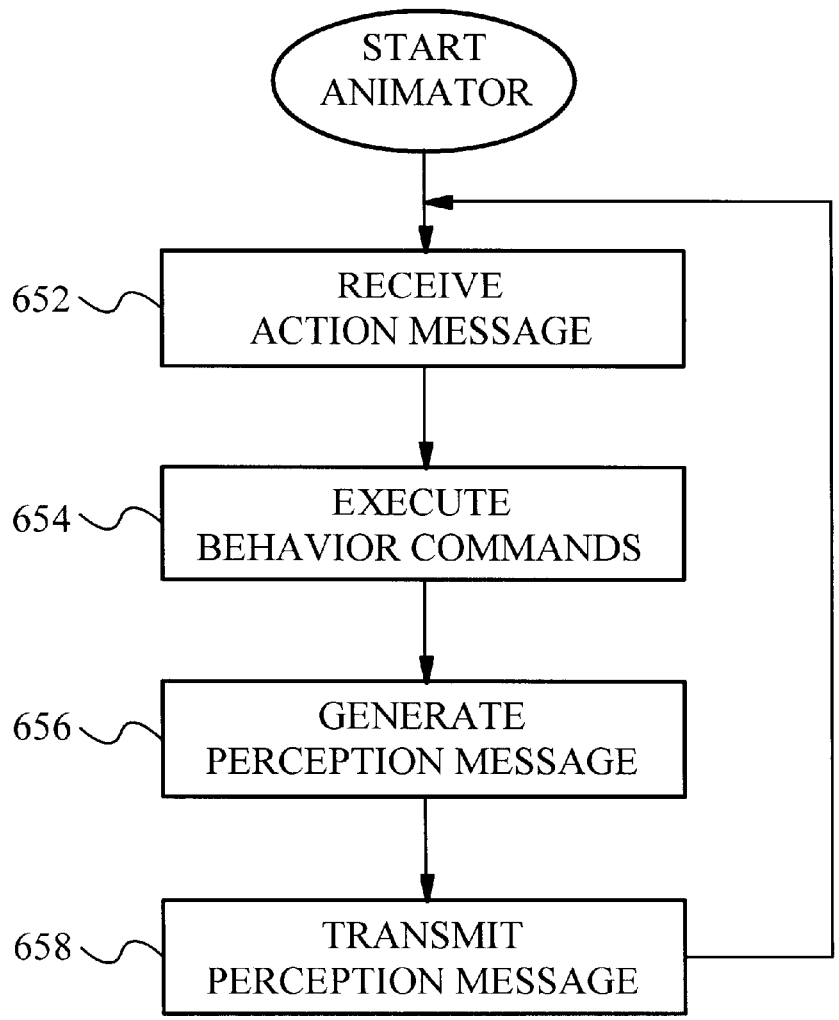
FIG. 48 is a listing of operation codes used in the preferred embodiment of the invention.
FIG. 49 is a flow diagram illustrating an animator program executed by the system of FIG. 1.

FIG. 47 shows a sample action message packet 280. Message packet 280 includes a string parameter 282 specifying an operation code of the low level behavior command and an integer array 284 containing up to four integer parameters. The operation code and integer parameters are used by the animator application to implement the behavioral command for the appropriate character. FIG. 48 lists the complete set of operation codes used in the preferred embodiment, e.g. HOP, LEAP, SHUFFLE, SAY, etc.

Referring again to FIG. 47, the integer parameters included in array 284 specify how to implement the behavioral command. For movement commands, such as HOP, LEAP, and SHUFFLE, the integer parameters specify the (x,y) coordinates of the selected destination, as well as the height and length of jumps. The animator application uses these parameters to create an animation sequence for the appropriate character on the monitor of workstation 14. For verbal behaviors, integer array 284 includes only one parameter indicating which sound file should be played on audio player 43.

Message packet 280 also includes a string parameter 286 specifying the unique identifier 108 of the leaf behavior node being executed, and a string parameter 288 specifying the action type 122 of the behavior being executed. Unique identifier 108 and action type 122 are provided in message packet 280 so that the animator application may generate and transmit to each agent application a perception message packet for the executed behavior.

In the preferred embodiment, the animator application is an adapted version of the Woggles animation system developed by Professor Joseph Bates of Carnegie-Mellon University. The Woggles system incorporates RAL software produced by Production Systems Technologies of Pittsburgh, Pa. The Woggles code is adapted to support an extended range of physical and verbal behaviors for each character.

FIG. 49 illustrates the animator application's data flow. In step 652, the animator application receives a low level behavior command in the form of an action message from one of the agent applications. In step 654, the animator application implements the low level behavioral command by creating an animation sequence for the appropriate character on the monitor of workstation 14. In step 656, the animator application generates a perception message packet for the executed behavior, as shown in FIG. 20. In step 658, the animator application transmits the perception message packet to each agent application. Following step 658, the animator application returns to step 652 and awaits the next action message packet.

Referring again to FIGS. 44–45, each script may access dynamically bound variables which are used to parameterize the action messages. In the preferred embodiment, the dynamically bound variables are accessed through expressions contained in the animator command statements. The expressions are defined as follows:

$1=the static parameter 120 of the currently selected behavior node.

$destination_x=the x coordinate of the currently selected destination node.

$destination_y=the y coordinate of the currently selected destination node.

$happiness=the current value of happiness mood value 154A.

$energy=the current value of energy mood value 154B.

$unique_{id}=the unique id 108 of the currently selected behavior node.

$action_type=the action type 122 of the currently selected behavior node.

Each animator command statement provides the necessary parameters to generate an action message packet for the animator application. Each animator command statement includes as a first parameter the operation code of the currently selected behavior node. The animator command statement in the MOVEMENT script determines the operation code by evaluating the expression $1. For example, when the selected behavior node is the HOP node, the expression $1 evaluates to HOP, as shown in FIG. 12. The animator command statement in the SAY script determines the operation code statically as SAY for all verbal behaviors.

All action message packets require parameters for the unique identifier 108 and the action type 122 of the behavior node being executed. The animator command statements in the both the MOVEMENT script and the SAY script determine the unique identifier 108 and the action type 122 by evaluating the expressions $unique_id and $action_type, respectively.

In addition, particular operation codes require further parameters. For example, the HOP operation code requires the (x,y) coordinates 214 of the currently selected destination, as well as a hop height and a hop length. In the MOVEMENT script, the (x,y) coordinates 214 are determined by evaluating the expressions $destination_x and $destination_y. The hop height is determined by evaluating the arithmetic expression ($energy+10). For example, when energy mood value 154B is equal to 10, the hop height is determined to be 20. Similarly, the hop length is determined by evaluating the arithmetic expression ($happiness+20). For example, when happiness mood value 154A is equal to 0, the hop length is determined to be 20.

The SAY operation code requires a numerical parameter indicating which sound file should be played. In the SAY script, this parameter is determined by evaluating the expression $1. For example, when the currently selected behavior node is the HI_FRIENDLY node, the expression $1 evaluates to 1201, as shown in FIG. 12. This indicates that sound file number 1201, which contains a friendly verbalization of "Hi!", should be played on audio player 43.

FIG. 46 illustrates a more complicated script for executing one of the PLAY ALONE behaviors, specifically a PLAY ON PEDESTALS behavior. The first statement in the script is an internal destination direction specifying the PEDESTALS node, unique identifier "04". The second statement in the script is an internal behavior direction specifying the MOVE node, unique identifier "0000". As will be explained in detail below, the first two statements in the script result in the execution of either a HOP behavior, LEAP behavior, or SHUFFLE behavior, with one of the leaf pedestal nodes selected as the destination for the selected movement behavior.

The third statement in the script is a LOOP statement for controlling the execution of a loop which contains a sequence of three statements. The loop repeats a number of times equal to 3 plus a random number between 0 and 3 (i.e. 3, 4, 5, or 6 times). The first statement within the loop is an internal behavior direction specifying the BOING node, unique identifier "010305". The internal behavior direction results in the execution of a leaf node under the BOING node corresponding to some verbalization of "Boing!". The next two statements in the loop are identical to the first two statements in the script. The character again moves to a pedestal, but this time chooses a different pedestal and possibly a different gait.

Figure 50A:
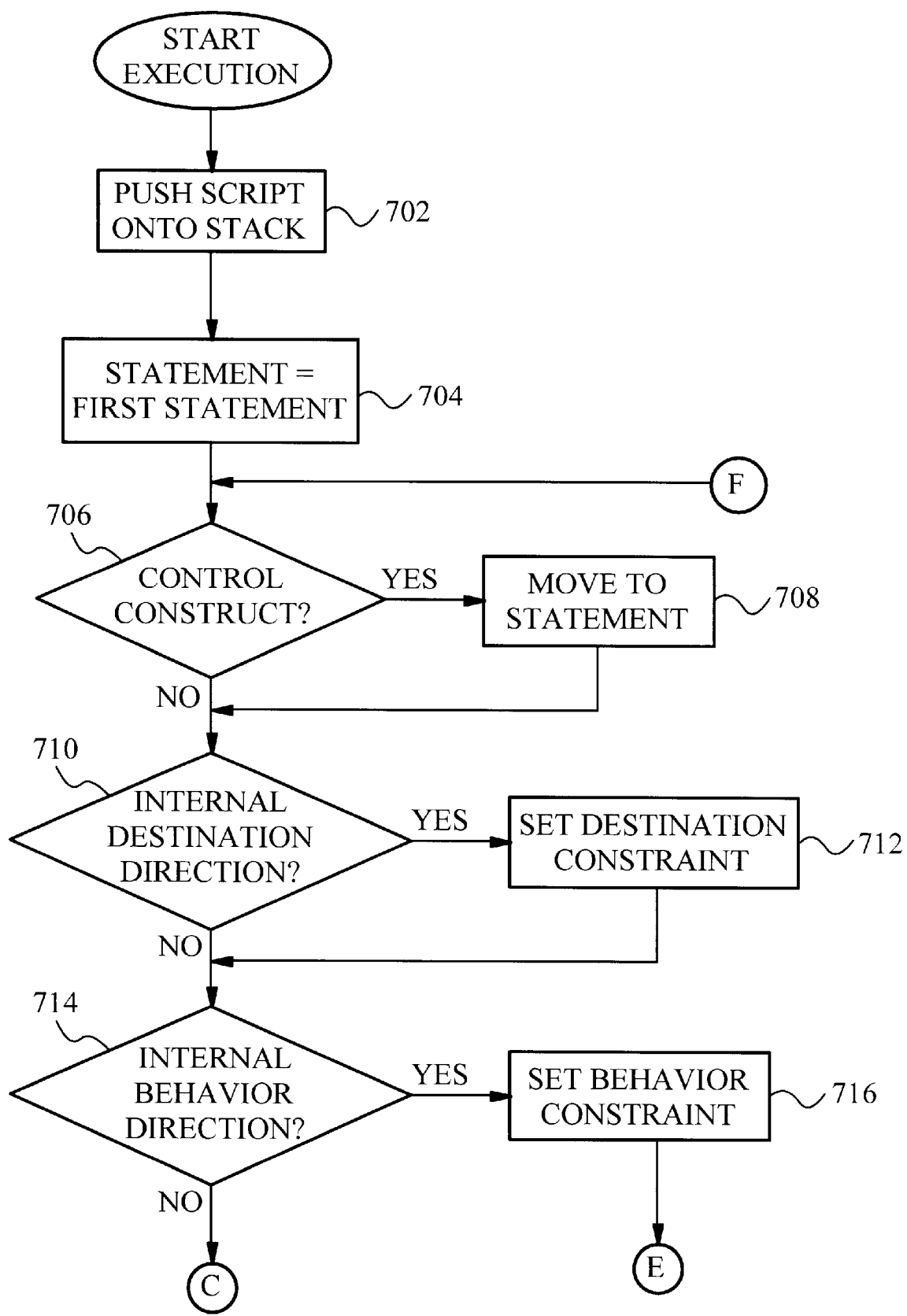
FIG. 50A is a flow diagram illustrating a script execution algorithm.
Figure 50B:
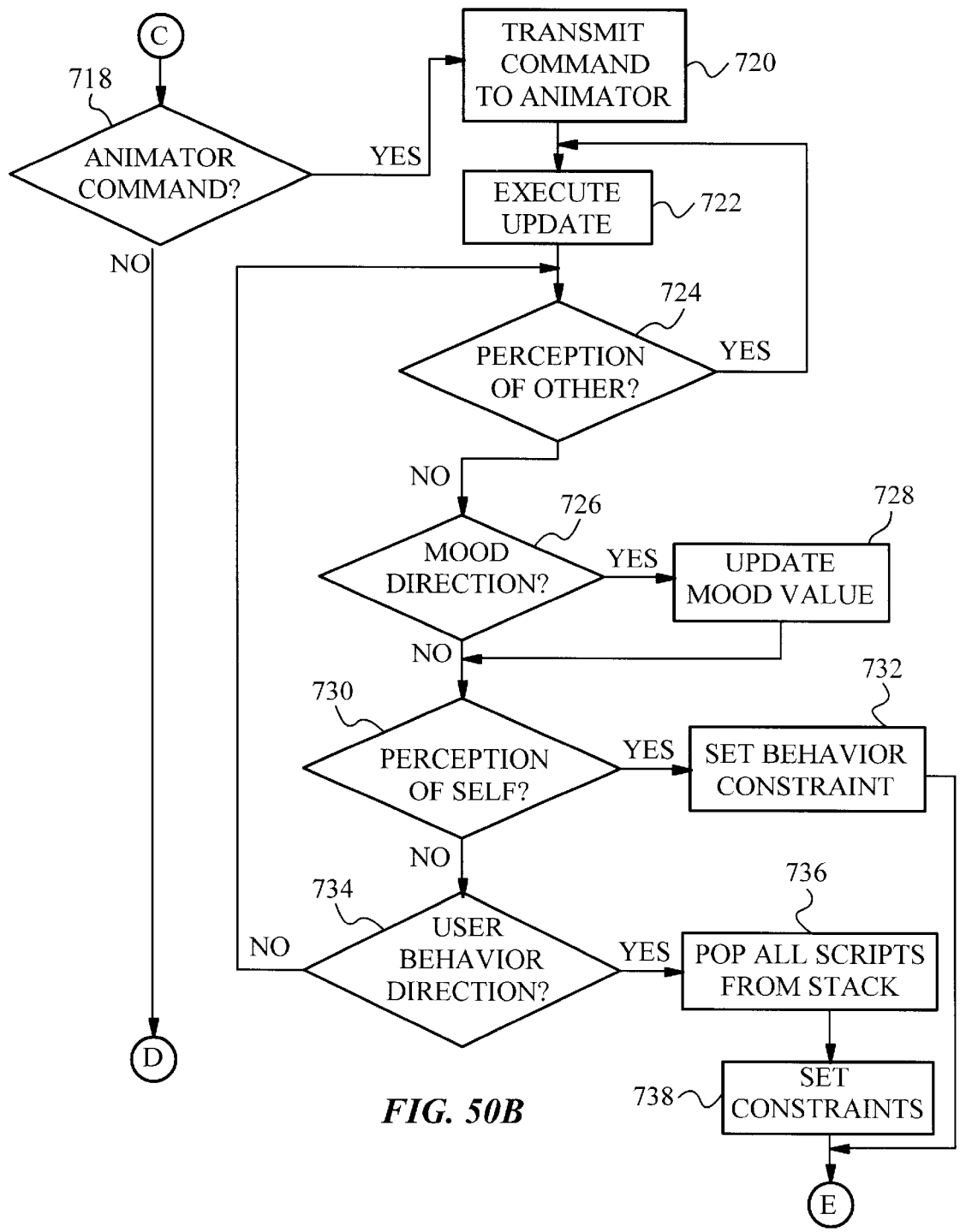
FIG. 50B is a continuation of the flow diagram of FIG. 50A.
Figure 50:
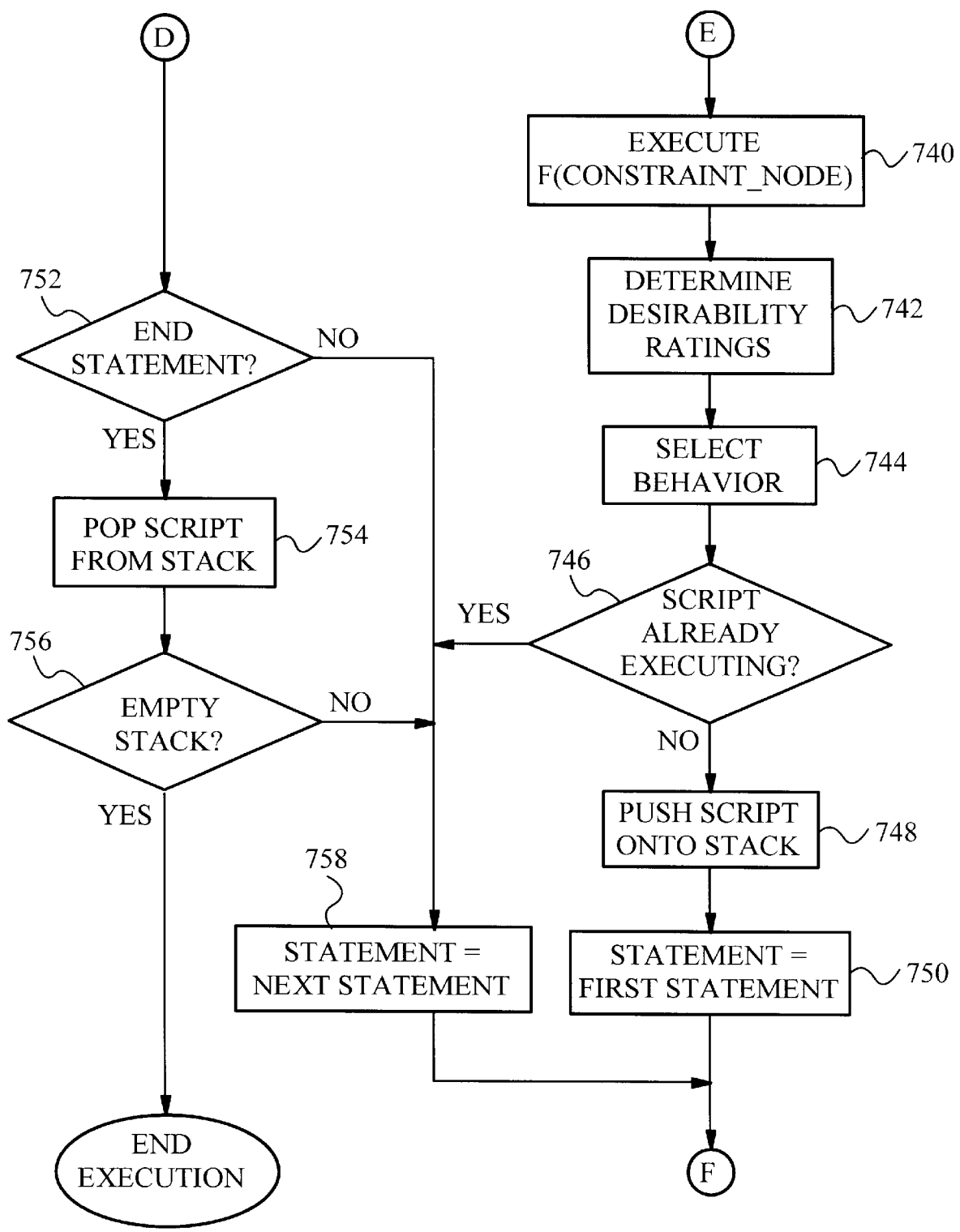
FIG. 50C is a continuation of the flow diagram of FIG. 50B.

FIGS. 50A–50C illustrate a preferred algorithm for executing scripts. For clarity of illustration, the algorithm is described in reference to steps executed by the first agent application to execute scripts for the first character. It is to be understood that the second agent application performs analogous steps to execute scripts for the second character. Execution of scripts follows a stack-based methodology, much like a traditional programming language. The first step in the execution of each script is to push it onto the stack. In step 702, the first agent application pushes the script for the currently selected behavior node onto the stack. In step 704, the first statement in the script is selected for execution.

In step 706, the agent application determines if the selected statement is a control construct, such an IF-THEN-ELSE statement, WHILE-DO statement, or LOOP statement. If the currently selected statement is not a control construct, the agent application proceeds to step 710. If the selected statement is a control construct, the agent application moves to the statement specified by the control construct, step 708. Following step 708, the agent application proceeds to step 710.

In step 710, the agent application determines if the currently selected statement is an internal destination direction. If the statement is not an internal destination direction, the agent application proceeds to step 714. If the statement is an internal destination direction, the destination constraint node is set to the node specified by the internal destination direction in step 712. For example, the first statement of the PLAY ON PEDESTALS script specifies the PEDESTALS node, so that execution of this statement results in the destination constraint node being set to the PEDESTALS node. Following step 712, the agent application proceeds to step 714.

In step 714, the agent application determines if the currently selected statement is an internal behavior direction. If the currently selected statement is not an internal behavior direction, the agent application proceeds to step 718. If the selected statement is an internal behavior direction, the agent application sets the behavior constraint node equal to the node specified by the internal behavior direction in step 716. For example, the second statement of the PLAY ON PEDESTALS script specifies the MOVE node, so that execution of this statement results in the behavior constraint node being set to the MOVE node. Following step 716, the agent application proceeds to step 740.

In step 718, it is determined if the currently selected statement is an animator command. If the currently selected statement is not an animator command, the agent application proceeds to step 752. If the selected statement is an animator command, the agent application sends an action message packet to the animator application in step 720. In step 722, the agent application executes the update subprogram of FIG. 38 to update its character's current state appropriately.

In step 724, the first agent application determines if a perception message packet has been received from the animator application for a behavior executed by the second character. If a perception message packet has not been received for a behavior executed by the second character, the agent application proceeds to step 726. If a perception message packet has been received for a behavior executed by the second character, the agent application returns to step 722 to update the current state of the first character appropriately.

In step 726, the first agent application determines if a menu choice message packet containing a mood direction for the first character has been received. If a mood direction has not been received, the agent application proceeds to step 730. If a mood direction has been received, the agent application updates the appropriate mood value in step 728. Following step 728, the agent application proceeds to step 730.

In step 730, the first agent application determines if a perception message packet has been received for a behavior executed by the first character, indicating the execution of the behavioral commands sent to the animator in step 720. If a perception message packet has not been received, the agent application proceeds to step 734. If a perception message packet has been received for a behavior executed by the first character, the agent application sets the behavior constraint node equal to the unique identifier of the perceived behavior in step 732. This is the first step in the path that results in the execution of the next statement in the script that generated the perceived behavior. After step 732, the agent application proceeds to step 740.

In step 734, the agent application determines if it has received a menu item message packet containing one or more behavioral directions for its character. If a menu item message packet has not been received, the agent application returns to step 724. If a menu item message packet containing a new behavioral direction has been received, the agent application terminates all scripts by popping them from the stack in step 736. In step 738, the agent application sets the behavior constraint node and the destination constraint node appropriately given the behavioral direction, and proceeds to step 740.

In step 740, the algorithm calls the feasibility function illustrated in FIG. 32 to identify all feasible behaviors grouped under the behavior constraint node. The function receives the behavior constraint node as an input and returns the feasible behaviors nodes which are grouped under the behavior constraint node. In step 742, the agent application executes the desirability rating function of FIGS. 39A–39B to determine a respective desirability rating of each of the feasible behaviors identified in step 740. The agent application also executes the destination rating function of FIG. 41 to determine a respective desirability rating of each of the leaf destination nodes which is a child of the destination constraint node.

In step 744, the agent application executes the selection algorithm of FIG. 42 to select a behavior to be executed by its character from the subset of feasible behaviors identified in step 740. If the selected behavior is a movement behavior, the agent application also executes the selection algorithm to select the destination for the movement from the destinations nodes evaluated in step 740.

In step 746, the agent application determines if the script associated with the selected behavior node is already executing. If the script is already executing, then the script is already on the stack and the next statement in the script is selected for execution in step 758. The script keeps an internal representation of the statement last executed, so that each time the agent application returns to step 758, the next statement in the script (sequential except where moderated by control constructs) is selected. Following step 758, the algorithm returns to step 706.

If the script is not already executing, then the agent application is processing an internal behavior direction and the script for the selected behavior node must be pushed onto the stack in step 748. For example, the second statement of the PLAY ON PEDESTALS script is an internal behavior direction specifying the MOVE node. Processing of this statement in steps 716 and 740–744 results in the selection of either the HOP, LEAP, or SHUFFLE behaviors, all of which are associated with the MOVEMENT script. The MOVEMENT script is not already executing, so it is pushed onto the stack on top of the PLAY ON PEDESTALS script to execute the selected movement behavior. In step 750, the first statement in the new script is selected for execution, and the algorithm returns to step 706.

In step 752, the agent application determines if the currently selected statement is an END statement. If the currently selected statement is not an END statement, the next statement in the script is selected for execution in step 758, and the algorithm returns to step 706. If the currently selected statement is an END statement, then the script is finished, and the agent application pops the script from the stack in step 754.

In step 756, the agent application determines if there are no more scripts on the stack. If there are more scripts on the stack, the next statement in the top script is selected for execution in step 758, and the algorithm returns to step 706. If the stack is empty, then all scripts are done and the script execution algorithm ends. When the script execution algorithm ends, the agent application returns to the flow of control shown in FIGS. 31A–31B, starting at step 302 to identify a new subset of feasible behaviors.

EXAMPLES OF OPERATION

Three specific examples of operation follow. The examples assume that all mood values for both characters are initially set to 0, that the eyes for both characters are open, and that the current activity state of both characters is the READY STATE. Each agent applications is assumed to have sent a preliminary menu item message packet to its corresponding interface.

Example One

Summary

The first user moves a mood slider on the first user interface to change the first character's energy mood value. The first agent application updates the energy mood value and identifies a new subset of feasible behaviors for the first character. The first agent application then sends a new set of directing alternatives to the first user interface application for display.

First user 21A moves the energy mood slider 222B to the highest point. In response, user interface application 54A creates a menu choice message packet 256 with the string parameters "MOOD" and "ENERGY" and with an integer parameter "10" for the new mood value. Interface application 54A sends the message packet over its TCP/IP connection to the server application 48. Server application 48 forwards the message packet to the first agent application 50A.

First agent application 50A reads the packet and sets energy mood value 154B equal to 10. Agent application 50A proceeds to identify a new subset of feasible behaviors for first character 138A using the function shown in FIG. 32. The function determines that the ANSWER node and HI node are not feasible because the first character's activity state is the READY STATE. Further, the function identifies all leaf behavior nodes whose feasibility ratings do not exceed the feasibility rating threshold as not feasible. For example, given the high value of energy mood value 154B, leaf nodes for sleep behaviors and for verbal behaviors in which the character sounds sleepy are not feasible.

Figure 35:
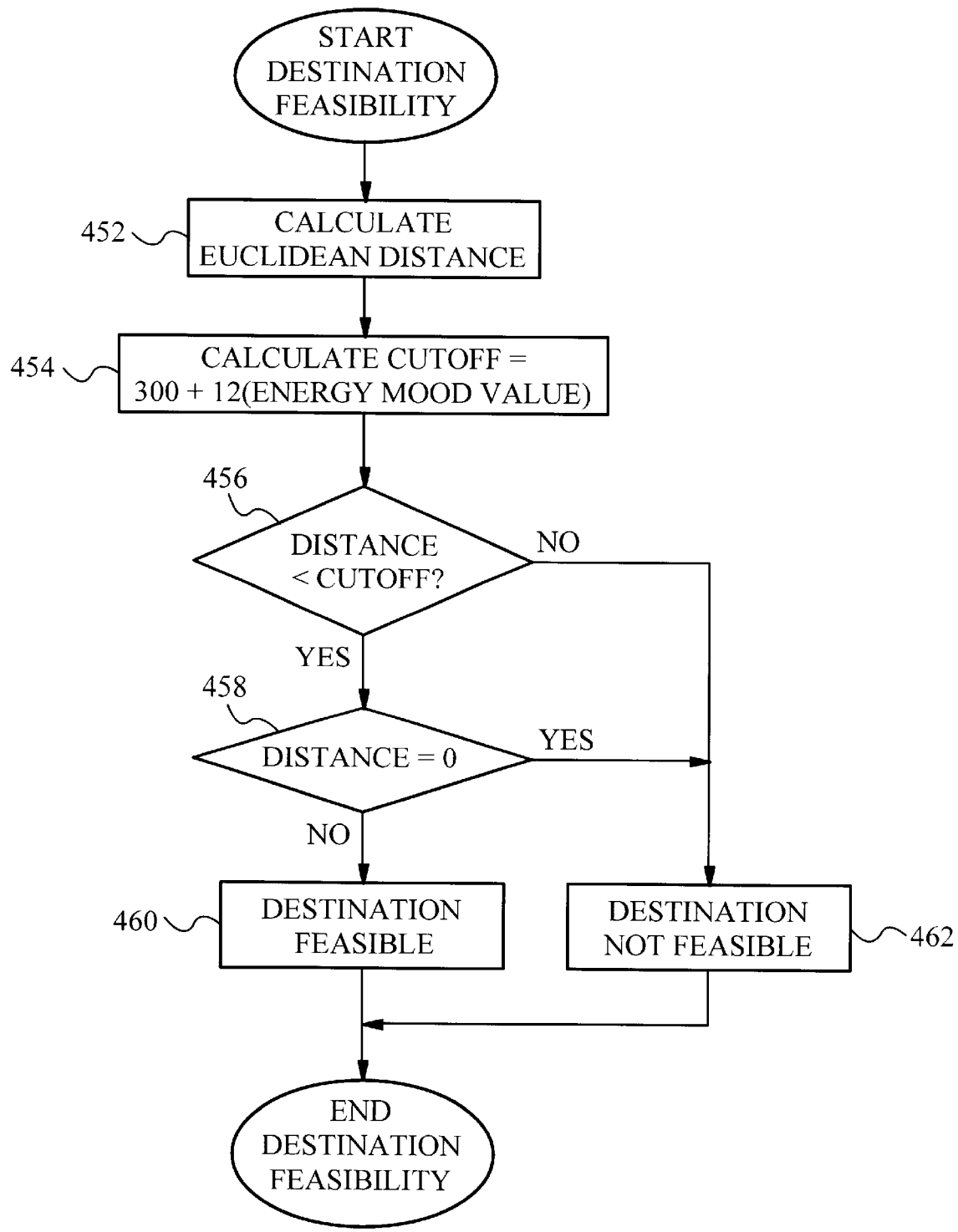
FIG. 35 is a flow diagram illustrating a subfunction called in the function of FIG. 32 to determine whether a destination node is feasible.

Agent application 50A also identifies a subset of feasible destinations using the function shown in FIG. 35. The leaf destination nodes are rated for feasibility in dependence upon their distance from the current location of the character. Since the new energy mood value of 10 is very peppy, the cutoff distance will be high, eliminating very few of the leaf destination nodes.

Agent application 50A then creates a menu item message packet 238 addressed to the first user interface application 54A. The agent application checks the boolean value 112 of each feasible behavior node to determine if the node should be added to the menu item message packet. If the node's boolean value 112 is true, the agent application adds the node's unique identifier 108, pixmap filename 114, and position integers 116 to the message packet. The agent application also adds to the message packet the (x,y) coordinates of each destination leaf node determined to be feasible.

The agent application then sends the menu item message packet to first user interface application 54A. First user interface application 54A receives the menu item message packet and displays the icons for the behavior nodes specified in the packet on screen 216. Interface application 54A also displays the destinations as white circles 220.

Example Two

Summary

The first user directs the first character to move to ROCK 1. The first agent application receives and follows the direction, choosing a desirable gait and sending appropriate commands to the animator. The second agent application perceives the first character's change in location.

First user 21A clicks on destination circle 218 on screen 216 and the circle turns black. Destination circle 218 represents ROCK 1. First user 21A then clicks on the MOVE icon and presses enter button 236. First user interface application 54A sends a menu choice message packet 248 to first agent application 50A which includes the unique identifier of the MOVE node and the unique identifier of the ROCK 1 node.

Agent application 50A receives the menu choice message packet and sets the behavior constraint node to the MOVE node and the destination constraint node to the ROCK 1 node. Agent application 50A then evaluates all feasible behavior nodes using the rating function shown in FIGS. 39A–39B. Because only the HOP node, SHUFFLE node, and LEAP node are consistent with node direction 158, these nodes get a very high desirability rating in comparison to all other nodes. Agent application 50A then uses the selection algorithm shown in FIG. 42 to select the behavior to be executed by first character 138A. Assume the HOP node was selected.

Because the selected behavior is a movement behavior, agent application 50A also selects a destination. Agent application 50A eliminates all destination nodes which are not equal to or a child of the ROCK 1 node. Because ROCK 1 node is a leaf node, it is the only remaining destination node and is therefore selected.

Agent application 50A next executes the script associated with the selected node, in this case the MOVEMENT script. The MOVEMENT script contains an animator command having the expressions $1, $destination_x, $destination_y, ($energy+10), ($happiness+20), $unique_id, and $action_type. The expressions are evaluated as follows:
$1=HOP;
$destination_x=x coordinate of ROCK 1;
$destination_y=y coordinate of ROCK 1;
($energy+10)=20;
($happiness+20)=20;
$unique_id=000000;
$action_type=NO ACT.

Agent application 50A next sends an action message packet to animator application 72 with these parameters. Agent application 50A also updates position variable 170 with the new (x,y) coordinates of first character 138A, and decreases energy mood value 154B by 1.

Animator application 72 receives the action message packet and executes the HOP behavior by creating an animation sequence on the monitor of workstation 14. Animator application 72 then sends to both agent applications a perception message packet 178 with the unique identifier for HOP (000000), a character number of 1, an action type of NO ACT, and the (x,y) coordinates of ROCK 1.

Agent application 50A receives the perception message packet and sets its behavior constraint node to the HOP node. Agent application 50A next identifies all feasible behaviors beneath the HOP node, selects the HOP node for execution, and executes the next statement in the MOVEMENT script. Since the next statement is an END statement, agent application 50A pops the MOVEMENT script from the stack and identifies a new subset of feasible behaviors for first character 138A. Second agent application 50B also receives the perception message packet and updates variable 172 with the new (x,y) coordinates of the other character.

Example Three

Summary

The first user directs the first character to ask the second character "What's Your Name?". The first agent application receives and follows the direction, choosing a particular sound file and sending a command to the animator application to play that sound file. The second agent application perceives the question and offers a directing alternative for answering the question on the second user interface.

First user 21A selects an icon on the first user interface representing an ASK NAME node. First user interface application 54A sends a menu choice message packet to first agent application 50A with the unique identifier of the ASK NAME node. First agent application 50A receives the menu choice message packet and sets the behavior constraint node to the ASK NAME node.

Agent application 50A then evaluates all feasible behavior nodes using the rating function shown in FIGS. 39A–39B. Because only the leaf nodes under ASK NAME node are consistent with the node direction, these nodes get a very high desirability rating in comparison to all other nodes. Agent application 50A then uses the selection algorithm shown in FIG. 42 to select the behavior to be executed by first character 138A, in this case some verbalization equivalent to the phrase "What's Your Name?" that is desirable given the first character's current mood values, activity state, and physical position.

Agent application 50A next executes the script associated with the selected leaf node, in this case the SAY script. The SAY script contains an animator command having the expressions SAY, $1, $unique_id, and $action_type. The expressions are evaluated as follows:
SAY=SAY;
$1=1205= which sound file to play;
$unique_id=01020100;
$action_type=ASK NAME ACT.

The agent application sends an action message packet to animator application 72 with these parameters. Agent application 50A also updates activity state variable 174 to ASKING NAME STATE. Animator application 72 receives the action message packet and executes the selected verbal behavior by playing its sound file on audio player 43. Animator application 72 then sends to both agent applications a perception message packet with the unique identifier of the verbal behavior node, a character number of 1, and an action type of ASK NAME ACT.

Second agent application 50B receives the perception message packet and updates the activity state of second character 138B to ASKED NAME STATE. Second agent application 50B next identifies a new subset of feasible behaviors for second character 138B using the function shown in FIG. 32. Because the second character's current activity state is now ASKED NAME STATE, all behaviors in the SAY branch 102B of tree 100 are considered not feasible except for behaviors grouped under the ANSWER NAME node. Agent application 50B also identifies a subset of feasible destinations for character 138B using the function shown in FIG. 35.

Agent application 50B then creates a menu item message packet addressed to the second user interface application 54B. The agent application checks the boolean value 112 of each feasible behavior node to determine if the node should be added to the menu item message packet. If the node's boolean value 112 is true, the agent application adds the node's unique identifier 108, pixmap filename 114, and position integers 116 to the message packet. The agent application also adds to the message packet the (x,y) coordinates of each destination leaf node determined to be feasible.

Second user interface application 54B receives the menu item message packet from agent application 50B and displays the directing alternatives to second user 21B. The directing alternatives will include only one verbal behavior icon, depicting an answer verbalization. Second user 21B may continue by selecting the answer icon, and character 138B will execute a verbal behavior from the ANSWER NAME node of behavior tree 100, or user 21B may choose to ignore the question and select other icons on the interface.

SUMMARY, RAMIFICATIONS, AND SCOPE

Although the above description includes many specificities, these should not be construed as limitations on the scope of the invention, but merely as illustrations of some of the presently preferred embodiments. Many other embodiments of the invention are possible. For example, in alternative embodiments, characters are embodied in alternative media such as computer graphics, virtual reality, audio, video, film, or text. For simplicity of understanding, the preferred embodiment includes only two characters. However, it is obvious that many more characters may be implemented in alternative embodiments.

It is also anticipated that characters will be represented as realistic or cartoonish human beings, animals, robots, or fantasy creatures. Additionally, the system of the invention may be adapted to interact with users via various input/output devices, such as a joystick, mouse, keyboard, speech understanding system, speech production system, vision system, motion capture system, display monitor, or data glove.

The preferred embodiment includes one user interface for directing each character. In alternative embodiments, each character may be directed through more than one interface. Also in alternative embodiments, each interface may be used to direct the behavior of multiple characters. The invention also supports characters which are not directed through any interface at all. For example, characters may be directed through an abstract script stored in memory rather than through direct user interaction.

In the preferred embodiment, each user interface is displayed on a separate computer monitor and the virtual world is displayed on a single monitor. Many alternative configurations are possible. For example, a copy of the virtual world and a single user interface may be displayed on each of several computer monitors (e.g. corresponding to the number of characters in the particular application).

The preferred embodiment includes a particular animator for animating the characters. However, this animator may be replaced by any animation system which executes commands generated by the agent applications and which generates perceptual information in return. In addition, the present invention supports systems that have a variable number of animators and systems that have a variety of mappings from agents to characters. For example, in an alternative embodiment, the same agent application selects behaviors for multiple characters, and the selected behaviors for each character are implemented through one or more animation systems.

The present invention may be implemented on a variety of hardware platforms and configurations. For example, the system of the invention may be implemented on a single stand-alone computer. In embodiments that include multiple computers communicating over a network, the animation system, user interface, and agent applications may be distributed among these computers in any way that allows each client application to communicate with the other client applications. Additionally, the present invention supports other communication paradigms between applications including network protocols, such as TCP/IP, and inter-application communication methods, such as OLE.

Each agent application has a set of constructs that it uses to generate, evaluate, and execute behaviors. In the preferred embodiment, these constructs include a static tree structure for storing a character's possible behaviors, scripts associated with the leaf nodes in the tree for executing the behaviors, a finite state machine for determining the character's activity state, and three mood dimensions representing the character's current mood. However, the present invention is not limited to these constructs. Many alternative constructs may be used to generate, evaluate, and execute behaviors.

These alternative constructs include, but are not limited to: dynamic tree structures which are modifiable at run time; representations of possible behaviors other than a tree; any interpreted or compiled programming language to implement scripts; any finite state machine or set of finite state machines to represent activity states; other constructs for representing interactions between characters, such as state machines with parameterized states, sets of state variables and preconditions defined on the variables, push down automata, or Turing machines; and any set of mood dimensions with any range of values. Further, any of these representations of state data may be used to determine feasibility and desirability ratings of behaviors.

Such alternative constructs and their use to determine ratings are described in the following journal articles and technical reports which are hereby incorporated by reference:

JOURNAL ARTICLES

1. Hayes-Roth, B. "*A Blackboard Architecture for Control*", Artificial Intelligence, Vol. 26, pg. 251–321, 1985.
2. Hayes-Roth, B. "*An Architecture for Adaptive Intelligent Systems*", Artificial Intelligence, Vol. 72, pg. 329–365, 1995.
3. Hayes-Roth, B. "*Architectural Foundations for Real-time Performance in Intelligent Agents*", The Journal of Real-Time Systems, Vol. 2, pg. 99–125, 1990.
4. Hayes-Roth, B. "*Opportunistic Control of Action in Intelligent Agents*", IEEE Transactions on Systems, Man, and Cybernetics, Vol. 23, pg. 1575–1587, 1993.
5. Hayes-Roth, B., and Larsson, J. E "*A Domain-Specific Software Architecture for a Class of Intelligent Patient Monitoring Agents*", Journal of Experimental and Theoretical Artificial Intelligence, 1995.
6. Hayes-Roth et al. "*A Domain-Specific Software Architecture for Adaptive Intelligent Systems*", IEEE Transactions on Software Engineering, pg. 288–301, 1995.

TECHNICAL REPORTS

1. Garvey, A., Hewett, M., Johnson, M. V., Schulman, R., and Hayes-Roth, B. "*BB1 User Manual—Interlisp*

*Version"*, Stanford University, Knowledge Systems Laboratory Technical Report KSL 86–60, 1987.
2. Garvey, A., Hewett, M., Johnson, M. V., Schulman, R., and Hayes-Roth, B. *"BB1 User Manual—Common Lisp Version"*, Stanford University, Knowledge Systems Laboratory Technical Report KSL 86–61, 1987.
3. Hollander, M. M., and Brownston, L. S. *"BB1 Version 2.5 (Unix) Installation Notes and Users Guide"*, Stanford University, Knowledge Systems Laboratory, December 1992.
4. Brownston, L. S. *"BB1 Version 3.2 (Unix) Installation Notes and Users Guide"*, Stanford University, Knowledge Systems Laboratory, April 1994.
5. Murray, W. *"A User Guide to Language Frameworks"*, Stanford University, Knowledge Systems Laboratory, June 1993.

It will be apparent to those skilled in the art that the present invention can be usefully employed in a great variety of applications, including but not limited to the following categories of applications: computer, video, and on-line games; software toys; interactive mechanical (robot) toys; educational software; on-line social environments and virtual worlds; interactive stories, simulated training environments; interactive theme park and museum exhibits; user interfaces and help systems; computer-based, on-line, or web-based company representatives, including marketing, customer service, or sales representatives; interactive web tour guides; and interactive personal assistants.

Therefore, the scope of the invention should be determined not by the examples given, but by the appended claims and their legal equivalents.

What is claimed is:

1. A system for selecting a behavior to be executed by an improvisational character, the system comprising:
   a) a memory means for storing a set of possible behaviors for the character and for storing state data representative of a current state of the character; and
   b) a processor means in communication with the memory means for selecting the behavior to be executed from the set of possible behaviors, the processor means including an identification means for identifying from the set of possible behaviors a subset of feasible behaviors for the character in the current state, an evaluation means for determining for each of the feasible behaviors a respective desirability rating of the feasible behavior in the current state, and a selection means for selecting the behavior to be executed from the subset of feasible behaviors, wherein the behavior to be executed is selected in dependence upon its desirability rating.

2. The system of claim 1, wherein the current state comprises a current mood of the character and the identification means includes means for identifying the subset of feasible behaviors in dependence upon the current mood.

3. The system of claim 1, wherein the current state comprises a current mood of the character and the evaluation means includes means for determining the desirability rating of each of the feasible behaviors in dependence upon the current mood.

4. The system of claim 1, wherein the current state comprises a directing state, the state data includes a current behavioral direction for the character, and the evaluation means includes means for determining the desirability rating of each of the feasible behaviors in dependence upon the behavioral direction.

5. The system of claim 4, wherein the memory means further stores for each of the feasible behaviors a respective attribute value of the feasible behavior, the behavioral direction constrains the attribute value of the behavior to be executed by the character, and the evaluation means includes means for comparing the attribute value of each of the feasible behaviors to the behavioral direction to determine the desirability rating of each of the feasible behaviors.

6. The system of claim 4, wherein the memory means further stores instructions for updating the behavioral direction in response to a specified event, and wherein the processor means further includes means for updating the behavioral direction when the event occurs.

7. The system of claim 4, further comprising an interface connected to the processor means for receiving the behavioral direction from an external source.

8. The system of claim 7, wherein the interface comprises a system interface and the external source comprises another computer system connected to the system interface.

9. The system of claim 7, wherein the interface comprises a user interface and the external source comprises a user.

10. The system of claim 7, wherein the processor means includes means for presenting directing alternatives to the external source through the interface.

11. The system of claim 10, wherein the processor means further includes means for determining which of the directing alternatives are feasible in the current state and means for selecting each of the directing alternatives for presentation in dependence upon its feasibility.

12. The system of claim 1, wherein the current state comprises an activity state of the character, and wherein the identification means includes means for identifying the subset of feasible behaviors in dependence upon the activity state.

13. The system of claim 1, wherein the current state includes a current physical position of the character, and wherein the identification means includes means for identifying the subset of feasible behaviors in dependence upon the current physical position.

14. The system of claim 1, wherein the current state includes a current location of the character in a virtual world, wherein the identification means includes means for identifying the subset of feasible behaviors in dependence upon the current location.

15. The system of claim 1, wherein the current state comprises an activity state of the character, and wherein the evaluation means includes means for determining the desirability rating of each of the feasible behaviors in dependence upon the activity state.

16. The system of claim 1, wherein the current state includes a current physical position of the character, and wherein the evaluation means includes means for determining the desirability rating of each of the feasible behaviors in dependence upon the current physical position.

17. The system of claim 1, wherein the current state includes a current location of the character in a virtual world, wherein the evaluation means includes means for determining the desirability rating of each of the feasible behaviors in dependence upon the current location.

18. The system of claim 1, wherein the selection means includes means for selecting the behavior to be executed with a selection probability that is an increasing function of the desirability rating of the behavior.

19. The system of claim 1, wherein the selection means includes means for selecting the behavior to be executed as the feasible behavior having the highest desirability rating.

20. A method for selecting a behavior to be executed by an improvisational character, the method comprising the computer implemented steps of:

a) storing in a computer system a set of possible behaviors for the character and state data representative of a current state of the character;

b) identifying from the set of possible behaviors a subset of feasible behaviors for the character in the current state;

c) determining for each of the feasible behaviors a respective desirability rating of the feasible behavior in the current state; and d) selecting the behavior to be executed from the subset of feasible behaviors, wherein the behavior to be executed is selected in dependence upon its desirability rating.

21. The method of claim 20 wherein the current state comprises a current mood of the character and wherein the subset of feasible behaviors is identified in dependence upon the current mood.

22. The method of claim 20, wherein the current state comprises a current mood of the character, and wherein the desirability rating of each of the feasible behaviors is determined in dependence upon the current mood.

23. The method of claim 20, wherein the current state includes a directing state, the state data includes a current behavioral direction for the character, and the desirability rating of each of the feasible behaviors is determined in dependence upon the behavioral direction.

24. The method of claim 23, wherein the method further includes the step of storing for each of the feasible behaviors a respective attribute value of the feasible behavior, the behavioral direction constrains the attribute value of the behavior to be executed, and the step of determining the desirability rating of each of the feasible behaviors includes the step of comparing the attribute value of each of the feasible behaviors to the behavioral direction.

25. The method of claim 24, further comprising the steps of storing in the computer system instructions to update the behavioral direction in response to a specified event and updating the behavioral direction when the event occurs.

26. The method of claim 23, wherein the computer system includes an interface and the method further comprising the step of receiving the behavioral direction from an external source through the interface.

27. The method of claim 26, wherein the interface comprises a user interface and the external source comprises a user.

28. The method of claim 26, wherein the interface comprises a system interface and the external source comprises another computer system in communication with the system interface.

29. The method of claim 26, further comprising the step of presenting directing alternatives to the external source through the interface.

30. The method of claim 29, further comprising the step of determining which of the directing alternatives are feasible in the current state and selecting the directing alternatives for presentation in dependence upon their feasibility.

31. The method of claim 20, wherein the current state comprises an activity state of the character, and wherein the subset of feasible behaviors is identified in dependence upon the activity state.

32. The method of claim 20, wherein the current state includes a current physical position of the character, and wherein the subset of feasible behaviors is identified in dependence upon the current physical position.

33. The method of claim 20, wherein the current state includes a current location of the character in a virtual world, wherein the subset of feasible behaviors is identified in dependence upon the current location.

34. The method of claim 20, wherein the current state comprises an activity state of the character, and wherein the desirability rating of each of the feasible behaviors is determined in dependence upon the activity state.

35. The method of claim 20, wherein the current state includes a current physical position of the character, and wherein the desirability rating of each of the feasible behaviors is determined in dependence upon the current physical position.

36. The method of claim 20, wherein the current state includes a current location of the character in a virtual world, wherein the desirability rating of each of the feasible behaviors is determined in dependence upon the current location.

37. The method of claim 20, wherein the behavior to be executed is selected with a selection probability that is an increasing function of the desirability rating of the behavior.

38. The method of claim 20, wherein the behavior to be executed is selected as the feasible behavior having the highest desirability rating.

39. A system for directing the improvisational behavior of a computer-controlled character, the system comprising:

a) a memory means for storing state data representative of a current state of the character, a set of possible behaviors for the character, and for each of the possible behaviors, a respective attribute value of the possible behavior;

b) a direction means for setting a behavioral direction for the character, the behavioral direction constraining the attribute value of a behavior to be executed by the character; and c) a processor means connected to the memory means and the direction means for selecting the behavior to be executed from the set of possible behaviors, the processor means comprising:

i) an identification means for identifying from the set of possible behaviors a subset of feasible behaviors for the character in the current state;

ii) an evaluation means for comparing the attribute value of each of the feasible behaviors to the behavioral direction to determine for each of the feasible behaviors a respective desirability rating of the feasible behavior in the current state; and iii) a selection means for selecting the behavior to be executed from the subset of feasible behaviors, wherein the behavior to be executed is selected in dependence upon its desirability rating.

40. The system of claim 39, wherein the memory means further stores instructions for updating the behavioral direction in response to a specified event, and wherein the direction means includes means for updating the behavioral direction when the event occurs.

41. The system of claim 39, wherein the direction means includes a system interface for receiving the behavioral direction from another computer system.

42. The system of claim 39, wherein the direction means includes a user interface for receiving the behavioral direction from a user.

43. The system of claim 39, wherein the direction means includes an interface, and wherein the processor means includes means for presenting directing alternatives to an external source through the interface.

44. The system of claim 43, wherein the processor means further includes means for determining which of the directing alternatives are feasible in the current state and means for selecting each of the directing alternatives for presentation in dependence upon its feasibility.

45. The system of claim 39, wherein the current state comprises a current mood of the character and the identification means includes means for identifying the subset of feasible behaviors in dependence upon the current mood.

46. The system of claim 39, wherein the current state comprises a current mood of the character and the evaluation means includes means for determining the desirability rating of each of the feasible behaviors in further dependence upon the current mood.

47. The system of claim 39, wherein the current state includes an activity state of the character, and wherein the identification means includes means for identifying the subset of feasible behaviors in dependence upon the activity state.

48. The system of claim 39, wherein the current state includes a current physical position of the character, and wherein the identification means includes means for identifying the subset of feasible behaviors in dependence upon the current physical position.

49. The system of claim 39, wherein the current state includes a current location of the character in a virtual world, wherein the identification means includes means for identifying the subset of feasible behaviors in dependence upon the current location.

50. The system of claim 39, wherein the current state comprises an activity state of the character, and wherein the evaluation means includes means for determining the desirability rating of each of the feasible behaviors in further dependence upon the activity state.

51. The system of claim 39, wherein the current state includes a current physical position of the character, and wherein the evaluation means includes means for determining the desirability rating of each of the feasible behaviors in further dependence upon the current physical position.

52. The system of claim 39, wherein the current state includes a current location of the character in a virtual world, wherein the evaluation means includes means for determining the desirability rating of each of the feasible behaviors in further dependence upon the current location.

53. The system of claim 39, wherein the selection means includes means for selecting the behavior to be executed with a selection probability that is an increasing function of the desirability rating of the behavior.

54. The system of claim 39, wherein the selection means includes means for selecting the behavior to be executed as the feasible behavior having the highest desirability rating.

\* \* \* \* \*